US008180727B2

(12) United States Patent
McLean et al.

(10) Patent No.: US 8,180,727 B2
(45) Date of Patent: May 15, 2012

(54) METHOD AND APPARATUS FOR NAVIGATING MODELING OF A BUILDING USING NONPARAMETRIC USER INPUT BUILDING DESIGN DATA

(75) Inventors: Donald John McLean, Bearsden (GB); Richard John Quincey, Kilmington (GB)

(73) Assignee: Integrated Environmental Solutions, Ltd., Glasgow (GB)

( * ) Notice: Subject to any disclaimer, the term of this patent is extended or adjusted under 35 U.S.C. 154(b) by 0 days.

(21) Appl. No.: 13/029,826

(22) Filed: Feb. 17, 2011

(65) Prior Publication Data
US 2012/0016638 A1 Jan. 19, 2012

Related U.S. Application Data

(63) Continuation of application No. 12/461,557, filed on Aug. 14, 2009, now Pat. No. 7,912,807.

(60) Provisional application No. 61/174,365, filed on Apr. 30, 2009, provisional application No. 61/186,145, filed on Jun. 11, 2009.

(51) Int. Cl.
*G06F 15/00* (2006.01)
(52) U.S. Cl. ............................................. 706/62; 701/1
(58) Field of Classification Search ................ 706/1, 62, 706/10–12, 14–15, 45, 52; 705/300–301; 703/1
See application file for complete search history.

(56) References Cited

U.S. PATENT DOCUMENTS

| 5,937,941 | A | 8/1999 | Gach |
| 5,971,597 | A | 10/1999 | Baldwin et al. |
| 5,983,010 | A | 11/1999 | Murdock et al. |
| 6,028,998 | A | 2/2000 | Gloudeman et al. |
| 6,064,310 | A | 5/2000 | Busak et al. |
| 6,119,125 | A | 9/2000 | Gloudeman et al. |
| 6,216,956 | B1 | 4/2001 | Ehlers et al. |
| 6,263,260 | B1 | 7/2001 | Bodmer et al. |
| 6,941,193 | B2 | 9/2005 | Frecska et al. |
| 6,990,821 | B2 | 1/2006 | Singh et al. |
| 7,243,044 | B2 | 7/2007 | McCalla |
| 7,392,661 | B2 | 7/2008 | Alles |
| 7,426,454 | B2 | 9/2008 | Mertins et al. |
| 7,502,768 | B2 | 3/2009 | Ahmed et al. |
| 7,665,670 | B2 | 2/2010 | Ahmed |
| 7,719,440 | B2 | 5/2010 | Delp et al. |
| 7,774,245 | B2 | 8/2010 | Voysey |
| 7,778,734 | B2 | 8/2010 | Oswald et al. |
| 7,797,084 | B2 | 9/2010 | Miwa |
| 7,912,807 | B2 * | 3/2011 | McLean et al. ................. 706/52 |

(Continued)

FOREIGN PATENT DOCUMENTS
EP 1 850 440 10/2007
(Continued)

OTHER PUBLICATIONS

McFarland, Building Information Modeling for MEP, 2007, Kansas State University, pp. 1-52.*

(Continued)

*Primary Examiner* — David Vincent
(74) *Attorney, Agent, or Firm* — DLA Piper LLP US

(57) ABSTRACT

A system and method of navigating modeling of a building, including: receiving nonparametric user input building design data, organizing the nonparametric user input building design data, and globally editing the non-parametric data element in multiple objects within a building design.

8 Claims, 76 Drawing Sheets

U.S. PATENT DOCUMENTS

| | | | |
|---|---|---|---|
| 2003/0009507 A1 | 1/2003 | Shum | |
| 2004/0239494 A1* | 12/2004 | Kennedy et al. | 340/500 |
| 2005/0010365 A1 | 1/2005 | Chapman et al. | |
| 2005/0137921 A1* | 6/2005 | Shahriari | 705/7 |
| 2006/0195817 A1 | 8/2006 | Moon | |
| 2007/0005191 A1 | 1/2007 | Sloup et al. | |
| 2007/0282576 A1 | 12/2007 | Butine | |
| 2008/0015823 A1* | 1/2008 | Arnold et al. | 703/1 |
| 2008/0033777 A1 | 2/2008 | Shukoor | |
| 2008/0092108 A1 | 4/2008 | Corral | |
| 2008/0177423 A1 | 7/2008 | Brickfield et al. | |
| 2009/0094557 A1* | 4/2009 | Howard | 715/848 |
| 2009/0210192 A1 | 8/2009 | Askar | |
| 2009/0228406 A1 | 9/2009 | Lopez et al. | |
| 2009/0271154 A1 | 10/2009 | Coad et al. | |
| 2009/0299813 A1 | 12/2009 | Cody et al. | |
| 2010/0017177 A1 | 1/2010 | Dosunmu | |
| 2010/0100405 A1* | 4/2010 | Lepore et al. | 705/7 |
| 2010/0118026 A1* | 5/2010 | Demchak et al. | 345/419 |
| 2010/0211222 A1 | 8/2010 | Ghosn | |
| 2010/0211224 A1 | 8/2010 | Keeling et al. | |
| 2010/0223081 A1 | 9/2010 | Espino, Jr. | |
| 2010/0235206 A1 | 9/2010 | Miller et al. | |
| 2010/0286937 A1 | 11/2010 | Hedley et al. | |

FOREIGN PATENT DOCUMENTS

| | | |
|---|---|---|
| JP | 2003-074943 | 3/2003 |
| WO | WO 97/44720 | 11/1997 |

OTHER PUBLICATIONS

Lucas et al., Analyzing Capacity of BIM Tools to Support Data Use Accross Project Lifecycle, Managing it in Construction/Managing Construction for TOmorow, vol. 26 CRC Press, Taylor & Francis Group, 2009, pp. 1-9.*

Woo, JH, BIM (Building Information Modeling) and Pedagogical Challenges, 2006, Proceedings of the 43rd ASC National Conference, pp. 1-11.*

Ibanez et al., An approach to the simulation of PCMs in building applications using TRNSYS, 2004, Elsevier, pp. 1-12.*

Michael Utzinger et al., "Vital Signs; Building Balance Point", http://arch.ced.berkeley,edu/vitalsigns/res/downloads/rp/balance_point/balance_point_big.pdf, 99 pages (Aug. 1997).

"http://www.trnsys.com/", retrieved from Internet Archive, archived Jul. 25, 2008 (72 pages).

"http://www.energysoft.com/", retrieved from Internet Archive, archived Mar. 9, 2008 (24 pages).

"http://www.doe2.com/", retrieved from Internet Archive, archived Mar. 20, 2006 (5 pages).

"http://www.designbuilder.co.uk/", retrieved from Internet Archive, archived Jul. 6, 2008 (68 pages).

"http://www.edsl.net/", retrieved from Internet Archive, archived Jul. 12, 2008 (2 pages).

"http://www.bentley.com/", retrieved from Internet Archive, archived Jun. 5, 2008 (6 pages).

"http://www.energy.gov/", retrieved from Internet Archive, archived Jul. 30, 2008 (2 pages).

"http://www.usa.autodesk.com/", printed Nov. 1, 2010 (17 pages).

International Search Report issued in PCT/US2010/032947 on Nov. 30, 2010.

Written Opinion issued in PCT/US2010/032947 on Nov. 30, 2010.

International Search Report issued in PCT/US2010/032955 on Nov. 29, 2010.

Written Opinion issued in PCT/US2010/032955 on Nov. 29, 2010.

English Abstract of JP 2003-074943 published Mar. 12, 2003.

English Translation of JP 2003-074943 published Mar. 12, 2003.

U.S. Appl. No. 12/770,232, electronically captured on Oct. 4, 2011.

U.S. Appl. No. 12/461,557, electronically captured on Oct. 4, 2011.

* cited by examiner

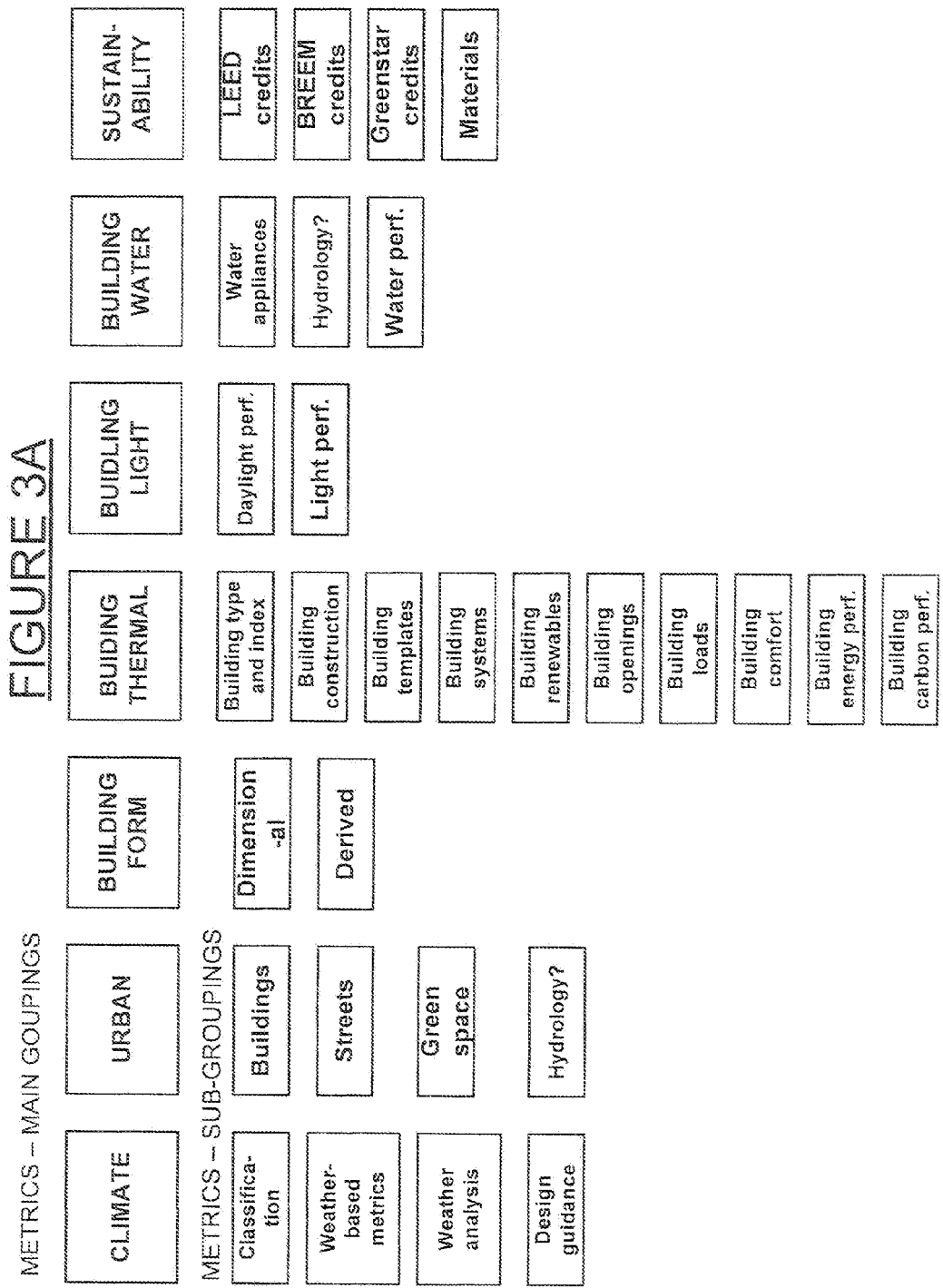

300

Climate metrics

| Classification | Weather base metrics | Weather analysis | Design guidance |
|---|---|---|---|
| Climate file name | Warmest month | Climate is dominated by | Design priorities |
| Climate zone Ashrae | Max annual temp | Latitude is | Micro climate potential |
| Ashrae descriptive words / city | Warmest 6 months | Summer is | Urban street pattern |
| Climate zone K-G | Coldest month | Summer is also | Urban pattern details |
| K-G descriptive words | Min annual temp | Winter is | Building macro form |
| Climate index 24 hrs | Coldest 6 months | Winter is also | Building micro form |
| | No months > 10 degC mean | Wind prevailing patterns | Building internal form |
| Climate Energy Index 24hrs – monthly breakdown – 12 months x 5 energy types | Monthly diurnal swing > 20 degC | Rainfall | Construction details |
| | Monthly diurnal swing 15-20 degC | Misc. issues | Windows & openings |
| | Monthly diurnal swing 10-15 degC | Thermal stress potential | Shading & protection |
| Climate index 9-5 hrs | Monthly diurnal swing 5-10 degC | | Ventilation details |
| | Monthly diurnal swing < 5 degC | | Passive details |
| Climate Energy Index 9-5 hrs – monthly breakdown – 12 months x 5 energy types | Max moisture content | | Active details |
| | Min moisture content | | |
| Climate index hrs of use | Annual mean moisture content | | |
| | Annual mean wind speed | | |
| Climate Energy Index hrs of use – monthly breakdown – 12 months x 5 energy types | Annual mean wind direction | | |
| | Annual rainfall | | |
| | Driest month | | |
| | Wettest summer month | | |
| | Wettest winter month | | |
| | Driest summer month | | |
| | Driest winter month | | |
| | Wettest 6 months | | |
| | Annual hourly mean global solar rad. | | |
| | Annual monthly mean global solar rad. | | |
| | Annual solar resource | | |
| | Annual mean cloud cover | | |
| | Heating degree days | | |
| | Cooling degree days | | |
| | Hours > 40 degC | | |
| | Hours > 28 degC | | |
| | Hours > 25 degC | | |
| | Hours > 20 degC | | |
| | Hours > 10 degC | | |
| | Hours > 0 degC | | |
| | Hours < 0 degC | | |
| | Hours < -5 degC | | |

| Day | Night |
|---|---|
| Jan | Jan |
| Feb | Feb |
| Mar | Mar |
| Apr | Apr |
| May | May |
| Jun | Jun |
| July | July |
| Aug | Aug |
| Sep | Sep |
| Oct | Oct |
| Nov | Nov |
| Dec | Dec |

Building form metrics

| Dimensional | Derived |
|---|---|
| Exposed roof m2 | Floor area (real terms) |
| Exposed roof % ext surface | Volume |
| Rooflights m2 | No. floors |
| Rooflights % ext surface | No of model spaces |
| Windows m2 | No of rooms (ht > 1.5m, with occupancy?) |
| Windows % ext surface | Core to perimeter % |
| Walls m2 | Envelope / skin dominated |
| Walls % ext surface | Occupied hours when int load dominates |
| Exposed floor m2 | Occupied hours when skin load dominates |
| Exposed floor % ext surface | Surface / volume ratio |
| Ground floor m2 | Surface / volume ratio range min |
| Ground floor % ext surface | Surface / volume ratio range max |
| Total ext surface area m2 | Spaces (all pts within 7.5m of window/door) |
| Total windows / wall % | Internal linked spaces % |
| Total rooflights / roof % | Internal spaces % |
| Glazing % north | Single sided spaces % |
| Glazing % south | Two sided spaces % |
| Glazing % east | Three sided spaces % |
| Glazing % west | Four + sided spaces % |
| Glazing % roof | Solar exposure: TBC |
| Window opening area % (wall or floor) | summary metrics |
| Bldg average window head ht (afl) | |
| Bldg average storey ht m | |
| Bldg average width m | |

Building thermal metrics

| Type | Building construction | Building templates |
|---|---|---|
| Building type | Insulation o/a (medium, high, super) | Number of templates in use in model |
| Bldg type critical: Hospital, emergency service, pool etc | Insulation average U value roof | List: only templates assigned in model |
| Net lettable % | Insulation average U value wall | Template name |
| Occupant total | Insulation average U value window | + Type |
| Occupant density (average over occupied) | Insulation average U value rooflight | + System |
| Occupancy daily hours (90%) | Insulation average U value exp floor | + System aux vent |
| Occupancy annual hours in use | Insulation average U value grnd floor | + System dhw |
| Thermal mass class (light, medium, heavy) | Glass shading factor o/a (solar G) | + Heat profile |
| Solar load | Glass shading factor avg North | + Heat set-point |
| Air leakage | Glass shading factor avg South | + DHW consumption |
| Internal load | Glass shading factor avg East | + Cool profile |
| Heat loss parameter | Glass shading factor avg West | + Cool set-point |
| Building Energy Index – hrs of use – monthly breakdown – 12 months x 5 energy types | Glass shading factor avg rooflight | + Aux energy profile |
| Building Carbon Index hrs of use – monthly breakdown – 12 months x 5 energy types | External shades y/n | + RH min |
| | Internal shades y/n | + RH max |
| | Air tightness o/a volume weighted | + People m2/p (sum) |
| | | + People gains w/m2 (sum) |
| | | + Light gains (sum) |
| | | + Equip gains (sum) |
| | | + Infil (sum) |
| | | + Aux vent (sum) |
| | | + No. rooms assigned to type |
| | | + Room area as % assigned to type |

FIGURE 3C (Continued)

Building thermal metrics

| Building openings | Building renewables | Building systems |
|---|---|---|
| Number of windows / doors in model | List: only renewables assigned in model | Number of systems in use in model |
| Number of opening windows / doors | Renewable name<br>+ Size<br>+ etc | List: only systems assigned in model |
| List: only types assigned in model | | System name<br>+ Heat Scop<br>+ Heat fuel<br>+ HX %<br>+ Cool SSEER<br>+ Aux energy kwh/m2.yr<br>+ No. rooms assigned to type<br>+ Room area as % assigned to type |
| Macroflo type<br>+ No. of windows/doors assigned to type<br>+ Total area for type<br>+ Total max free area m2 by type | | Specific climate / bldg notes |
| Sum free area for all types m2<br>+ as % of floor area | | Climate / building derived strategy advice:<br>(see page 10)<br>Aircon      y/n<br>Mixed mode   y/n<br>Natvent      y/n |
| | | Climate / building derived system advice:<br>(see page 11)<br><br>List of viable options |

Building thermal metrics

| Building loads |
|---|
| Peak rooms heating load |
| Peak hot water |
| Peak boiler load |
| Bldg peak heating load breakdown -- by end use inc envelope |
| What dominates room heating: no rooms by category: Conduction, Ventilation Infiltration Humidification |
| Peak rooms sensible cool load |
| Peak dehum load |
| Peak chiller load |
| What dominates cooling: no rooms by category: Solar Conduction Int gains Ventilation Infiltration Dehumid |
| Bldg peak cooling load breakdown -- by end use inc envelope |
| Cooling airflow rate o/a l/s.m2 |

| Building comfort |
|---|
| No rooms < -0.5 PMV |
| No rooms > 0.5 PMV |
| Max temp any occupied room |
| Min temp any occupied room |
| Max RH any room |
| No rooms failing Ashrae 55 % |
| No rooms x hrs exceeding 30degC |
| No rooms x hrs exceeding 28degC |
| No rooms x hrs exceeding 25degC |

| Building energy performance |
|---|
| Bldg energy intensity kwh/m2.yr |
| 2030 target energy intensity kwh/m2.yr |
| 2030 pass / fail |
| 2030 year standard met |
| Bldg energy breakdown by end use kwh/m2.yr |

| Building carbon performance |
|---|
| Carbon factors used in model |
| Bldg carbon intensity kgCO2/m2.yr |
| Bldg carbon breakdown by end use kwh/m2.yr |
| UK Part L carbon actual kgCO2/m2.yr |
| UK Part L carbon notional kgCO2/m2.yr |
| PRM metrics? |

FIGURE 3D

Building light metrics

Daylight performance | Light performance

FIGURE 3F

Sustainability metrics

LEED USA credits

Daylight
Comfort
Ventilation
Water
Energy/carbon
LZCT

LEED India credits

Daylight
Comfort
Ventilation
Water
Energy/carbon
LZCT

Greenstar AUS credits

Daylight
Comfort
Ventilation
Water
Energy/carbon
LZCT

Building materials

Number of windows/doors in model
Number of opening windows/doors
List: only types assigned in model
Macrolla types
*No. of wondows/doors assigned to type
*Total area for types
*Total max free area m2 by types
Sum free area for all types m2.
*as % of floor area

Greenstar SA credits

Daylight
Comfort
Ventilation
Water
Energy/carbon
LZCT

BREEM credits

Daylight
Comfort
Ventilation
Water
Energy/carbon
LZCT

Greenstar ANZ credits

Daylight
Comfort
Ventilation
Water
Energy/carbon
LZCT

400 → Building metrics

| | Properties | Hot & humid | Hot & humid | | Warm & humid |
|---|---|---|---|---|---|
| 440 Climate | Climate zone Ashrae | 1A | 1A | 2A | 3A |
| | Climate zone K-G | Af Am Aw | Aw | | |
| | Summer type | | | | |
| | Winter type | | | | |
| | Diurnal range | | 4 or more months > 10C in warmest 6 months | | |
| 435 Bldg type | Building type | | | | |
| | Building sub-type | | | | |
| | Bldg type critical Hospital, Emergency Service, Pool, etc. | No | No | No | No |
| | Climate Index (same hrs.) | | | | |
| | Bldg Climate index (same hrs) | | | | |
| 430 Loads | Skin/Internal load dominated | Skin | Skin | Skin | |
| | Solar load (peak) | | | | |
| | Vent load (winter peak) | | | | |
| | Cooling load (peak) | | | | |
| | Heating load (peak) | | | | |
| | Fresh air l/s.m2 | | | | |
| 425 Usage | Critical usage | | | | |
| | Occupancy density | | | | |
| | Occupancy hours (hrs/day) | < 16 hrs | < 16 hrs | < 16 hrs | < 16 hrs |
| | Occupancy days (days/week) | | | | |
| | Occupancy year (day/year) | | | | |
| | Comfort (cooling setpoint max) | > 25 C | > 25 C | > 25 C | > 25 C |
| 420 Form | No. floors | | | | |
| | Floor area | | | | |
| | Net lettable % | | | | |
| | Core to perimeter % | | | | |
| | Glass / wall % | | | | |
| | Surface / volume ratio (hi is dispensed, lo is compact) | > 0.7 | > 0.7 | > 0.7 | > 0.5 |
| | Building width | < 10m | < 10m | < 10m | < 20m |
| | Cellularisation (Double sided radio) | > 70% | > 70% | > 70% | > 70% |
| | Headroom | > 3m | > 3m | > 3m | > 3m |
| | Window head ht. | | | | |
| | Window opening area % (wall or floor) | | | | |
| 415 Construction | Heat loss parameter | | | | |
| | Air tightness | | | | |
| | Thermal mass (light, medium, heavy) | L | M / H | L / M / H | M / H |
| | Insulation (medium, high, super) | | | | |
| | Glass shading factor (solar G) | | | | |
| 410 System filter | Natvent (If all conditions above = Yes = true, then Yes) (Detail selection via HVAC method) | Yes | Yes | Yes | Yes |
| | Mixed mode (If all conditions above = Yes = true, then Yes) (Detail selection via HVAC method) | No | No | No | No |
| | Aircon (Detail selection via HVAC method) | Yes | Yes | Yes | Yes |

Base matches – unassigned parameters are NULL – these are used as "match patterns"

Fig. 4A (Continued)

| Properties | Hot & humid | Hot & humid | | Warm & humid |
|---|---|---|---|---|
| | 1A | 1A | 2A | 3A |
| 405 — Notes: Specific notes that are output in the reportage To be read in conjunction with design advice reportage from climate module | Adaptive Comfort temps of 26 degC can work in quality office designs in hot humid climates. Space infiltration control is very important for air-con cooling surface condensation control. Air-con volumes most control space humidity. Displacement systems can also provide a useful humidity gradient. Thermal mass is not recommended in equatorial hot & humid climates. | Adaptive Comfort temps of 26 degC can work in quality office designs in hot humid climates. Space infiltration control is very important for air-con cooling surface condensation control. Air-con volumes most control space humidity. Displacement systems can also provide a useful humidity gradient. Thermal mass is not recommended in equatorial hot & humid climates. In less severe locations where diurnal range is significant if can be beneficial. If used it should be insulated & shaded and vent rates need to be high. | Adaptive Comfort temps of 26 degC can work in quality office designs in hot humid climates. Space infiltration control is very important for air-con cooling surface condensation control. Air-con volumes most control space humidity. Displacement systems can also provide a useful humidity gradient. Thermal mass is not recommended in hot & humid climates. In less severe locations where diurnal range is significant if can be beneficial. If used it should be insulated & shaded and vent rates need to be high. | Adaptive Comfort temps of 26 degC can work in quality office designs in warm humid climates. Space infiltration control is very important for air-con cooling surface condensation control. Air-con volumes most control space humidity. Displacement systems can also provide a useful humidity gradient. Thermal mass can be used in warm humid climates. If used it should be insulated & shaded and vent rates need to be good |

Fig. 4B

400 — Building metrics

| | Properties | Hot & Dry | | | |
|---|---|---|---|---|---|
| | | Hot & dry | Warm & dry | Mixed & dry | |
| 440 Climate | Climate zone Ashrae | 1B | 2B | 3B | 4B |
| | Climate zone K-G | | | | |
| | Summer type | | | | |
| | Winter type | | | | |
| | Diurnal range | | | | |
| 435 Bldg type | Building type | | | | |
| | Building sub-type | | | | |
| | Bldg type critical Hospital, Emergency Service, Pool, etc. | No | No | No | No |
| | Climate index (same hrs.) | | | | |
| | Bldg Climate index (same hrs) | | | | |
| 430 Loads | Skin/Internal load dominated | | | | |
| | Solar load (peak) | | | | |
| | Vent load (winter peak) | | | | |
| | Cooling load (peak) | | | | |
| | Heating load (peak) | | | | |
| | Fresh air l/s.m2 | | | | |
| 425 Usage | Critical usage | | | | |
| | Occupancy density | | | | |
| | Occupancy hours (hrs/day) | < 16 hrs | < 16 hrs | < 16 hrs | < 16 hrs |
| | Occupancy days (days/week) | | | | |
| | Occupancy year (day/year) | | | | |
| | Comfort (cooling setpoint max) | > 25 C | > 25 C | > 25 C | > 25 C |
| 420 Form | No. floors | | | | |
| | Floor area | | | | |
| | Net lettable % | | | | |
| | Core to perimeter % | | | | |
| | Glass / wall % | | | | |
| | Surface / volume ratio (hi is dispersed, lo is compact) | <0.3 | <0.3 | <0.3 | <0.3 |
| | Building width | <20m | <20m | <20m | <20m |
| | Celluarisation (Double sided ratio) | >50% | >50% | >50% | >50% |
| | Headroom | > 3m | > 3m | > 3m | > 3m |
| | Window head ht. | | | | |
| | Window opening area % (wall or floor) | | | | |
| 415 Construction | Heat loss parameter | | | | |
| | Air tightness | | | | |
| | Thermal mass (light, medium, heavy) | H | H | H | H |
| | Insulation (medium, high, super) | H | H | H | H |
| | Glass shading factor (solar G) | | | | |
| 410 System filter | Natvent (If all conditions above = Yes = true, then Yes) (Detail selection via HVAC method) | Yes | Yes | Yes | Yes |
| | Mixed mode (If all conditions above = Yes = true, then Yes) (Detail selection via HVAC method) | Yes | Yes | Yes | Yes |
| | Aircon (Detail selection via HVAC method) | Yes | Yes | Yes | Yes |

Base matches – unassigned parameters are NULL – these are used as "match patterns"

Fig. 4B (Continued)

| Properties | Hot & Dry | | | |
|---|---|---|---|---|
| | Hot & dry | Warm & dry | Mixed & dry | |
| 405 — Notes: Specific notes that are output in the reportage To be read in conjunction with design advice reportage from climate module | High thermal mass coupled with nigh ventilation is an ideal solution in this climate. High daytime temperatures and solar loads limit Natvent and Mixed mode designs. Displacement systems can also provide a useful humidity gradient. Evaporative cooling is very effective. Space infiltration control is important for day time heat control. Heat recovery is potentially important as daytime temperatures are much higher internal conditions. | High thermal mass coupled with nigh ventilation is an ideal solution in this climate. High daytime temperatures and solar loads limit Natvent and Mixed mode designs. Displacement systems can also provide a useful humidity gradient. Evaporative cooling is very effective. Space infiltration control is important for day time heat control. Heat recovery is potentially important as daytime temperatures are much higher internal conditions. | Thermal mass coupled with nigh ventilation is an ideal solution in this climate. Moderate summer daytime temperatures and mild nights make Natvent and Mixed mode designs valuable. Although mild winters favor natural designs. Displacement systems can also provide a useful temperature gradient. Possible higher humidities than more defined hot & dry climate make evaporative cooling less valuable. | High thermal mass coupled with nigh ventilation is an ideal solution in this climate. High daytime temperatures and cool nights make Natvent and Mixed mode designs useful. Displacement systems can also provide a useful humidity gradient. Evaporative cooling is effective. Space infiltration control is important summer and winter nights. Heat recovery is potentially important summer and winter. |

Fig. 4C

| | Building metrics | | Hot humid / cold winter | |
|---|---|---|---|---|
| | | Properties | Mixed humid | |
| 440 | Climate | Climate zone Ashrae | 4A | 4A |
| | | Climate zone K-G | | |
| | | Summer type | V hot or Hot or Hot/Warm or Warm | |
| | | Winter type | | Sever or Cold or Mild |
| | | Diurnal range | | |
| 435 | Bldg type | Building type | | |
| | | Building sub-type | | |
| | | Bldg type critical Hospital, Emergency Service, Pool, etc. | No | No |
| | | Climate index (same hrs.) | | |
| | | Bldg Climate index (same hrs) | | |
| 430 | Loads | Skin/Internal load dominated | | |
| | | Solar load (peak) | | |
| | | Vent load (winter peak) | | |
| | | Cooling load (peak) | | |
| | | Heating load (peak) | | |
| | | Fresh air l/s.m2 | | |
| 425 | Usage | Critical usage | | |
| | | Occupancy density | | |
| | | Occupancy hours (hrs/day) | < 16 hrs | < 16 hrs |
| | | Occupancy days (days/week) | | |
| | | Occupancy year (day/year) | | |
| | | Comfort (cooling setpoint max) | > 25 C | > 25 C |
| 420 | Form | No. floors | | |
| | | Floor area | | |
| | | Net lettable % | | |
| | | Core to perimeter % | | |
| | | Glass / wall % | | |
| | | Surface / volume ratio (hi is dispensed, lo is compact) | >0.5 | >0.3 |
| | | Building width | <20m | <20m |
| | | Cellularisation (Double sided radio) | >70% | >40% |
| | | Headroom | > 3m | > 3m |
| | | Window head ht. | | |
| | | Window opening area % (wall or floor) | | |
| 415 | Construction | Heat loss parameter | | |
| | | Air tightness | | |
| | | Thermal mass (light, medium, heavy) | M / H | M / H |
| | | Insulation (medium, high, super) | | H / S |
| | | Glass shading factor (solar G) | | |
| 410 | System filter | Natvent (If all conditions above = Yes = true, then Yes) (Detail selection via HVAC method) | Yes | Yes |
| | | Mixed mode (If all conditions above = Yes = true, then Yes) (Detail selection via HVAC method) | No | Yes |
| | | Aircon (Detail selection via HVAC method) | Yes | Yes |

400

Base matches -- unassigned parameters are NULL. -- these are used as "match patterns"

Fig. 4C (Continued)

| Properties | | Hot humid / cold winter | |
| --- | --- | --- | --- |
| | | Mixed humid | |
| 405 | Notes | Specific notes that are output in the reportage To be read in conjunction with design advice reportage from climate module | Adaptive Comfort temps >26 degC can work in quality office designs in warm humid summers.<br><br>Space infiltration control is very important for air-con cooling surface condensation control. Air-con volumes most control space humidity. Displacement systems can also provide a useful humidity gradient.<br><br>Thermal mass can be used in warm humid climates. If used it should be insulated & shaded and vent rates need be good. | High mass is a good solution in this climate. Take care with high mass on upper floors, convection from lower floor may cause overheating.<br><br>In the winter prevent draught & asymmetric discomfort. Infiltration control is very important for reducing heat loss.<br><br>Mixed mode designs respond well to cold winter & hot summer seasons with cool summer nights. Heat recovery is very important in the winter. Heating will typically dominate form with a tendency to compact designs. |

Fig. 4D

| | | Properties | Temperate | | |
|---|---|---|---|---|---|
| 400 | | Building metrics | Warm Marine | Mixed Marine | Cool Marine |
| 440 | Climate | Climate zone Ashrae | 3C | 4C | 5C |
| | | Climate zone K-G | | | |
| | | Summer type | | | |
| | | Winter type | | | |
| | | Diurnal range | | | |
| 435 | Bldg type | Building type | | | |
| | | Building sub-type | | | |
| | | Bldg type critical Hospital, Emergency Service, Pool, etc. | No | No | No |
| | | Climate Index (same hrs.) | | | |
| | | Bldg Climate index (same hrs) | | | |
| 430 | Loads | Skin/Internal load dominated | | | |
| | | Solar load (peak) | | | |
| | | Vent load (winter peak) | | | |
| | | Cooling load (peak) | | | |
| | | Heating load (peak) | | | |
| | | Fresh air l/s.m2 | | | |
| 425 | Usage | Critical usage | | | |
| | | Occupancy density | | | |
| | | Occupancy hours (hrs/day) | < 16 hrs | < 16 hrs | < 16 hrs |
| | | Occupancy days (days/week) | | | |
| | | Occupancy year (day/year) | | | |
| | | Comfort (cooling setpoint max) | > 25 C | > 25 C | > 25 C |
| 420 | Form | No. floors | | | |
| | | Floor area | | | |
| | | Net lettable % | | | |
| | | Core to perimeter % | | | |
| | | Glass / wall % | | | |
| | | Surface / volume ratio (hi is dispensed, lo is compact) | >0.4 | >0.3 | >0.2 |
| | | Building width | <20m | <20m | <20m |
| | | Cellularisation (Double sided radio) | >40% | >30% | |
| | | Headroom | > 3m | > 3m | > 3m |
| | | Window head ht. | | | |
| | | Window opening area % (wall or floor) | | | |
| 415 | Construction | Heat loss parameter | | | |
| | | Air tightness | | | |
| | | Thermal mass (light, medium, heavy) | M / H | M / H | L / M / H |
| | | Insulation (medium, high, super) | H | H | H / S |
| | | Glass shading factor (solar G) | | | |
| 410 | System filter | Natvent (If all conditions above = Yes = true, then Yes) (Detail selection via HVAC method) | Yes | Yes | Yes |
| | | Mixed mode (If all conditions above = Yes = true, then Yes) (Detail selection via HVAC method) | Yes | Yes | Yes |
| | | Aircon (Detail selection via HVAC method) | Yes | Yes | Yes |

Base matches – unassigned parameters are NULL – these are used as "match patterns"

Fig. 4D (Continued)

| Properties | Warm Marine | Temperate Mixed Marine | Cool Marine |
|---|---|---|---|
| 405 — Notes — Specific notes that are output in the reportage To be read in conjunction with design advice reportage from climate module | High mass is a good solution in this climate. Take care with high mass on upper floors, convection from lower floor may cause overheating.<br><br>In the winter prevent draught & asymmetric discomfort.<br><br>Natural designs respond well to mild winter & summer seasons with mild summer nights. (Mediterranean)<br><br>Summer cooling may dominate form although it is less important than for more extreme hot or cold climates. | High mass is a good solution in this climate. Take care with high mass on upper floors, convection from lower floor may cause overheating.<br><br>In the winter prevent draught & asymmetric discomfort. Infiltration control is important for reducing heat loss.<br><br>Natural & Mixed mode designs respond well to mild winter & summer seasons with mild cool summer nights. Summer cooling may dominate form although heating is significant. Heat recovery in the winter should be considered. | High mass is a good solution in this climate. Take care with high mass on upper floors, convection from lower floor may cause overheating.<br><br>In the winter prevent draught & asymmetric discomfort. Infiltration control is important for reducing heat loss.<br><br>Mixed mode designs respond well to mild winter & short cool summer seasons with cool summer nights. Heat recovery is important in the winter. Heating will typically dominate form with a tendency to compact designs. |

Fig. 4E

| | | Properties | Cold | | |
|---|---|---|---|---|---|
| | | | Cool Humid | Cool Dry | Cold Humid |
| 440 | Climate | Climate zone Ashrae | 5A | 5B | 6A |
| | | Climate zone K-G | | | |
| | | Summer type | Hot or Warm | Hot or Warm | Hot or Warm |
| | | Winter type | | | |
| | | Diurnal range | | | |
| 435 | Bldg type | Building type | | | |
| | | Building sub-type | | | |
| | | Bldg type critical Hospital, Emergency Service, Pool, etc. | No | No | No |
| | | Climate Index (same hrs.) | | | |
| | | Bldg Climate index (same hrs) | | | |
| 430 | Loads | Skin/Internal load dominated | | | |
| | | Solar load (peak) | | | |
| | | Vent load (winter peak) | | | |
| | | Cooling load (peak) | | | |
| | | Heating load (peak) | | | |
| | | Fresh air l/s.m2 | | | |
| 425 | Usage | Critical usage | | | |
| | | Occupancy density | | | |
| | | Occupancy hours (hrs/day) | < 16 hrs | < 16 hrs | < 16 hrs |
| | | Occupancy days (days/week) | | | |
| | | Occupancy year (day/year) | | | |
| | | Comfort (cooling setpoint max) | > 25 C | > 25 C | > 25 C |
| 420 | Form | No. floors | | | |
| | | Floor area | | | |
| | | Net lettable % | | | |
| | | Core to perimeter % | | | |
| | | Glass / wall % | | | |
| | | Surface / volume ratio (hi is dispensed, lo is compact) | >0.3 | >0.3 | >0.3 |
| | | Building width | <20m | <20m | <20m |
| | | Cellularisation (Double sided radio) | >40% | >40% | >40% |
| | | Headroom | > 3m | > 3m | > 3m |
| | | Window head ht | | | |
| | | Window opening area % (wall or floor) | | | |
| 415 | Construction | Heat loss parameter | | | |
| | | Air tightness | | | |
| | | Thermal mass (light, medium, heavy) | M / H | M / H | L / M / H |
| | | Insulation (medium, high, super) | H / S | H / S | H / S |
| | | Glass shading factor (solar G) | | | |
| 410 | System filter | Natvent (If all conditions above = Yes = true, then Yes) (Detail selection via HVAC method) | Yes | Yes | Yes |
| | | Mixed mode (If all conditions above = Yes = true, then Yes) (Detail selection via HVAC method) | Yes | Yes | Yes |
| | | Aircon (Detail selection via HVAC method) | Yes | Yes | Yes |

400 — Building metrics

Base matches -- unassigned parameters are NULL -- these are used as "match patterns"

Fig. 4E (Continued)

| Properties | Cold | | |
| --- | --- | --- | --- |
| | Cool Humid | Cool Dry | Cold Humid |
| 405 Notes: Specific notes that are output in the reportage To be read in conjunction with design advice reportage from climate module | High mass is a good solution in this climate. Take care with high mass on upper floors, convection from lower floor may cause overheating.<br><br>In the winter prevent draught & asymmetric discomfort. Infiltration control is very important for reducing heat loss.<br><br>Mixed mode designs respond well to cold winter & hot summer seasons with cool summer nights. Heat recovery is very important in the winter. Heating will typically dominate form with a tendency to compact designs. | High mass is a good solution in this climate. Take care with high mass on upper floors, convection from lower floor may cause overheating.<br><br>In the winter prevent draught & asymmetric discomfort. Infiltration control is very important for reducing heat loss.<br><br>Mixed mode designs respond well to cold winter & hot summer seasons with cool summer nights. Heat recovery is very important in the winter. Heating will typically dominate form with a tendency to compact designs. | High mass is a good solution in this climate. Take care with high mass on upper floors, convection from lower floor may cause overheating.<br><br>In the winter prevent draught & asymmetric discomfort. Infiltration control is very important for reducing heat loss.<br><br>Mixed mode designs respond well to cold winter & hot summer seasons with cool summer nights. Heat recovery is very important in the winter. Heating will typically dominate form with a tendency to compact designs. |

Fig. 4F

| Building metrics 400 | | | Cold | | |
|---|---|---|---|---|---|
| | Properties | | Cold Dry | Very Cool | Subarctic |
| 440 | Climate | Climate zone Ashrae | 6B | 7 | 8 |
| | | Climate zone K-G | | | |
| | | Summer type | Hot or Warm | | |
| | | Winter type | | | |
| | | Diurnal range | | | |
| 435 | Bldg type | Building type | | | |
| | | Building sub-type | | | |
| | | Bldg type critical Hospital, Emergency Service, Pool, etc. | No | | |
| | | Climate index (same hrs.) | | | |
| | | Bldg Climate index (same hrs) | | | |
| 430 | Loads | Skin/internal load dominated | | | |
| | | Solar load (peak) | | | |
| | | Vent load (winter peak) | | | |
| | | Cooling load (peak) | | | |
| | | Heating load (peak) | | | |
| | | Fresh air l/s.m2 | | | |
| 425 | Usage | Critical usage | | | |
| | | Occupancy density | | | |
| | | Occupancy hours (hrs/day) | < 16 hrs | | |
| | | Occupancy days (days/week) | | | |
| | | Occupancy year (day/year) | | | |
| | | Comfort (cooling setpoint max) | > 25 C | | |
| 420 | Form | No. floors | | | |
| | | Floor area | | | |
| | | Net lettable % | | | |
| | | Core to perimeter % | | | |
| | | Glass / wall % | | | |
| | | Surface / volume ratio (hi is dispensed, lo is compact) | >0.3 | | |
| | | Building width | <20m | | |
| | | Cellularisation (Double sided radio) | >40% | | |
| | | Headroom | > 3m | | |
| | | Window head ht. | | | |
| | | Window opening area % (wall or floor) | | | |
| 415 | Construction | Heat loss parameter | | | |
| | | Air tightness | | | |
| | | Thermal mass (light, medium, heavy) | M / H | | |
| | | Insulation (medium, high, super) | S | | |
| | | Glass shading factor (solar G) | | | |
| 410 | System filter | Natvent (If all conditions above = Yes = true, then Yes) (Detail selection via HVAC method) | Yes | No | No |
| | | Mixed mode (If all conditions above = Yes = true, then Yes) (Detail selection via HVAC method) | Yes | No | No |
| | | Aircon (Detail selection via HVAC method) | Yes | Yes | Yes |

Base matches -- unassigned parameters are NULL -- these are used as "match patterns"

Fig. 4F (Continued)

| Properties | Cold | | |
| --- | --- | --- | --- |
| | Cold Dry | Very Cool | Subarctic |
| 405 Notes — Specific notes that are output in the reportage To be read in conjunction with design advice reportage from climate module | High mass is a good solution in this climate. Take care with high mass on upper floors, convection from lower floor may cause overheating. In the winter prevent draught & asymmetric discomfort. A longer cold winter means Natvent is undesirable. Infiltration control is very important for reducing heat loss. Mixed mode designs respond well to cold winter & hot summer seasons with cool summer nights. Heat recovery is very important in the winter. Heating will typically dominate form with a tendency to compact designs. | Thermal mass has minimal impact except in the instance of passive or intermittent heating systems. In the long cold winter prevent draught & asymmetric discomfort. Infiltration control is critical for reducing heat loss. The short cool summers / cold nights and long cold winter mean that Natvent and Mixed mode designs are not appropriate. Heat recovery is critical. Heating will dominate form with a compact designs. | Thermal mass has minimal impact except in the instance of passive or intermittent heating systems. In the long cold winter prevent draught & asymmetric discomfort. Infiltration control is critical for reducing heat loss. The short cool summers / cold nights and long cold winter mean that Natvent and Mixed mode designs are not appropriate. Heat recovery is critical. Heating will dominate form with a compact designs. |

| 525 Secondary properties to match suitability | | | | | | 530 "Additional Info" only properties | | | |
|---|---|---|---|---|---|---|---|---|---|
| L.s/m2 Min | L.s/m2 Max | Headroom Min m | Headroom Max m | Humid Climate? | Heating w/ m2 Max | Capital $ | Running $ | Flexibility | Whole life cost |
| 0 | 18 | 2.4 | ---- | No | 120 | Low | Low | Low | Low |
| 0 | 36 | 3.0 | ---- | Yes | 120 | Low | Low | Low | Low |
| 0 | 18 | 3.0 | ---- | No | 120 | Low | Low | Med | Low |
| 0 | 18 | 3.0 | 4.5 | No | 60 | Low | Low | Med | Low |
| 0 | 18 | 2.8 | 4.5 | No | 60 | Med | Med | Med | Med |
| 1.5 | 6.0 | 3.0 | 4.5 | No | 120 | Med | Med | Med | Med |
| 2.0 | 4.0 | 3.0 | 4.5 | No | 120 | Med | Med | Med | Med |
| 1.5 | 6.0 | 3.0 | 4.5 | No | 120 | Med | Med | Med | Med |
| 1.5 | 6.0 | 2.8 | 4.5 | No | 60 | Med | Med | Low | Med |
| 1.5 | 6.0 | 2.4 | 6.0 | No | 60 | Med/High | Low | Low | Med |
| 1.5 | 6.0 | 2.8 | 6.0 | No | 60 | High | Low | Low | Med |
| 2.0 | 4.0 | 2.4 | 3.5 | Yes | 40 | Med/High | High | Med | High |
| 3.0 | 10.0 | 2.4 | 25 | Yes* | 600 | High | Med | Med | High |
| 3.0 | 10.0 | 3.5 | 15 | Yes | 40 | Med/High | Med | Med | Med |
| 1.5 | 6.0 | 2.8 | 4.5 | Yes* | 60 | Med/High | Med | Med | Med/High |
| 3.0 | 10.0 | 2.4 | 3.5 | Yes | 120 | Med/High | High | High | Med |
| 6.0 | ---- | 2.4 | 3.5 | Yes | 120 | High | High | Very High | Very High |
| 6.0 | ---- | 2.4 | 4.0 | Yes | 120 | High | Very High | High | High |
| Fresh air 550 | | Headroom = Clear occupied space 555 | | Climate Type A 560 | | | | | |

Fig. 5 (Continued)

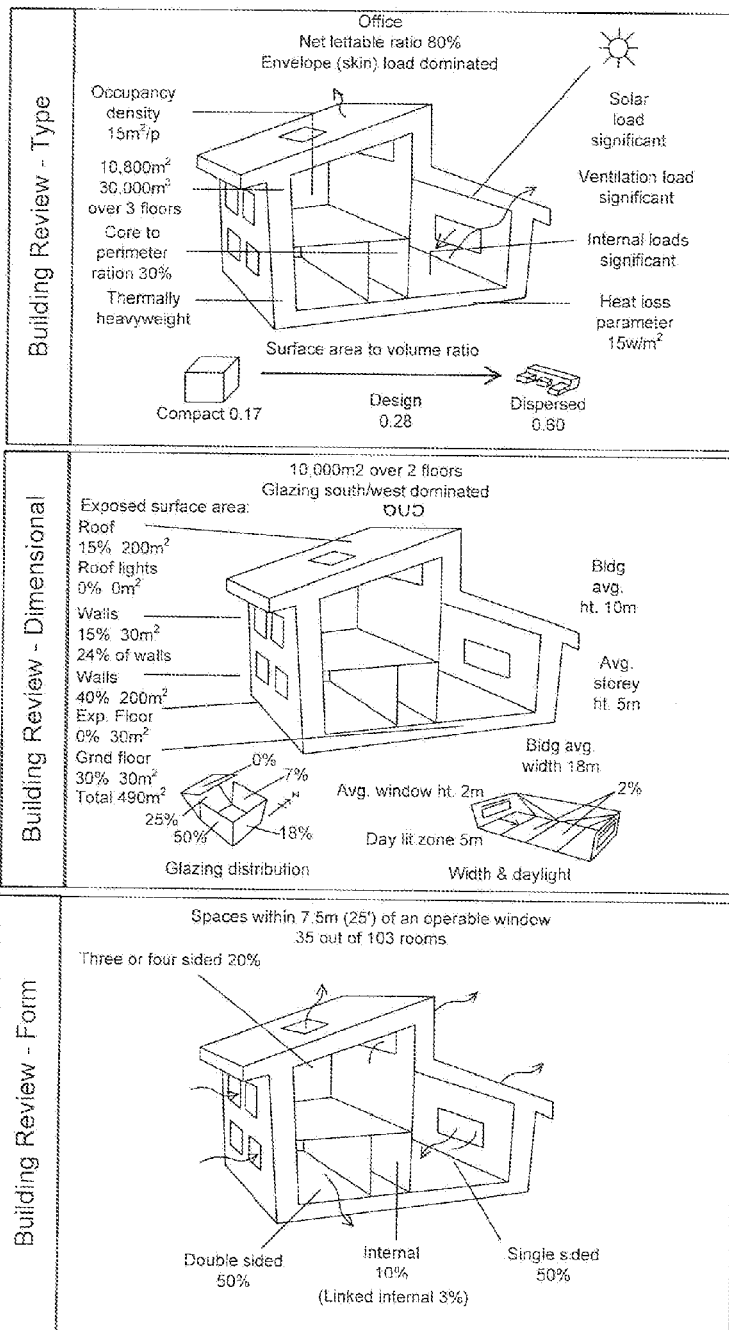

Fig. 6B

City Wharf Dublin.mit
09 / Sep / 2008

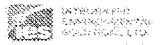

| Contents: | CLIMATE | BUILDING | MATERIALS | ASHRAE 2030 | DAYLIGHT | LEED | BREEAM | GREEN STAR |
|---|---|---|---|---|---|---|---|---|
| | Report | Review | Review | Loads | Challenge Simple | Daylight Energy | Daylight Energy | Daylight Energy |
| | Index | Low / zero tech. | | | Advanced | Comfort Water | Comfort Water | Comfort Water |
| | Resources | Water | | | | Vent LZCT | Vent LZCT | Vent LZCT |

Building metrics

Building Type:

Building Type: Office

This building is *internal load* dominated

Occupied Hours when internal load dominates    5412
Occupied Hours when skin load dominates    422

The building does not involve critical operations: this mean servicing strategies can be of low intensity and/or simple in design/operation

Building Use:

Overall occupancy density – $15m^2/p$ (occ. floor area)
Occupancy – 90% of spaces are occupied:
    - 9:00 to 17:00, 5 days a week Daytime occupation and a good diurnal range suggests the possibility of passive night cooling using thermal mass Building dimensional:

| | |
|---|---|
| Floor Area | $10,800m^2$ |
| No. of floors | 3 |
| Average floor to floor height | 4m |
| Net. lettable area ration is | 80% |
| Perimeter to core space ration | 30% |
| Exposed surface to volume ratio | 0.28 |
| Glass area ...... of ext. wall | 32% |
|     of floor area | 20% |

Building form:

Total number of occupied spaces    103

Types of space:

| | |
|---|---|
| internal | 10% |
| Single sided | 20% |
| Double sided | 50% |
| Three & four sided | 20% |

Number of spaces where any point is within 7.5m (25') of an operable window    35

Opening window area of occupied floor area 5.5%

Thermal mass    heavyweight

Heat loss parameter    $15 w/m^2$ floor area / °C
(all losses inc. vent)

With an average window height of 2m work day light (2% DLF) is roughly limited to approx 5m in from the facade

---

Building are often described as either envelope (skin) or internally loaded; these descriptions characterize the dominant heat exchange in the building.

Similarly ventilation, casual, solar loads and how the building is used add detail and help in defining appropriate responses Critical use or night occupied building limit responses e.g. night purge ventilation, relaxed summer design set points etc.

The overall form of the building can be a response to these characteristics and to the climate type; high surface area building lose heat faster and thus suit hot climates better than cold climates Cross ventilation is more effective than single sided ventilation; cross ventilation can occur across the building plan form window to window, across corners, via windows & roof lights or chimneys. The importance of cross ventilation in naturally ventilated designs increases with higher occupancy, higher heat gains and as the climate becomes hotter. In hot and humid climates it is essential.

Floor to ceiling heights of 3m or more promote stratification; with the right HVAC strategy the reduces cooling load. Ceiling heights lower than 3.5m can reduce HVAC system choice. Very tall spaces require special consideration For day lighting purposes glazing % (ext wall) is normally in the range of 15 – 40%; beyond 40% glare and solar gains are a problem. In hot climates lower than optimum glazing areas maybe chosen as heat gains are predominant

City Wharf Dublin.mit
09 / Sep / 2008

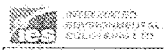

| Contents: | CLIMATE | BUILDING | MATERIALS | ASHRAE 2030 | DAYLIGHT | LEED | BREEAM | GREEN STAR |
|---|---|---|---|---|---|---|---|---|
| | Report | Review | Review | Loads | Challenge Simple | Daylight Energy | Daylight Energy | Daylight Energy |
| | Index | Low / zero tech. | | | Advanced | Comfort Water | Comfort Water | Comfort Water |
| | Resources | Water | | | | Vent  LZCT | Vent  LZCT | Vent  LZCT |

Bioclimatic analysis

Characteristics:

San Diego TMY2.fwt has a climate classification of ASHRAE 3B (KG BSk); it has a warm-dry climate that is dominated by summer; the design must minimize cooling energy The location is a mild-latitude, thus solar radiation on S/E/W walls is significant. Solar radiation on roofs is also significant.
Summer is warm and has cool nights
Winter is mild
Wind typically is strong midday / afternoon
Rainfall is very low
Dust storms maybe an issue

Guidance – design priorities:

Short summer maybe uncomfortable
Minimize radiant heat risk (solar conduction)
Minimize summer day heating
Maximize summer evening / night cooling rate
Address cold winter day comfort
Address cold winter night comfort
Minimize heat loss
Minimize air infiltration
Minimize day ventilation, maximize night ventilation
Use low humidity potential (evap cooling)
Use solar energy potential
Minimize dust penetration

Guidance – micro-climate:

Locate at bottom of slope (night cold air flows)
East facing (lower solar exposure in afternoons)
Sea or large lake shore breezes (max in afternoon) for summer cooling

Guidance – urban street pattern:

Building orientation to increase street shading (20-30 degrees east of N/S), narrow N/S streets for shade, space E/W streets for solar access, if needed, elongate blocks E/W

Guidance – urban patter:

Compact planning of urban form and shared shade
Urban heat island reduce by height, vegetation, colour, high albedo (esp. roofs, parking)
Street shading – reduces surfaces heating up, shades pedestrians (in humid climates it should not block breezes)
Public urban green areas – heat sinks (transpiration), wind modifiers, filtering / controlling dust, reducing pollution
Public urban water or adjacent upwind (summer) to buildings – heat sinks (evap cool)

Guidance – building macro form:

Compact / clustered plan (minm day heat gain esp. solar)/ permeable at night (increased surface area)
External open access corridors
Outdoor spaces – shades, wetted surfaces, vegetation, control of hot dusty winds

---

What is Bioclimatic analysis?

Put simply it is using an understanding of climate to inform building design

Bioclimatic design is also a modern interpretation of the process of traditional or indigenous architecture Architects find bioclimatic design useful as it informs a natural grammar, engineers can use it to understand the demands, climate imposes on a building and potentially long term climate change effects Bioclimatic issues are diverse and complex; deriving appropriate responses can therefore prove difficult This analysis therefore utilizes user selected weather data to carry out a Bioclimatic analysis and then report appropriate responses It should noted that this analysis cannot know details of any specific site nor local details as it is based solely on weather data.

City Wharf Dublin.mit
09 / Sep / 2008

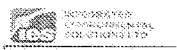

| Contents: | CLIMATE<br>Report<br>Index<br>Resources | BUILDING<br>Review<br>Low / zero tech.<br>Water | MATERIALS<br>Review | ASHRAE 2030<br>Loads | DAYLIGHT<br>Challenge Simple<br>Advanced | LEED<br>Daylight Energy<br>Comfort Water<br>Vent LZCT | BREEAM<br>Daylight Energy<br>Comfort Water<br>Vent LZCT | GREEN STAR<br>Daylight Energy<br>Comfort Water<br>Vent LZCT |

Bioclimatic analysis

Building – internal form:

Activity thermal zoning (segregate heat gains & people, highest activity spaces on coolest facades / levels & vice versa for cold climates)
Open plan design (absolute minimum resistance to air flow)
Buffer zones (tolerate wider temps &/or at certain times of the day) – access spaces, outdoor spaces
Semi-outdoor living spaces (evening / night)

Construction:

High levels of insulation
Earth berming (uses less variable ground temp and less exposure to wind / sun to protect from heat and cold)
Thermal mass – lightweight walls
Thermal mass – lightweight roof, well insulated
Comfort can possibly be achieved with out extensive night vent
Light ext finishes (in humid climates these are difficult to effectively maintain)

Window/openings:

Medium openings, 25-40% of walls (above sill ht, body ht but directable airflow, if at high level directable airflow)
User control of glare, direct sun and passive ventilation openings

Shading / protection:

Control solar / glare off buildings and ground (break up facades etc.)
Near building planting to shade building surfaces, elevate humidity, control wind, lower temp
Effective S, E, W shading / solar protection

Ventilation:

Day minm vent (to minimize day external high temps), nightime maximium ventilation
Stack ventilation (windless days or nights, most effective on taller buildings, esp. for hot humid-tropical 1A) (take care with winter leakage/volume control)
Wind catchers (Malkaf) to capture breezes at roof level esp. in dense urban patterns for summer cooling.
Designed to match the degree of directional variability of local winds (number of opening sides). Some hot dry regions have strong night winds that utilized.
Taller spaces (stratification and space for air movement fans – upto 1.5m/s)
Wing wall to improve single sided / two adjacent sided ventilation with wind angles down to 15degC

Passive technology:

Earth tubes – air based ground coupled heat / cooling
Light shelves (extended inside and outside) – improve daylight uniformity and provide solar shading

Active technology:

Solar thermal (hot water)
Direct evaporative cooling (gravity operated towers; Cunningham & Thompson or Givoni "Shower")
Ground / water coupling (heat and cool). Air or hydronic based. Depends on ground conditions & building load. Balanced heat/cool load over winter/summer produces the most viable solution. Expert analysis recommended Photovoltaics

---

This analysis does however provide a very useful summary of climatic issues and a suggested list of responses for the purposes of low energy building design. These responses have most value on more natural designs, however they can also inform on designs that are more heavily serviced User should also consider reading seminal texts on the subject to explore these issues in more detail, notably those by Brown & Dekay and Givoni.

Refer to the VE Climate report for weather/climate metrics.

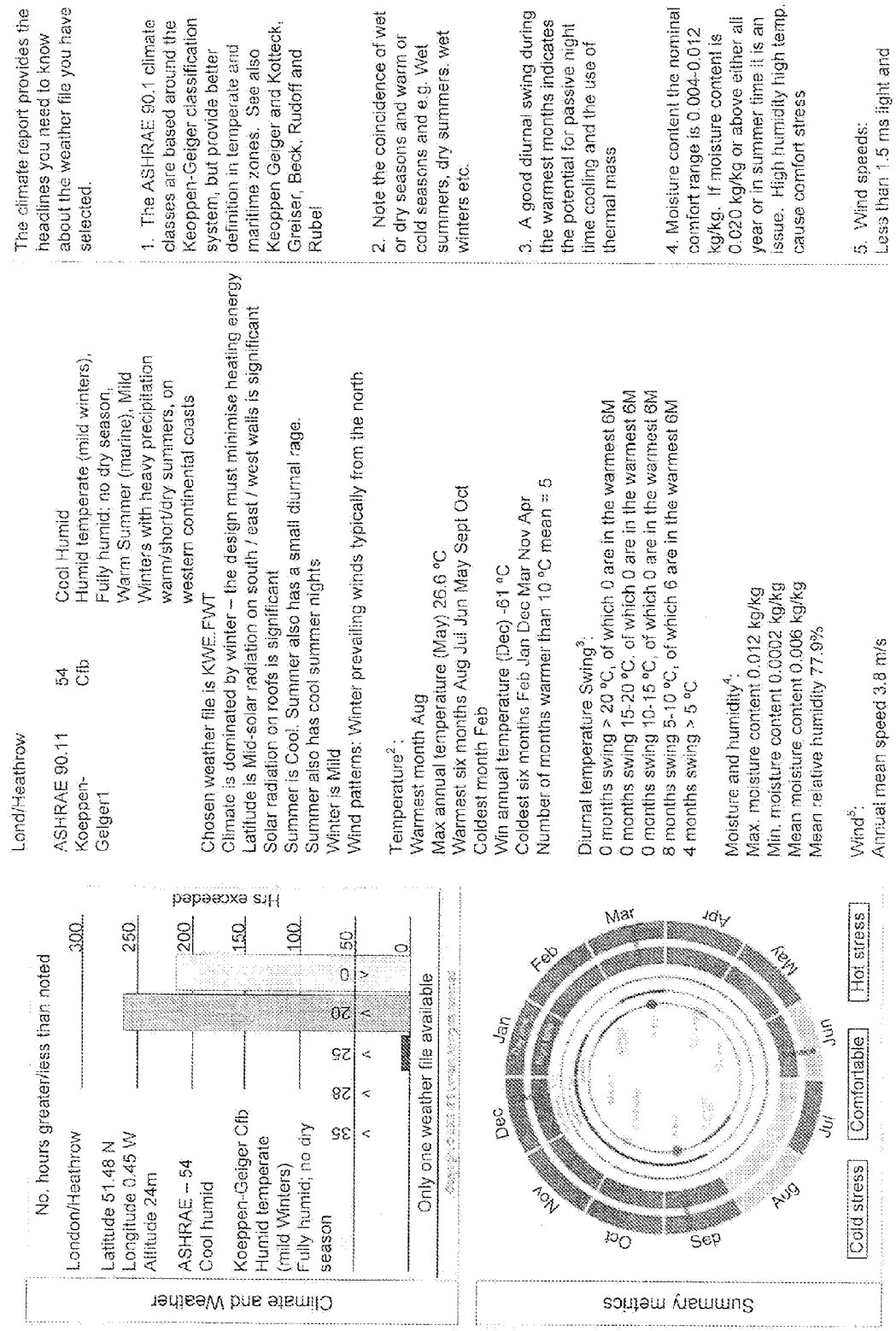
FIG. 10E (Cont) - 1099

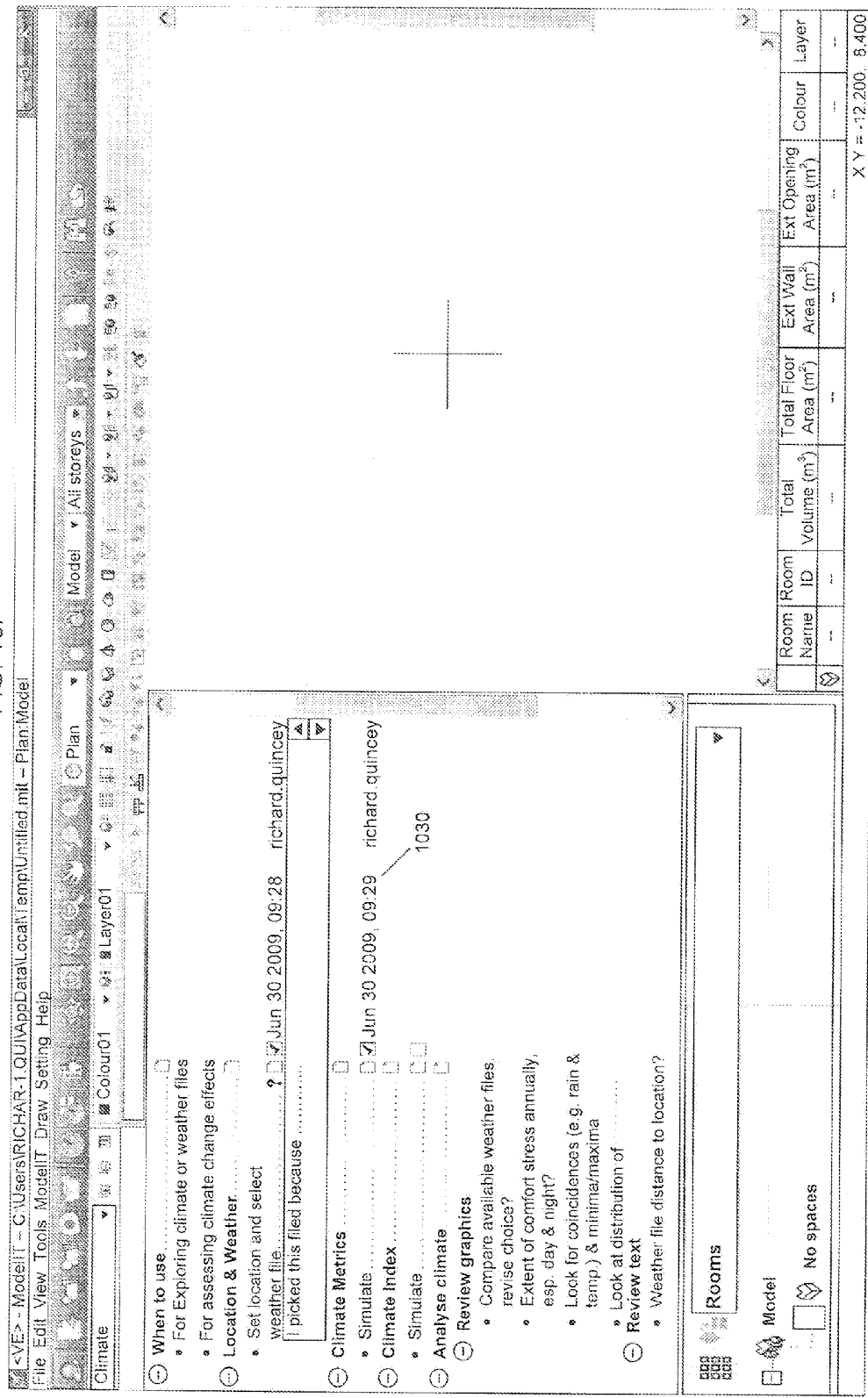

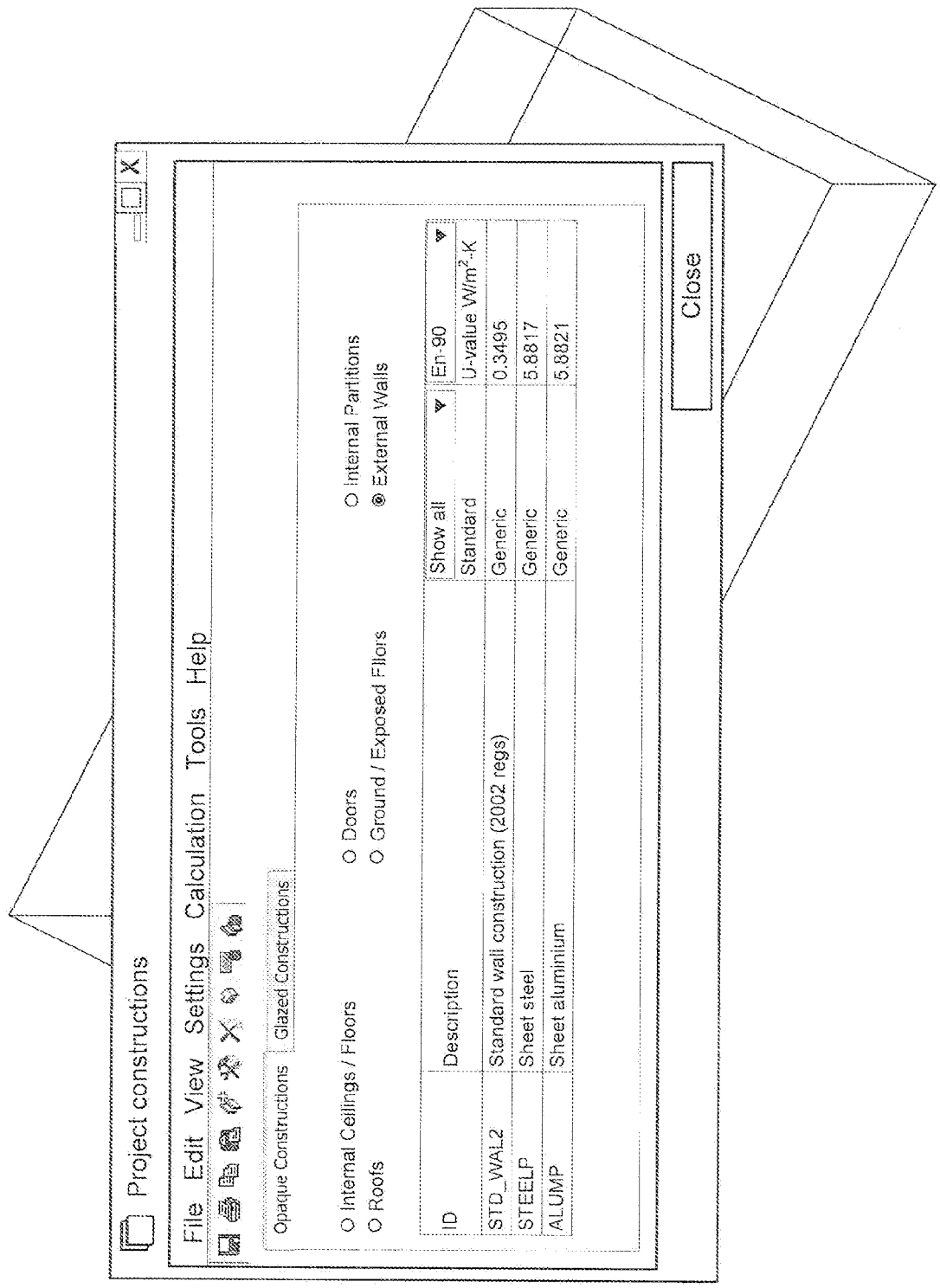
FIG. 10G (Cont) - 1098

FIG. 10J (Cont) – 1097

Analysis Overview

| Analysis # | Date Time | Daylight Illumination (lux) area weighted | Daylight factor | % area over (366 lux) threshold |
|---|---|---|---|---|
| 2 | 06/30/09 09:44:07 | 408.221 | 4.2 | 36.6 |
| 1 | 06/30/09 09:43:39 | 0.000 | 0.0 | 0.0 |

Analysis:
No light penetration through internal windows
Building floor area 139 m²
Selected room area 139 m²
1 active spaces; 1 are identified as occupied rooms
External windows area % of ext wall 40%

Result:
4.2% average Daylight factor
36.6% area over 269 lux threshold

Analysis Overview

Room by room last analysis:
Utilise the floor by floor images and room by room analysis table (with sort options) to assess improvements to rooms with % area results between 50 to 75 %; these rooms could be candidates for adjustment

Notes:
It should be noted that this type of analysis (overcast sky) is not suitable for devices such as light shelves; users are advised to use radiance with a sunny sky for this type of scenario This analysis does not include an analysis of atria spaces (if selected they will not be treated or tested separately); it is recommended the user carry out a radiance analysis for such spaces. Compliance for such spaces is required to achieve the credit

Analysis details:
Location: London/Heathrow, United Kingdom
(51.48 N, 0.45 W)
Calculated: 06/30/09  09:44:07
Sky Model: CIE Overcast Sky
Working Plane: 0.762 m
Grid Size: 0.610 m

Analysis Overview

| Room name | Floor | Work-ing Plane (m) | % area over (269 lux) | Aver-age day-light (lux) | Aver-age day-light factor % | Uniform-ity ratio |
|---|---|---|---|---|---|---|
| Sort A-Z | HVLo | HVLo | HVLo | HVLo | HVLo | HVLo |
| Apply | | 0.8 | 75 | 300 | 2 | 0.5 |

The daylight analysis provides an indication of daylight performance against a fixed threshold Things to consider:

Increasing the amount of glazing should be assessed as trade off with energy consumption (heat loss and solar gain)

Evaluate the size and shape of glazing; glass below desk height has very little value; glass at high level close to light coloured soffits can improve light penetration and surface contrast Glass selection, especially solar glass, can significantly affect visible light transmittance (Tvis); modern solar glass now offers better light transmission with good solar performance Daylight is a perception metric; large contrasts in daylight in rooms reduces the perception of how well the whole room is day lit; especially consider sufficient day light on ceilings and walls Evaluate other day lighting metrics such as glare; over day lighting spaces can cause glare and lead to blinds down and lights on: the opposite result Consider day lighting with

FIG. 10K (Cont) - 1096

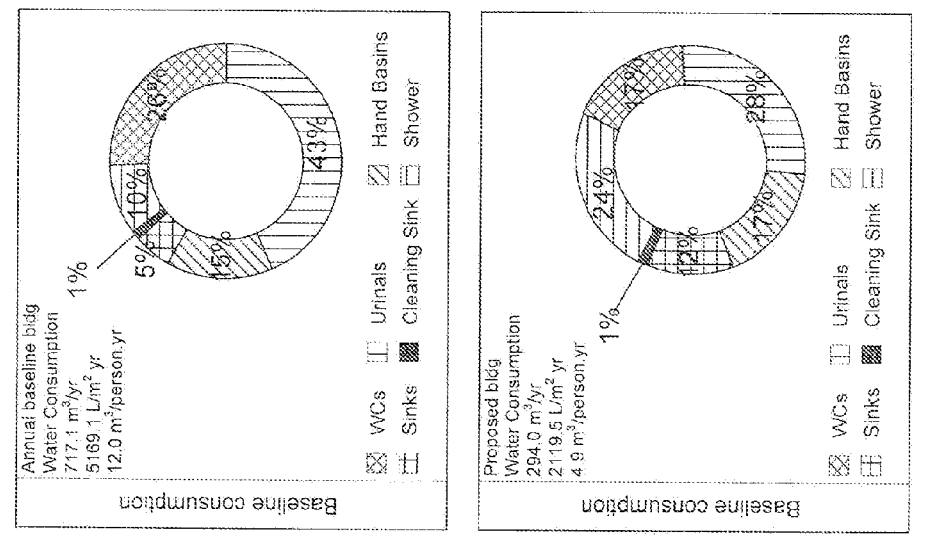

Summary:
Climate 5A/Cfb (Humid temperate (mild winters))
Consider water stress[1]
Building floor area 138.7 m²
Occupants 60
Gender split 50% female / 50% male
Baseline: 717.1 m³/yr
Proposed: 294.0 m³/yr
Water Decreased by: 59.0%

Baseline design[2]:
WCs — Conventional WC (1.0)
Urinals — Conventional Urinal (1.0)
 — Auto Flush (10/50)
Hand Basins — Conventional lavatory (1.0)
Sinks — Kitchen sink (1.0)
Cleaning Sinks — Janitor sink (1.0)
Shower — Conventional shower (1.0)

Proposed design[3]:
WCs — Low flow water closet (1.0)
 — Dual flush full flow (1.0)
Urinals — Low flow urinal (1.0)
 — Unknown (1.0)
 — Auto Flush (10/50)
Hand Basins — Low flow (1.0)
 — Ultra low flow (1.0)
Sinks — Kitchen sink (1.0)
Cleaning Sink — Janitor sink (1.0)
Shower — Conventional shower (1.0)

Rainwater recycling:
Collection Area  500 m²
% Used for WC/SH flushing  100 %
Run off coeff  0.9
Storage tank  17 m³
Days security of supply  20.0

Grey water recycling:
% Used for WC/SH flushing  100 %
% Used for Taps/Shower water collected  75 %
Storage tank  6 m³
Days security of supply  7.0

Notes:

The water review provides an initial indication of the potential for water reduction.

1. What is water stress?

Simply when demand is higher than supply. Lack of supply can be climate, economic or quality driven See – International Water Management Institute and World Water Council for more information:
www.iwmi.cgiar.org/
www.worldwatercouncil.org/index.php?id=25

Building water use is only part of the water cycle story; for every unit of water used in buildings there are significant distribution losses plus the energy in extraction, processing and distribution. Reducing consumption proportionately reduces these elements 2. The calculation produces an approximate baseline design for comparison with user selections.

3. Generally water issues should be tackled through a preference hierarchy:
Efficiency
Rainwater
Grey Water

FIG. 10L (Cont) – 1095

Analysis Overview

| Analysis # | Date Time | No. rooms below PMV -0.5 | No. rooms above PMV -0.5 | Max temp in any room (deg. C) | ASHRAE 55 2004 % rooms pass |
|---|---|---|---|---|---|
| 2 | 06/30/09 09:53:06 | 14 | 14 | 24 | 0% |
| 1 | 06/30/09 10:23:58 | 8 | 14 | 39 | 0% |

Pass/fail requirement

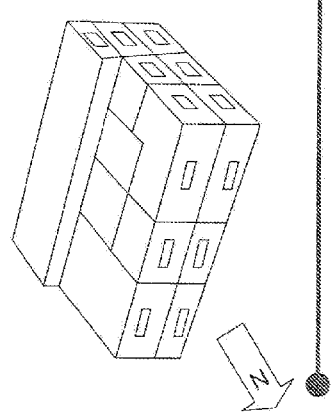

In Analysis

| Room name | Floor | Min occupied room temp (deg. C) | Max occupied room temp (deg. C) | Max room humidity | ASHR 55-200 Pass/fa PMC ch |
|---|---|---|---|---|---|
| Sort A-Z Apply | HVLo | HVLo | HVLo | HVLo | Pass/F |
| G Office 101 | Ground Floor | 20 | 24 | 97 | Fai |
| G Office 102 | Ground Floor | 22 | 24 | 95 | Fai |
| G Office 103 | Ground Floor | 22 | 24 | 95 | Fai |

Analysis:

Leed-NC-2009
Standard: ASHRAE 55 – 2004
Building floor area 660.26m²
Selected room area 660.26m²
No. of spaces in building 16
Selected number of Occupied rooms 14
Regularly occupied hours only
Result:
2... 100% spaces do not meet target Fail
All occupied areas must pass
LEED EQ 7.1: 0 credit

Room by room last analysis:
Utilise the fly around image and room by room analysis table to identify the room(s) that fail the standard.
Failure is likely to be related to insufficient / inappropriate plant or building design issues e.g. excessive glazing, inappropriate room type placing (high heat gain spaces with high solar exposure) or built form/fabric that is not appropriate to the climate.

Notes:
This analysis provides an indicative assessment of the LEED Thermal comfort credit. The VE provides a tested and accredited full dynamic thermal analysi in accordance with ASHRAE 55-2004 section 6.1.1.
This analysis assumes a target PMV range of -0.5 to +0.5; this is equivalent to 10% occupants dissatisfied (PPD) as indication in the ASHRAE Standard (table 5.5.1.2).
PMV -0.5 to +0.5 is a relatively narrow band of conditions (about 5°C/89°F Wide) in typical conditions. Conditions outside of approximately 19 to 24°C (66 to 75°F) will typically fail the PMV check.
If RH control is ON in the space template (Percentage Saturation is not default 0 and 100%), comfort is only achieved if the max moisture content is less than 0.012 kg/kg AND PMV is -0.5 to +0.5.
This analysis reports in PMV, temperature and relative humidity, thus providing a data rich report with which to assess and iterate the model.
PMV acts as a range test indicating how the building as a whole is performing or closing on the target in the overview table.
Min and max temperature provides an instantly familiar indicator of problems on a room by room basis. Temperatures exceeding 32°C/89°F typically indicate a serious overheating problem.

Analysis details:
ASHRAE 55 – 2004 Section 6.6.1

The comfort analysis provides an indication of comfort performance against national standards Things to consider:
Comfort is more than a measure of temperature; comfort is defined by air temperature, radiant temperature, relative humidity, air movement, clothing levels and the occupant activity level Predicted mean vote (PMV) is a metric that describes these aspects of comfort (also see ISO 7730):
+3 Hot
+2 Warm
+1 Slightly warm
0 Neutral
-1 Slightly Cool
-2 Cool
-3 Cold Percentage people dissatisfied (PPD) is also often quoted:
=/-0.00 PMV = 5% PPD
=/-0.20 PMV = 8% PPD
=/-0.50 PMV = 10% PPD
=/-0.70 PMV = 15% PPD
=/-1.00 PMV = 25% PPD
=/-2.00 PMV = 75% PPD It should be noted that PMV is considered to over estimate how warm people feel in warmer conditions This analysis page provides a number of tools to help work toward meeting the standard:

The overall number of rooms passing, number of rooms failing outside the target PMV range and

FIG. 14A

| Section | Output | Test Logic |
|---|---|---|
| Climate is dominated by | Summer - the design msut minimise cooling energy | CDD > HDD |
| | Winter - the design must minimise heating energy | CDD < HDD |
| | Tropical or ner equatorial position - (min. seasonal variation in temp, rainfall & humidity) - summer uncomfortable - minimise cooling & migate high humidity | Hot humid equatorial 1A |
| Latitude is | Low - solar radiation on east / west walls is significantly higher than north/south walls. Solar radiation on roofs is very significant indeed | Lat 1-2 |
| | Mid - solar radiation on south / east / west walls is significant. Solar radiation on roofs is significant | Lat 3-5 |
| | High - solar radiation on south walls is higher than east / west walls. Solar radiation on roofs is | Lat 6-8 |
| Summer is | Very hot | 150 hrs > 40 degC |
| | Hot | 2000 hrs > 25 degC |
| | Hot / warm | 750 - 2000 hrs > 25 degC |
| | Warm | 200 - 750 hrs > 25 degC |
| | Cool | less than 200 > 25 degC & hrs |
| | Short cool | less than 200 > 25 degC & hrs |
| Summer also | has a large diurnal range | warmest 6M 3M > 20k |
| | has a medium diurnal range | warmest 6M 3M > 10k |
| | has a small diurnal range | warmest 6M 3M > 5k |
| | has cool summer nights | Mahoney stress (warmest 6M |
| | Humidity is often greater than normal comfort limits | MC > warmest 5M 12g/kg |
| Winter is | Severe | warmest month Tm < 10 degC |
| | Cold | Temp coldest month Tm is < - 3 |
| | Mild | Temp coldest month Tm is < 13 to |
| | Warm | Temp coldest month Tm is > Hot humid 12A |
| Wind patterns | There maybe seasonal destructive storms (Hurricanes, Typhoons) | |
| | Winter prevailing winds typically from the north | Cold, hot humid / cold winter |
| | Summer prevailing winds typcially from the south | Cold, hot humid / cold winter |

| | | |
|---|---|---|
| | Winds depend on distance from sea; trade winds from the east & local sea breezes. Daytime can be windless. | Hot humid 1A |
| | Typically westerly winds | Tropical Marine 2A 3A |
| | Typically strong midday /afternoon winds | Hot dry 1234B |
| | Summer high wind could be low - check | Hot humid eq 1A |
| | Rainfall very low | USA 10th percentile 300mm |
| Precipitation | | |
| | Rainfall very high | USA 90th percentile 1500mm } 1405 |
| Misc. issues | Annual cloudcover is high (affects access to solar energy) | mean oktas 1 - 8 range, > 6 is Hot dry 1234B |
| | Dust storms maybe an issue | |
| | Insects maybe an issue | Hot humid / trop marine 1234A |

Design directions

Skin loaded buildings (repeat matrix for internally loaded)
The following is generic guidance & suggestions - tailor to suit region / location / building

| Design priorities: | | |
|---|---|---|
| | Short summer maybe uncomfortable - review | |
| | Address hot summer day comfort | Mahoney stress (warmest 6M |
| | Address hot summer night comfort | Mahoney stress (warmest 6M |
| | Minimise solar gains (majority of the year) | Mahoney stress (warmest 6M |
| | Minimise solar gains in summer | Mahoney stress (hot day > 6 |
| | Minimise heat gain | Mahoney stress (hot day > 2 |
| | Minimise radiatn heat risk (via solar conduction) | Mahoney stress (hot day night |
| | Minimise summer day heating rate | 1A to 5C |
| | Maximise summer evening / night cooling rate | 1A to 5C |
| | Address cold winter day comfort | 1A to 5C |
| | Address cold winter night comfort | Mahoney stress (warmest 6M |
| | Minimise heat loss | Mahoney stress (warmest 6M Cold, cool, cool winters, } 1410 |

| | | |
|---|---|---|
| | Building orientate +/-30 deg form cardinal for sun (N/S), adjust orientation 20-30 deg oblique to summer wind (oblique 30-45 deg provides best overall summer / winter winds), space E/W streets for solar access, Elongate blocks E/W | Temperate / Marine 345C |
| | Building orientation to increase street shading (20-30 degrees est of N/S), narrow N/S streets for shade, space E/W streets for solar access, if needed, elongate blocks E/W | Hot dry 2-4B |
| | Buildings / streets 20-30 deg oblique to summer wind, modify orientation to increase street shading, space E/W for solar access if needed, elongate blocks E/W, wide streets for wind flow | Hot humid 23A |
| | Buildings N/S orientation, narrow N/S streets for shade, elongate blocks N/S, if E/W facades shaded, wider main streets E/W | Tropical dry 1B |
| | Buildings / streets 20-30 deg oblique to prevailing wind, respond to secondary wind. Respond to time of low wind speed, often at night, orientate to utilise such wind in worst case situations (low wind, peak heat/humidity) | Tropical humid 1A |
| Urban pattern details: | Winding and angled streets have lower wind speed esp if parallel to wind | Cold Cool |
| | Wind protection of northern boundary - trees, shrubs (wind breaks) | Cold |
| | Tall bldgs can cause high speed down currents - avoid / mitigate (see below, canopies etc) | Cold |
| | Gradual height transitions sloped in the direction of the prevailing wind reduces wind movement at street level | Cold |
| | High density and mixed use development zoning | Cold |
| | Buildings - high, long perpendicular to prevailing winds | Cold |
| | Public covered spaces, subways, arcades etc. | Cold, cool |
| | Loose urban patterns, orientated to prevailing winds promote breezes - avenues, connect to perimeter green belt, more open spaces | Mahoney ref 3 hot/humid |
| | Buildings - parallel to prevailing winds, taller variable height blocks force wind down to street level | Mahoney ref 3 hot/humid |
| | Compact planning of urban form and shared shade | Hot dry 1234B |
| | Urban heat island reduced by height, vegetation, colour, high albedo (esp. roofs, parking) | hot humid, hot dry, temperate. |
| | Steet shading - reduces surfaces heating up, shades pedestrians (in humid climates it should not block breezes) | Hot dry/humid, hot summers |
| | Public urban green areas - heat sinks (transpiration), wind modifiers, filtering / controlling dust, reducing pollution | Hot dry, hot / cool summers |
| | Public urban water or adjacent upwind (summer) to building - heat sinks (evap cool) | Hot dry, hot / cool summers |
| | In hilly locations, locate undeveloped vegetated areas on higher slopes - connect this heat sink to high density areas via unobstructed downhill corridors (cold air | Mahoney ref 2 hot dry |

FIG. 14E

| | | |
|---|---|---|
| | Public urban green areas located upwind on the edge of urban areas cools the incoming prevailing winds | Mahoney ref 2 hot dry |
| Building macro form: | Compact / clustered plan (minimum surface area for minim heat loss | Cool / cold |
| | Compact / clustered plan / permeable in summer (increased surface area for high cool) | Temperate |
| | Compact / clustered plan (minm day heat gain esp. solar) / permeable at night (increased surface area) | Hot dry 134B |
| | Thin / narrow permeable plan (large surface area and max day & night cross ventilation) | Hot mixed humid 1234A |
| | Taller building access greater wind | Hot mixed humid 1234A |
| | U shaped building - protected court facing south, south facing roof | Cold |
| | Breezy courtyards - wide, orientated at 45 deg to capture hot/humid season winds and cross ventilate buildings | Hot mixed humid 1234A |
| | Shady courtyards - narrow tall shaded, water features, vegetation shading | Hot dry 1234 & Mahoney ref 2 |
| | Building possibly raised on stilts 2.5 - 3 m (floods and greater wind exposure) | Hot humid 12a |
| | External open acess corridors | Hot mixed humid / dry 1-4B |
| | Southern protected balconies | Cool cold |
| | Outdoor spaces - south / sunny location with winter wind breaks | Cool |
| | Outdoor spaces - south / sunny location with operable shades and access to summer breezes | Temperate, Marine |
| | Outdoor spaces - shades, wetted surfaces, vegetation, control of hot dusty winds | Hot dry 1-4B |
| | Outdoor spaces - access to breezes & provide shades | Hot humid 123A |
| | Outdoor sleeping (where nightime temperature is above the comfort limit) | Mahoney ref 22, hot dry 1B |
| Building internal form: | Activity thermal zoning (segregate heat gains & people, highest activity spaces on coolest facades / levels & vice versa for cold climates) | Cold |
| | Thermal migration (seasonal use of semi-heated spaces) | |
| | Open plan design (absolute minimum resistance to air flow | Cold |
| | Buffer zones (tolerate wider temps &/or at certain times of the day) - semi-heated spaces (garages, winter gardens), stores, bathrooms | Hot mixed humid 1234A |
| | | Mahoney ref 7 |
| | Buffer zones (tolerate wider temps &/or at certain times of the day) - access spaces, outdoor spaces | mahoney ref 6 |
| | Semi-outdoor living spaces (day) | Hot mixed humid 1234A |
| | Semi-outdoor living spaces (evening / night) | Hot humid /dry, temperate, hot |
| | Internal walls can be opened or have large openings at high level | Hot humid / dry |

| | | |
|---|---|---|
| Construction detail | High levels of insulation | Cold, cool, cool winters |
| | Superinsulated | Cold, cool, cool winters |
| | Earth berming (uses less variable ground temp and less exposure to wind / sun to protect from heat and cold) | Cold winters/nights, hot days |
| | Glazing bias - more glazing to southerly aspects, but with appropriate summer sun protection. Limit northerly facades to 15% of total window area, but sufficient Double/multi-height interior voids - south orientated for daylight penetration & to minimise northerly windows | Cold, cool, temperate |
| | | Cold, cool, temperate |
| | Thermal mass - lightweight walls | Mahoney ref 17 |
| | Thermal mass - lightweight roof construction, light reflecting finish and cavity | Mahoney ref 19 |
| | Thermal mass - lightweight roof, well insulated | Mahoney ref 20 |
| | Thermal mass - mediumweight (hvywt structure but lightweight internal surfaces) | Hot humid mild winters 123A |
| | Thermal mass - heavyweight walls (requires effective night cooling rates, 8 hr time lag) | Mahoney ref 18 |
| | Thermal mass - heavyweight roof (requires effective night cooling rates, 8 hr time lag) | Mahoney ref 21 |
| | Comfort can possibly be achieved without extensive night vent | Warmest 6M Tm <25degC |
| | Comfort could possibly be achieved with extensive night vent | Warmest 6M Tm at least 3M 25 - Warmest 6M Tm at least 3M |
| | Additional mechanical cooling is likely | Hot humid 12A |
| | | Hot, temperate |
| | Heavy structure to weather violent storms | |
| | Light ext finishes (in humid climates these are difficult to effectively maintain) | |
| Windows / openings: | Openings typically N & S (check prevailing winds & place on windward / leeward facades) | Cold, Hot humid/cold winter |
| | Openings typically E & W (check prevailing winds & place on windward / leeward facades) | Hot humid Tropical marine 1-3A |
| | Avoid E & W windows or smally fully shaded (included shades down to sill level) for prevailing wind - also see breezeays / wing walls as alts. | Hot humid 123A |
| | Large openings, 40-80% of walls airflow (above sill ht, body ht but directable airflow, if at high level directable airflow) | |
| | Medium openings, 25-40% of walls (above sill ht, body ht but directible airflow, if at high level directable airflow) | Mahoney ref 9 |
| | Intermediate openings, 20-35% of walls (above sill ht, body ht but directible airflow, if at high level directable airflow) | Mahoney ref 10 |
| | | Mahoney ref 11 |

| | | Mahoney ref 12 |
|---|---|---|
| | Small openings, 15-25% of walls (above sill ht, body ht but directible airflow, if at high level: directable airflow) | latitude low |
| | Not tall but horiz windows (for effective shading) | Temperate, cool, cold, cold nights |
| | Prevent winter cold drafts causing discomfort (zoned windows, mixed mode etc) | Temperate, cool, hot summers / All |
| | Effective zoned window design (all seasons & zoned functionality) | |
| | User control of glare, direct sun and passive ventilation openings | |
| Shading / protection: | External surfaces shaded (vegetation, double roof, overhangs, verandas, balconies, colonnades, pergolas) | Hot mixed humid 1234A |
| | Control solar / glare off buildings and ground (break up facades etc) | Hot dry |
| | Control grnd reflectance (vegetation) | Hot humid 123A |
| | Near building planting to shade building surfaces, elevate humidity, control wind, lower temp | Hot dry 1-4B |
| | Operable perforated shutters (full shade with ventilation) | low latitude, humid |
| | Solid shutters for storm damage protection | low latitude, humid |
| | Insualted shutters - daytime full shading & minm vent, open at night | low latitude, dry |
| | full daytime shading on E, W (eggcrate) | low latitude, dry |
| | Late afternoon shading on N (vertical fins) | low latitude, dry |
| | Effective S, E, W shading / solar protection | mid latitude |
| | Low sun occupant protection S, E, W | high latitude |
| | Insulated shutters (night operation / heat loss) | high latitude |
| Ventilation details: | Cross ventilation rate high day and night (for high T, low diuranl swing and high RH) | Hot mixed humid 1234A |
| | Day minm vent (to minise day extrenal high temps), nighttime maximum ventilation | Hot dry 1-4B |
| | Effective cross ventilation (windward & leeward openings), including suction zone forms - roof wind troughs, northlights (top floors) | Temperate, cool, hot summers / 1-6A |
| | Stack ventilation (windless days or nights, most effective on taller buildings, esp., for hot humid-tropical 1A)(Take care with winter leakage/volume control) | |
| | Wind catchers (Malkaf) to capture breezes at roof level esp. in dense urban patterns for summer cooling. Designed to match the degree of directional variability | 1-6A |
| | Taller spaces (stratification and space for air movement fans - upto 1.5m/s) | Hot, temperate, hot/cool summers |
| | Wing walls to improve single sided / two adjacent sided ventilation with wind angles down to 15 degC | 1-6A |

| Category | Detail | Climate |
|---|---|---|
| Passive details: | Winter direct passive solar heating with diurnal swing in int temps. Elongate buildings E/W for solar exposure. Review solar energy availability | Cool, temperate |
| | Passive sun buffer spaces or winter gardens (opaque roof, unheated, >1 storey better). Sun control and excess heat removal by cross-vent are important | Cool, temperate |
| | Trombe type indirect solar gain collectors (trombe walls (take care with overheating in regions with mild winters), transparent insulation etc.) | Cool, temperate |
| | Convective indirect solar / mass storage sol-air systems (Baer, Barra etc) | Cool, temperate |
| | Earth tubes - air based ground coupling heat / cooling | Cool, temperate, hot/dry Hot 12AB |
| | Double skin opaque façade - cooling load reduction on roofs & west facades (shades inner surfaces - heat *must* be removed by effective ventilation). | 4A to 6A |
| | Double skin transparent façade with cavity shades (shades inner surfaces in summer - heat *must* be removed by effective ventilation, provides solar buffer | |
| | Light shelves (extnded inside & outside) - improve daylight uniformity and provide solar shading | Hot, temperate, hot / cool |
| | Sunshine penetration (delight, well being) | Cold, cool, temperate |
| Active details: | Solar thermal (hot water) | < latitude 60 deg. Not 7, 8 |
| | Solar air heating | Cold cool, temperate |
| | Solar air breathing walls (southern walls systems for appropriate building types) | Cold cool, temperate |
| | Direct evaporative cooling (gravity operated towers; Cuningham & Thompson or Givoni "Shower") | Hot dry, temperate |
| | Ground / water coupling (heat and cool). Air or hydronic based. Depends on ground conditions & building load. Balanced heat/cool load over winter/summer | Cool, temperate, hot |
| | Photovoltaics | Low, mid lat |
| HVAC details | Mech vent with heat recovery (air tightness, fan power & recoverey efficiency critical) | Cold, cool, temperate |
| | Mixed mode (summer natural vent, winter mech vent with heat recovery) | Cool, temperate |

1410

METHOD AND APPARATUS FOR NAVIGATING MODELING OF A BUILDING USING NONPARAMETRIC USER INPUT BUILDING DESIGN DATA

CROSS-REFERENCE TO RELATED APPLICATIONS

This application is a continuation of U.S. patent application Ser. No. 12/461,557, filed Aug. 14, 2009, which claims the benefit of U.S. Provisional Patent Application No. 61/174,365, filed on Apr. 30, 2009 and U.S. Provisional Patent Application No. 61/186,145, filed on Jun. 11, 2009, the contents of which are incorporated herein by reference in their entireties.

BRIEF DESCRIPTION OF THE DRAWINGS

FIGS. 3A-5 are charts illustrating metrics, analysis, and logic associated with the design advisor method of FIG. 2.

FIGS. 6A and 6B illustrate building metrics associated with reports produced by the design advisor method of FIG. 2, according to an embodiment.

FIGS. 7A and 7B are charts illustrating a bioclimatic report produced by the design advisor method of FIG. 2, according to an embodiment.

FIG. 14A-14H illustrate bioclimatic logic, according to one embodiment.

DETAILED DESCRIPTION OF SEVERAL EMBODIMENTS

Figure 1:
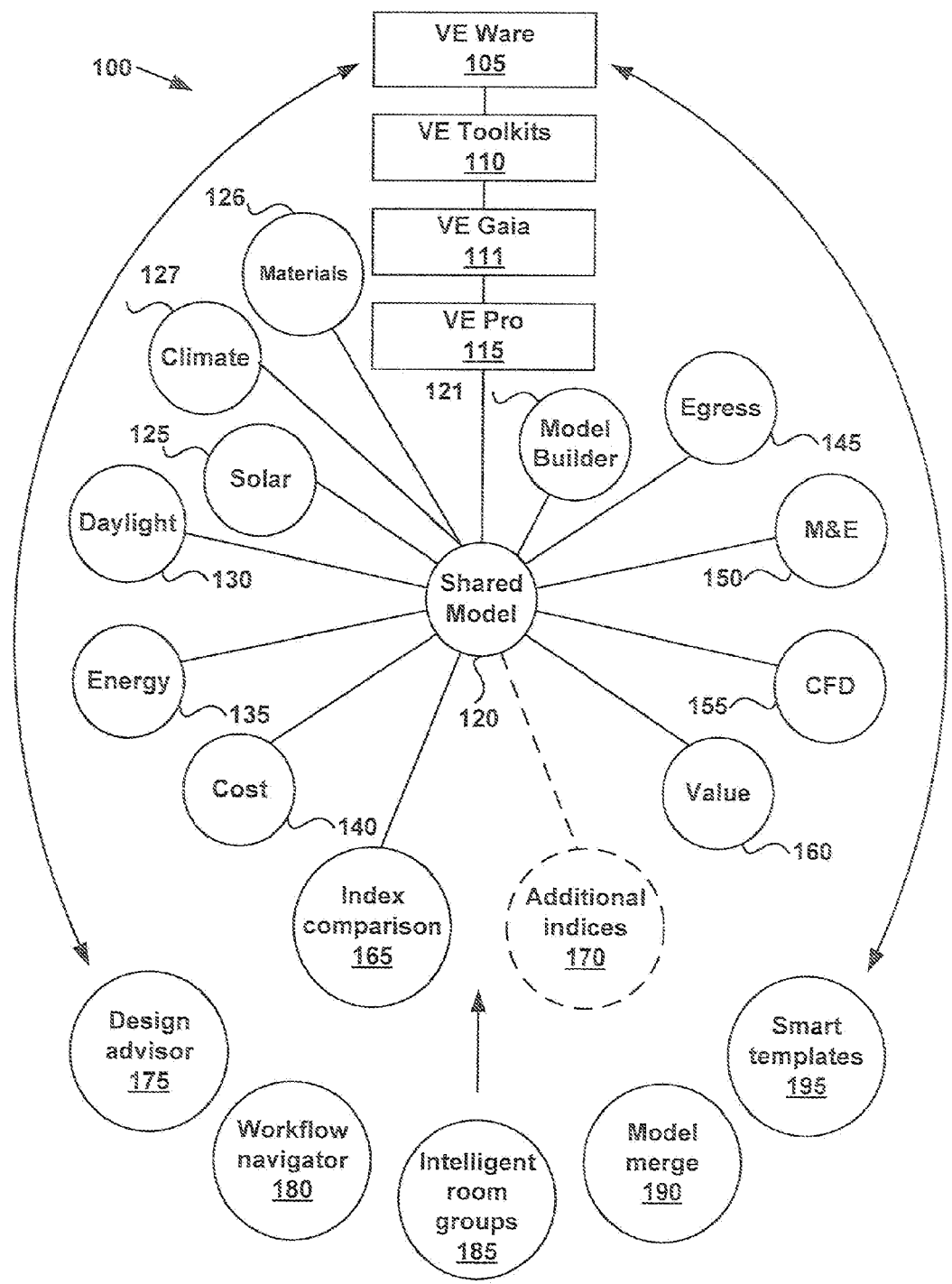
FIG. 1 is a high-level block diagram of an integrated analysis and design environment, according to an embodiment.
Figure 15:
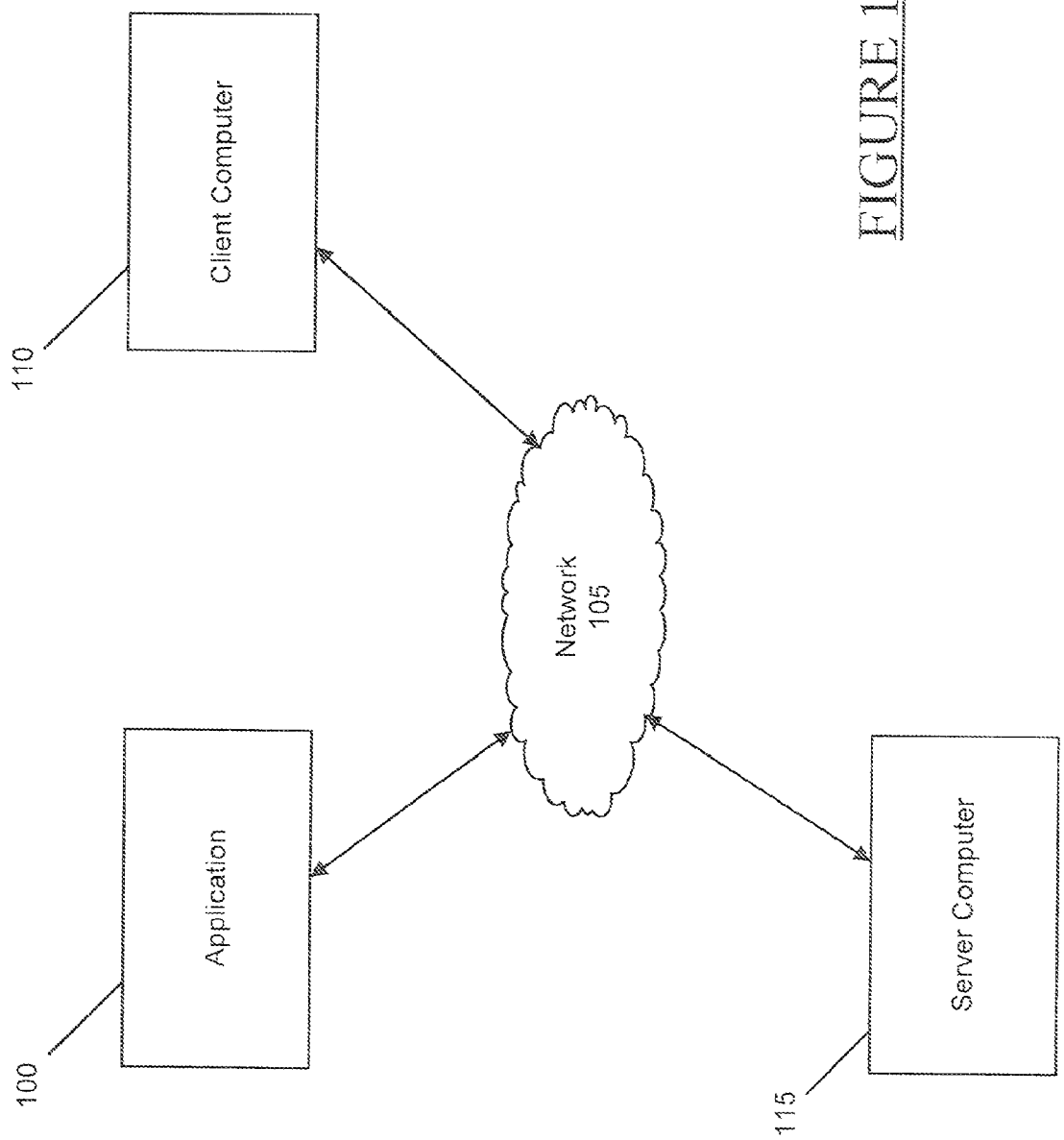
FIG. 15 is a system diagram where an integrated analysis and design environment can be utilized, according to an embodiment.

The present disclosure relates to utilizing workflows (or processes) for the purposes of user guidance, productivity, project management, quality assurance and error reduction in computer software. In some embodiments, navigation of workflows and supporting technologies can be employed. For example, in software for the thermal simulation of buildings, the workflow for a goal can involve many complex steps. The present disclosure describes technologies that actively manage how users approach and navigate workflow(s) to a desired goal with the stated benefits. FIG. 15 is a high level system diagram, illustrating at least one client 110 and at least one server 115 communicating (e.g., remotely) with at least one integrated analysis and design environment 100 over at least one network 105. It should be noted that the at least one integrated analysis and design environment can reside, in part or in full, at the client 110, the server 115, or separate from both, or any combination thereof. FIG. 1 is a high-level block diagram of an integrated analysis and design environment 100, according to an embodiment. The integrated analysis and design environment 100 is a virtual environment that includes a wide range of functional components that can share data via a shared model 120. The integrated analysis and design environment 100 is a flexible, integrated system for building performance system assessment. It can enable comparison and evaluation of alternative design strategies, from concept to completion and beyond. The integrated analysis and design environment can evaluate and help maximize the sustainable potential of a building throughout its lifecycle. The integrated analysis and design environment 100 can also interact intelligently with external software products (e.g., computer aided design (CAD), building information modeling (BIM)-importing geometry). For example, both Autodesk REViT and Google Sketchup models can be imported and the integrated analysis and design environment 100 can process the geometry to determine rooms in the Google Sketchup model.

The modules of the integrated analysis and design environment 100 can be accessed at several levels of user access suited to user ability and market deployment: virtual environment (VE) Pro 115 can provide full access, VE Gaia 111 can provide detailed access, VE Toolkit 110 can provide limited access; and VEWare 105 can provide minimal access (e.g., freeware). The integrated analysis and design environment 100 can also include an index comparison module 165 and additional indices 170 that can connect to other modules via the shared model 120. The index comparison module 165 can be configured to generate, different indices (e.g., a climate energy index and a building energy index) and/or to compare such indices. The additional indices module 170 can be configured to generate indices, for example, based on other aspects of climate not already present as a module, such as, but not limited to, wind and water.

The integrated analysis and design environment 100 can include: a shared model 120, a solar module 125, a daylight module 130, an energy module 135, a cost module 140, an egress module 145, a mechanical and electrical design (M&E) module 150, a computational fluid dynamics (CFD) module 155, a value module 160, a climate module 127, a materials module 126, and a builder module 121.

The integrated analysis and design environment 100 can follow a shared process using the shared model 120: geometry can be created, data can be assigned (e.g., BIM), and analysis can be carried out. For example, within the integrated analysis and design environment 100, a user may use the shared model 120 to create geometry. Apache can then be used to add data (e.g., BIM), such as constructions and activities, and Suncast can then be used to analyze solar information. The Suncast results can also be used through feed back as a precursor to Apache for thermal simulations. Data from Apache simulations can then provide the starting data for a CFD simulation (and so on). This can result in better productivity and holistic design.

The model builder module 121 can be configured to construct detailed three-dimensional (3D) models, share data between applications or modules, and/or import computer automated design (CAD) data from, for example, Sketchup and REViT, or by green building extensible markup language/drawing exchange format (gbXML/DXF).

The solar module 125 can be configured to minimize or maximize the effect of solar gains, visualize the impact of a building around it and establish the implications of right-to-sunlight, generate supporting visual, graphical, and numerical data, and/or animate the movement of the sun through a building.

The egress module 145 can be configured to develop a design that allows people to move freely throughout and avoid bottlenecks, evaluates alternative escape routes in the event of an emergency (e.g., a fire), and/or simulates and assesses different elevator or lift options.

The M&E module 150 can be configured to speed up duct and/or pipe sizing, assess alternatives and make adjustments quickly and easily, and/or free up design time by automating the design of mechanical and electrical systems.

The CFD module 155 can be configured to simulate airflow, ensure optimum ventilation in a design, produce detailed comfort predictions for different areas of a room, assess strategies such as ventilated facades, for example, and/or visualize results and communicate such results with graphics.

The daylight module 130 can be configured to test the look and performance of different lighting designs, including prediction of light levels, maximization of daylight, minimization of glare, visualize ambiance for different configurations, and test Leadership in Energy and Environmental Design (LEED) daylight rating.

The value module 160 can be configured to perform efficient and multidisciplinary value studies, including providing a common interface to all those involved in a project, evaluation of a wide range of design parameters and comparison of different options, and identification of best value solutions.

The cost module 140 can be configured to predict initial and lifecycle costs, including preparation of customized capital cost estimates and calculation of operating costs of a building throughout its lifetime.

The energy module 135 can be configured to maximize the potential of green strategies like natural ventilation, heat recovery, night cooling, heat pumps, and mixed mode systems, calculate heat loss and gains, thermal loads, and carbon emissions, simulate the impact of internal and external airflow, optimize artificial light control, model HVAC plant and control systems, assess feasibility and performance of renewables, comply with energy conservation legislation, and perform Architecture 2030 Challenge benchmarking.

The climate module 127 can be configured to review, compare and analyze weather files (historical or synthetic or predicted) anywhere globally, produce metrics, trend data, and summarize results from such an analysis. The module can also be configured to set location and weather file information for the purposes of simulation within the VE.

The materials module 126 can be configured to summarize the total materials data contained in the model, individually or by material group. The materials data may include weight, volume and other information related to material properties (e.g., data from the manufacturing, distribution and disposal of the material (e.g., embodied energy, embodied water, pollutants, byproducts or alternatives)). The materials data is used for comparing options, optimizing design decisions, and reviewing lifecycle issues.

As sustainable building design and the software that supports such design become more diverse and complex, it is helpful to actively manage how users approach and navigate issues and how they interpret the software results. The integrated analysis and design environment 100 can include the following to facilitate management: a workflow navigator module 180, a design advisor module 175, an intelligent room groups module 185, a model merge module 190, and a smart templates module 195. These modules can enhance and enable the integrated analysis and design environment 100 to provide greater productivity, reduce user error, provide smart reuse of data, allow direct and immediate navigation of complex issues, workflows and processes, and derive understanding that is sometimes not possible from traditional analysis environments.

Building analysis software often produces results that require significant interpretation by the user. The more diverse the building design, the more complex interpreting results can become. The breadth of building design also means many skilled people may be needed to produce an integrated or holistic result. This can be difficult to achieve and often is not performed in a timely manner. The integrated analysis and design environment 100 can help in interpreting results more effective, timely, and/or in an integrated manner.

DESIGN ADVISOR. The design advisor module 175 can be configured to produce metrics for a building design (e.g., building energy use intensity kwh/m$^2$ yr, glazing area % of wall area, heating load w/m$^2$, fresh air rate L/s·m$^2$, surface area to volume ration, etc.), can use intelligent and automated analysis to identify metrics and patterns in data (e.g., peaks, averages, trends, range testing, coincidence of variables, selected metric(s) value testing, etc.), can perform logic that processes and interprets metrics into conclusions, and can include a report generator that dynamically compiles metrics and conclusions into an effective and readable narrative. The story or narrative can have context, hierarchy, and multiple reinforcement of key messages via a number of different media (e.g., text, tables, dynamic user adjustable tables, charts, diagrams, images, videos, cartoons, etc.) to ensure the message is received by a wide range of users.

Figure 2:
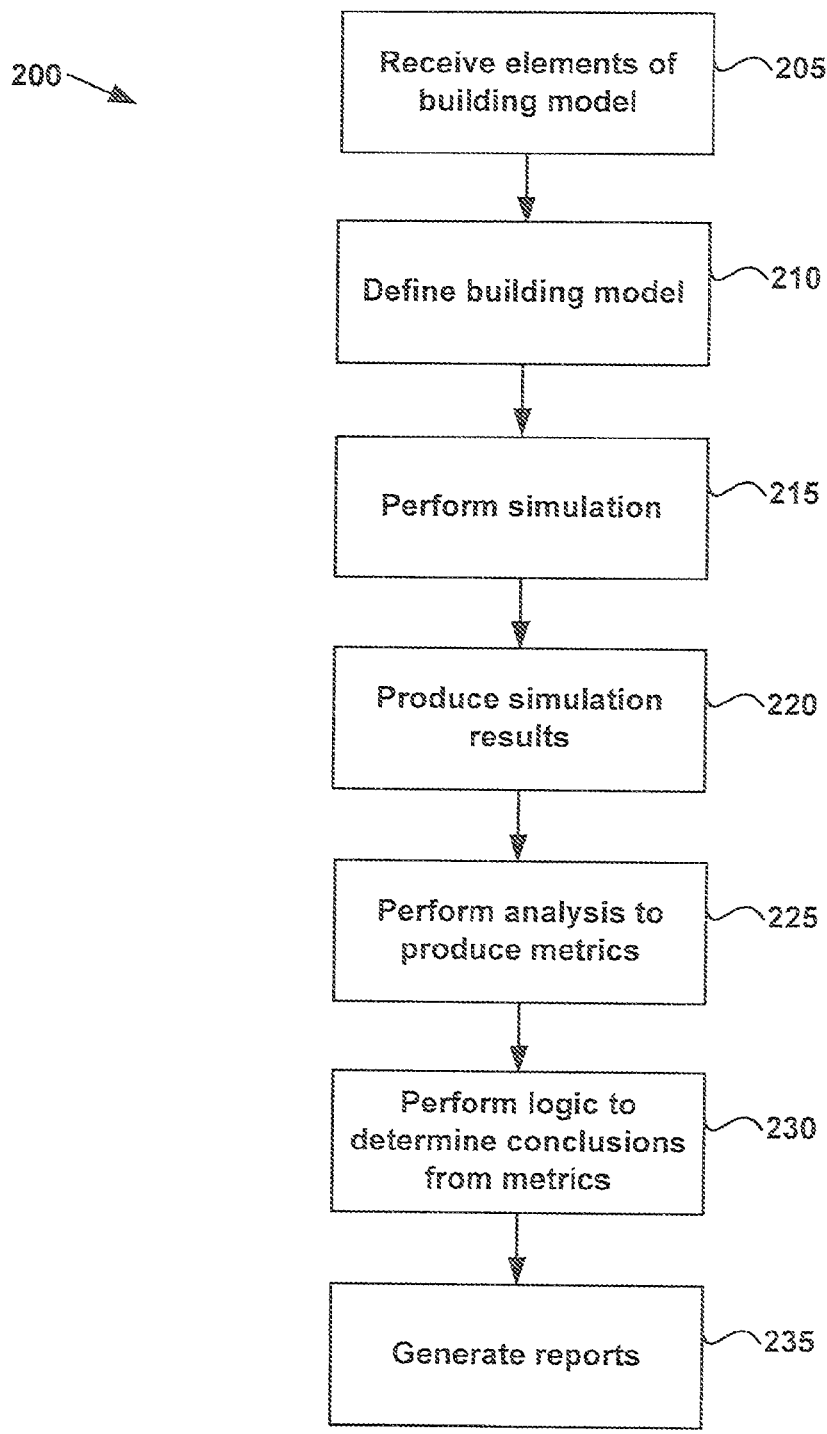
FIG. 2 is a flow diagram illustrating a design advisor method, according to an embodiment.

FIG. 2 is a flow diagram illustrating a design advisor method, according to an embodiment. It should be noted that the various processing steps described below can be automated using the functionality provided by the workflow navigator module 180, for example. At 205 in flow chart 200, the elements of a building, including model data such as occupancy data, construction data, system data, usage data, weather data, or data from model merge technologies or from BIM models (e.g., ReviT, Sketchup), for example, can be obtained. At 210, a building model can be defined. At 215, simulation of the building model can be performed. For example, thermal simulation, daylight simulation, and/or water simulation can be performed for the building model. At 220, simulation results can be produced. It should be noted that some metrics associated with the building can be derived directly from the input data while other metrics are derived from simulated or calculated results.

At 225, an analysis of the simulation results can be performed to produce metrics associated with the building (e.g., building energy use intensity kwh/m$^2$ yr, glazing area % of wall area, heating load w/m$^2$, fresh air rate L/s·m$^2$, surface area to volume ration, etc.). The simulation results can also produce patterns (e.g., peaks, averages, trends, range testing, coincidence of variables, selected metric(s) value testing, etc.) that, when analyzed, also contain metric information. The metrics can be associated with (and grouped into) climate information, natural resources information, urban design information, building form information, building thermal information, building light information, materials information, water information, and/or sustainability information.

At 230, conclusions can be derived from the metrics. Metrics can represent an intermediate stage in determining conclusions. A logic analysis can be performed on the metrics to derive effective and simple conclusions that can be accessible and easily understood. For example, if the building is not occupied at night, the external temperature drops sufficiently below the occupied set point at night, and the building has a thermally heavy construction, then the logic that can be derived is that night time purge ventilation is a possible strategy to reduce building cooling demand. At 235, a report generator can be used to process the logic output into an ordered narrative or story that is understandable by a wide range of users. The report generator can use visual communication devices such as charts, diagrams, pictures, and/or video, written communication in the form of a plain English narrative or story, tabular information that dynamically sorts itself based on direct user input, and/or contextual information that supports what is being communicated with background and range information.

FIGS. 3A-5 are charts illustrating metrics, analysis, and logic associated with the design advisor method of FIG. 2, according to one embodiment.

Figure 3E:
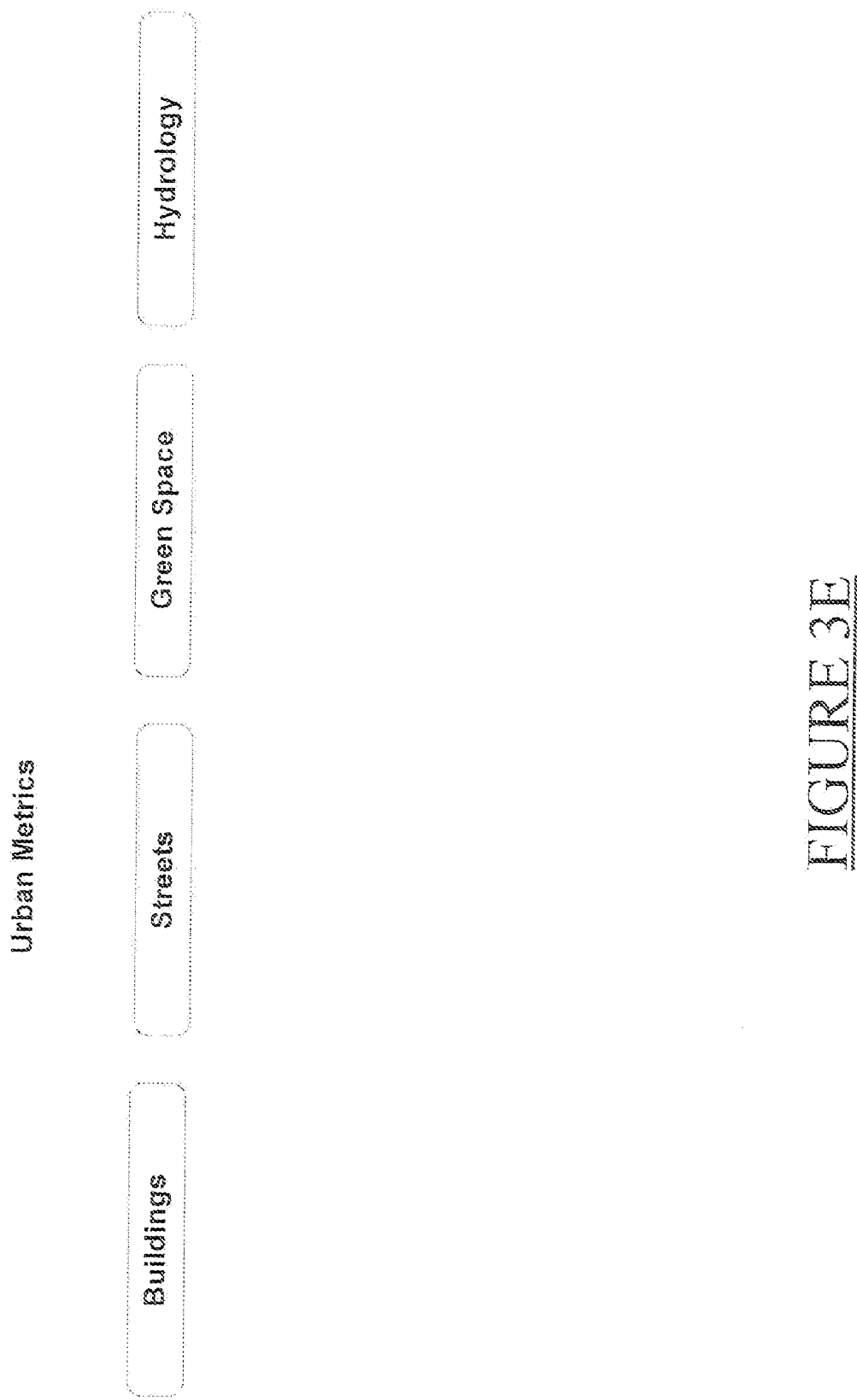
Figure 3G:
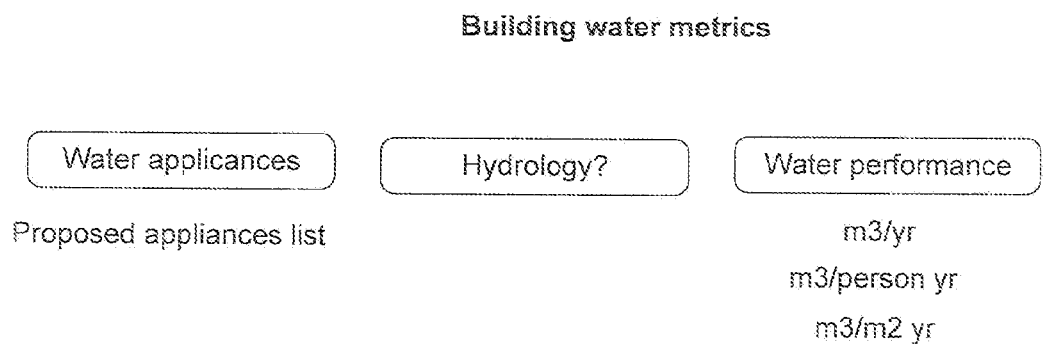

FIGS. 3A-3H show examples of metrics. FIG. 3A illustrates many types of metrics: climate, urban, building form, building thermal, building light, building water, and sustainability. FIG. 3B illustrates climate metrics derived from weather data files. FIG. 3C illustrates building form metrics and building thermal metrics. FIG. 3D illustrates building thermal metrics. FIG. 3E illustrates urban metrics. FIG. 3F illustrates building light metrics. FIG. 3G illustrates building water metrics. FIG. 3H illustrates sustainability metrics. As described above, the metrics can include directly derived metrics and processed metrics, such as climate classification, passive design responses, room form, and thermal mass, for example FIGS. 3A-3H illustrate a data hierarchy: group>subgroup>metric>climate metrics weather base metrics>max annual temperature. The metrics shown in FIGS. 3A-3H are examples of determined output from 225 in FIG. 2. Note these are just examples of groups, and that many other groups can be utilized.

Figure 5:
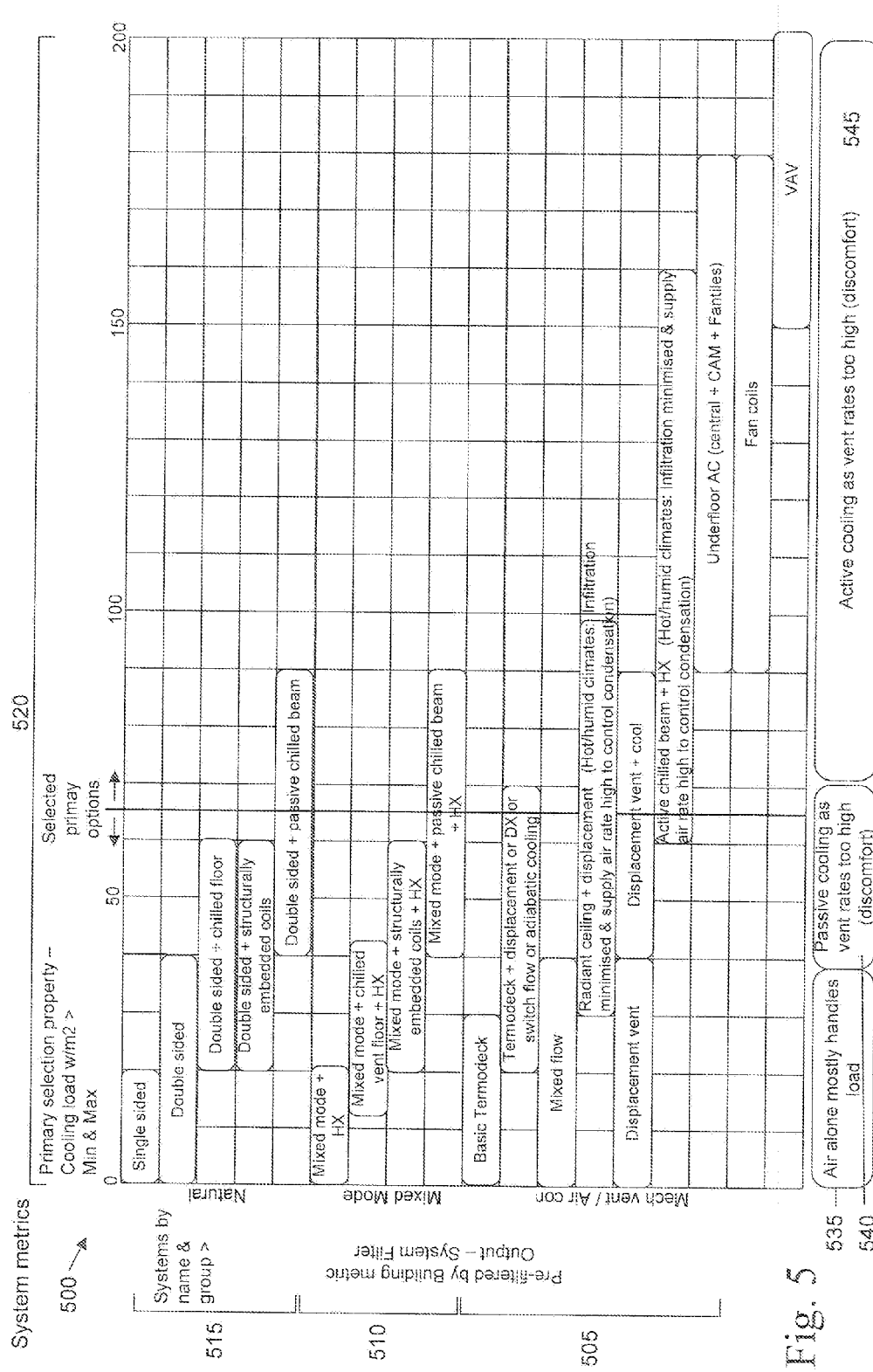

FIGS. 4A-5 demonstrate how 230 of FIG. 2 can be produced, according to one embodiment. FIGS. 4A-4F illustrate an example of logic being used on derived metrics to determine conclusions. (Note that, in one embodiment, the information on FIGS. 4A-4F can be displayed in one chart.) In FIGS. 4A-4F, the logic (a pattern of metrics) is illustrated in the columns of the chart, with the outcome shown at the bottom of the chart (system filter 410 and notes 405 sections). Each predetermined pattern reflects a different climate (e.g., hot and humid 4A, hot and dry 4B, hot humid/cold winter 4C, temperate 4D, cold 4E and 4F) and are examples of how the logic process operates (i.e., how the model can be matched to one of these columns). The following properties can be considered: climate 440, building type 435, loads 430, usage 425, form 420, and construction 415. The outcome at the system filter 410 can indicate an interim conclusion that can then be used in the next stage in the chain of logic. For example, in the chart on FIG. 4A, the model can be first matched to the correct climate (e.g., section 440, 1A). Then, the model can be matched to a predetermined pattern in system filter 410 (e.g., if all the conditions listed in column 1A are true, system filter 410 produces natvent YES). Colors can be used in FIGS. 4A-4F to represent different types of solutions. For example, green can represent natural vent solution, orange can represent mixed mode solutions, and red can represent air conditioning solutions. In addition, different types of patterns can be used to signify colors or different types of solutions. For example, green (e.g., natural vent solutions) can be represented by a diagonal lines pattern, orange (e.g., mixed mode solutions) can be represented by a crossbar pattern, and red (e.g., air conditioning solutions) can be represented by a vertical lines pattern. Notes 405 can allow notes to be added in.

FIG. 5 is an example of a second stage of logic being used on metrics, according to one embodiment. This example uses the result from FIGS. 4A-4F to derive an additional set of outcomes. This example demonstrates the application of chained and patterned logic and the outcomes that can be produced from a design advisor, according to one embodiment. In this example, the outcomes are the rows that cross the line, which are filtered by the outcomes from FIGS. 4A-4F, and the secondary properties 525 in FIG. 5. The rows can include natural systems 515, mixed mode systems 510 and vent/air conditioning systems 505. The outcome can be a number of results. In this in example, the outcome is potential HVAC systems suitable for this model and climate. Once the data of FIGS. 4A-4F are applied, and the line in FIG. 5 is used as the load (i.e., how much cooling needed for every square floor area in the building—derived from the model), cooling options which would work can be derived. In this example, any of the cooling options with the line through them would work. These cooling options would show up to the user as possible options. Note that, as in FIGS. 4A-4F, the colors in FIG. 5 can represent different types of solutions. For example, green (e.g., 515) can represent natural vent solution, orange (e.g., 510) can represent mixed mode solutions, and red can represent air conditioning solutions (e.g., 505). Note also that additional information properties 530 can be factored in. In addition, the following properties/categories can be taken into account: air alone mostly handles load 535, passive cooling as vent rates too high (discomfort) 540, activing cooling as vent rates too high (discomfort), fresh air 550, headroom 555 and climate type A 560.

FIGS. 6A, 6B, 7A and 7B illustrate how 235 of FIG. 2 can be produced, according to one embodiment. FIGS. 6A and 6B illustrate building metrics associated with reports produced by the design advisor method of FIG. 2, according to an embodiment. In this example, the report produced can include building model form, dominant aspects of design and metrics that relate to building shape, windows, room form, dimensional metrics, and thermal response metrics. The report can provide message reinforcement via repeated information using different visual and textual outputs. The building metrics report can be similar to a climate report, except building data can be utilized. FIGS. 6A and 6B illustrate information textually and in a visual format. 605 illustrate the office space of interest and generic properties. 610 illustrates size of space of interest, and where glass is situated (in the example it is south and west dominated). 615 illustrates how many rooms are within 7.5 meters of the window and how many rooms are three or four sided. This can help determine if a room is able to be ventilated. Thus, FIGS. 6A and 6B demonstrates how 235 of FIG. 2 can be produced, in one embodiment.

FIGS. 7A and 7B are charts illustrating a bioclimatic report produced by the design advisor method of FIG. 2, according to an embodiment. In this example, the report produced can include the type of designs that may be considered based on weather and climate. The report is configured using themed chapters to produce a story or narrative with a natural order and hierarchy. Such configuration can allow a very high density of interpreted information to be presented in a concise manner. The climate analysis can include statistics of weather files. The bioclimatic analysis can perform a set of rules and checks, using bioclimatic advice logic, to create a set of recommendations based on the weather data.

FIGS. 14A-14H are charts illustrating bioclimatic advice logic, according to one embodiment. The bioclimatic logic can produce the bioclimatic report of FIGS. 7A and 7B. For example, in 1405, the various sections (e.g., climate, latitude, summer, winter, wind patterns, precipitation, and misc. issues) can have test logic that produces certain output. For example, if cooling degree days (CDD) is greater than heating degree days (HDD), and the climate is dominated by summer, the design must minimise cooling energy. In 1410, design directions and test logic is provided. For example, various logic for design priorities are listed in 1410. For example, for a short summer that is maybe uncomfortable, a Mahoney stress analysis method is used for the warmest 6 months. It should be noted that where the logic refers to Mahoney, those of ordinary skill in the art will see that this is a specific analysis method defined by Mr. Mahoney and generally referred to as Mahoney tables. See, for example, Koenigsberger et al, *Manual of Tropical Housing and Building: Climatic Design*, (India: Orient Longman 1973), which is herein incorporated by reference.

WORKFLOW NAVIGATOR. Software sometimes requires users to find their own navigation route among features. For example, in building analysis software this can cause very complex software architectures. While manuals and wizards may be available, these are generally insufficient or do not provide specific information, which can cause users of such complex and diverse software to use the software below its full capabilities and productivity. The workflow navigator 180 can be configured to integrate real world design workflow, quality assurance, user guidance, productivity, project management, error reduction and end goals in order to provide a clear workflow that can operate concurrently at the level of perspective, at the detail task at hand, and to enable parallel tasks.

The workflow navigator 180 can allow for the integration of guidance directly with actions in the software, for the integration of direct actions with specific resources, to encourage good practice modelling and analysis, and to produce auditable quality assurance.

The workflow navigator 180 can be configured to perform a workflow navigator method that can include creating a hierarchical workflow tree that can change dynamically, both in entirety or conditionally, as choices are made by the user. The workflow items can direct users, allow data input, and can trigger actions in the software, some of which maybe very complex and change later or subsequent items in the workflow. The workflow items can provide immediate and direct guidance (because they are part of the interface) and directly link into specific help resources. Users can check off workflow items as they are completed, can add comments, and can add a date/time/user stamp. Workflow item completion can unlock later actions for use. Items in the workflow can be elemental or can appear in a single instance, such that the state of any element can be current regardless of where the user maybe in parallel workflows. Together, the workflows, the comments, and/or the checks, for example, can create a quality and/or project audit system that can be directly generated from the work at hand.

Figure 8A:
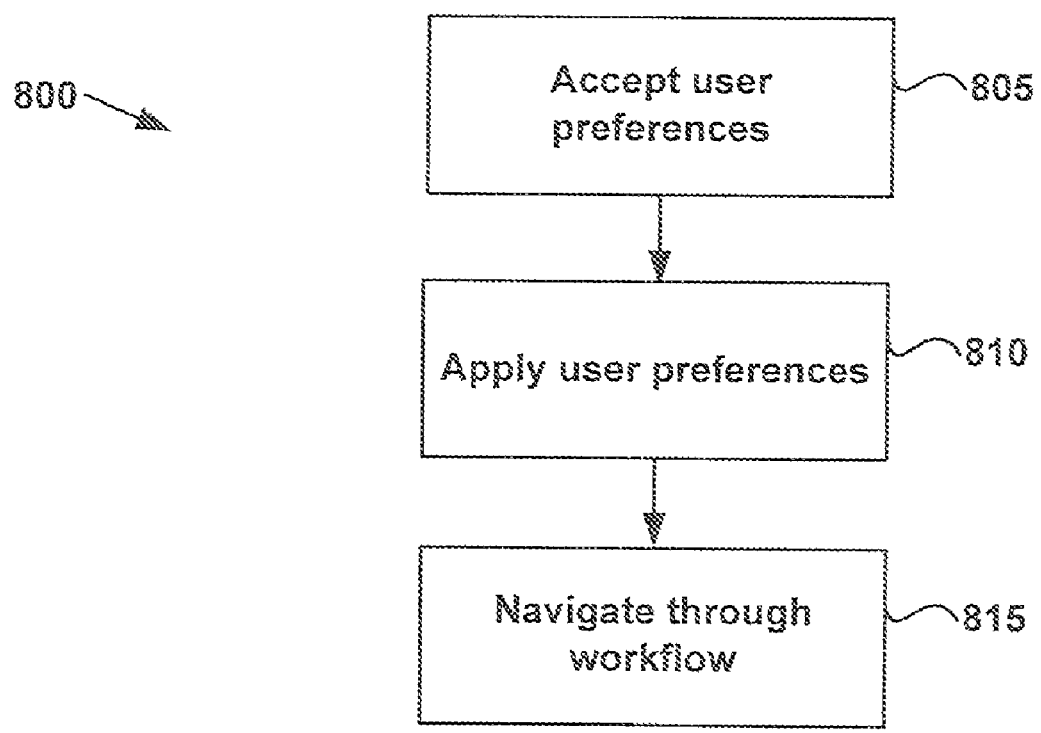
FIGS. 8A-10L illustrate various components of workflows, according to an embodiment.

FIG. 8A is a flow diagram illustrating user selection of appropriate workflow, according to an embodiment. In 805, user preferences are accepted. For example, a user can select from a list of available workflows, such as, but not limited to, those illustrated in FIGS. 10A-10L, which list many examples of workflows. In 810, user preferences are applied. For example, one or more selected workflows, such as the one in FIG. 9A, can be loaded and displayed. The workflow(s) can be taken in part or in full from the list of workflows in FIGS. 10A-10L, or the user can create or add in a new workflow. In 815, the workflow is navigated. For example, the user can work through the work flow, step by step, taking notes, making decisions, triggering actions, entering data and checking off the action item for each item. The user can jump backwards and forwards in the workflow or change workflows at will.

Figure 8B:
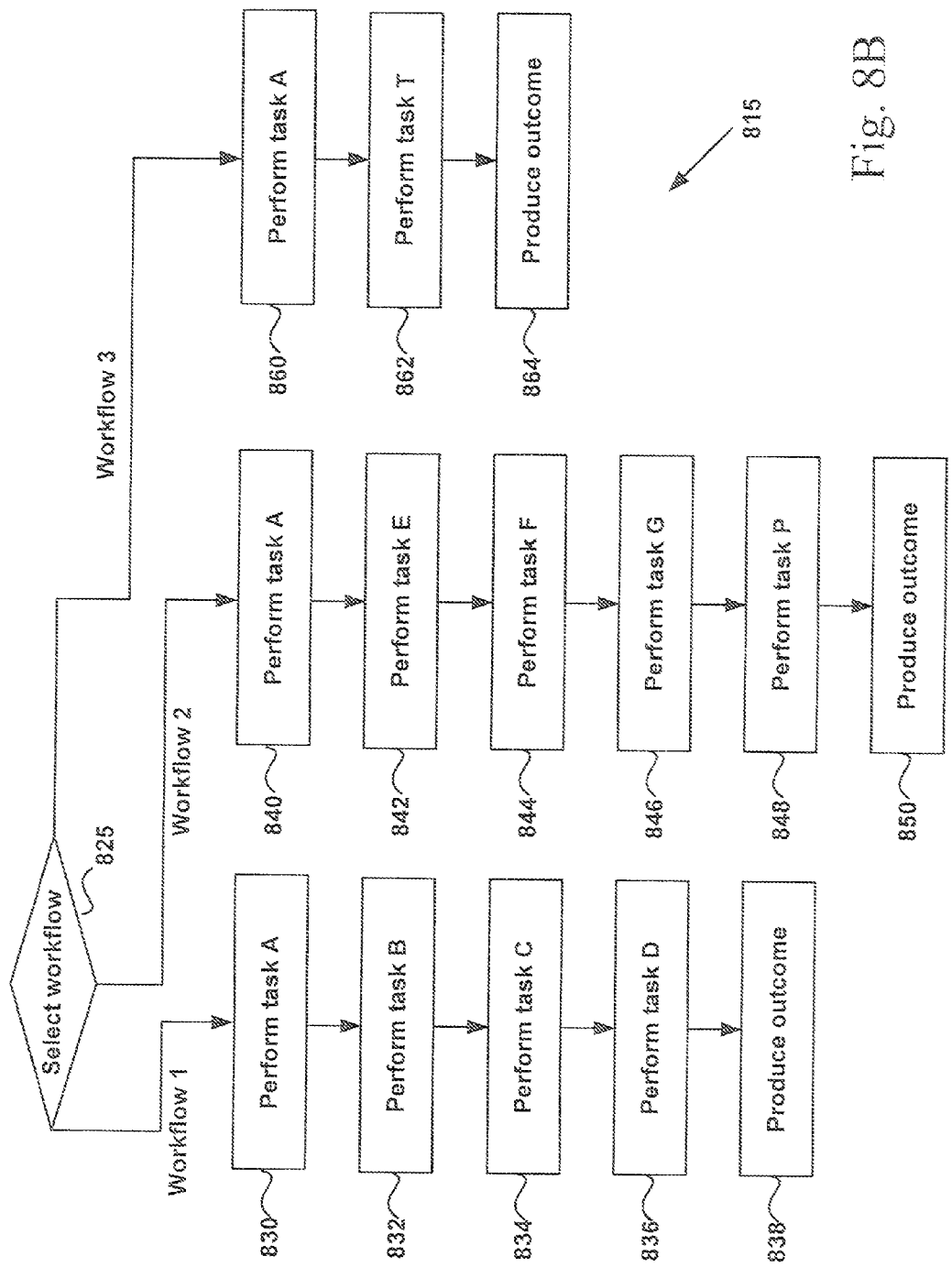

FIG. 8B is a flow diagram illustrating a workflow navigation 815 for a selected workflow, according to an embodiment. In 825, a workflow is selected. For example workflow 1, workflow 2 or workflow 3 can be selected. If workflow 1 is selected, the tasks A, B, C, and D can be performed, according to 830, 832, 834 and 836 in order to produce an outcome in 838. If workflow 2 is selected, the tasks A, E, F, G, and P can be performed, according to 840, 842, 844, 846, and 848 in order to produce an outcome in 850. If workflow 3 is selected, the tasks A and T can be performed according to 860 and 862 in order to produce an outcome in 864.

Various objects and nodes can be used as part of a navigator for the workflow navigator method. Objects can be divided into dialogue objects, action objects, and macro objects for the purposes of browsing and/or grouping. Objects can be broken down to access individual actions (e.g., to create sequential baseline model as show in 970 of FIG. 9A). In an appropriate navigator creation tool, the objects and/or nodes can be dragged and dropped to define a navigator specification or can be further edited when required. The objects can evolve as navigator scripts are developed.

A navigator can be configured to provide direct and context linked guidance, proven workflow, tutoring, access to features, combined and automated functionality (e.g., macros configured to automate repetitive tasks), and/or conditional functionality. A navigator can be configured to provide flexibility, de-mystify the modelling process (e.g., illustrate order, access, and user confidence), to produce an outcome or solution, output measurable solutions, indicate productivity gains, reduce error, provide quality assurance (e.g., record), and/or add additional value to that provided by the VE Toolkit 110, for example.

The navigator technology can also be configured to support: navigator component content transfer (e.g., transfer to other navigators such that the same components in different navigators show the same status), model variant management, user libraries (e.g., constants, profiles, openings, templates, gains, air exchanges, and systems), starter models, and/or embodied energy data (e.g., construction database).

Figure 9A:
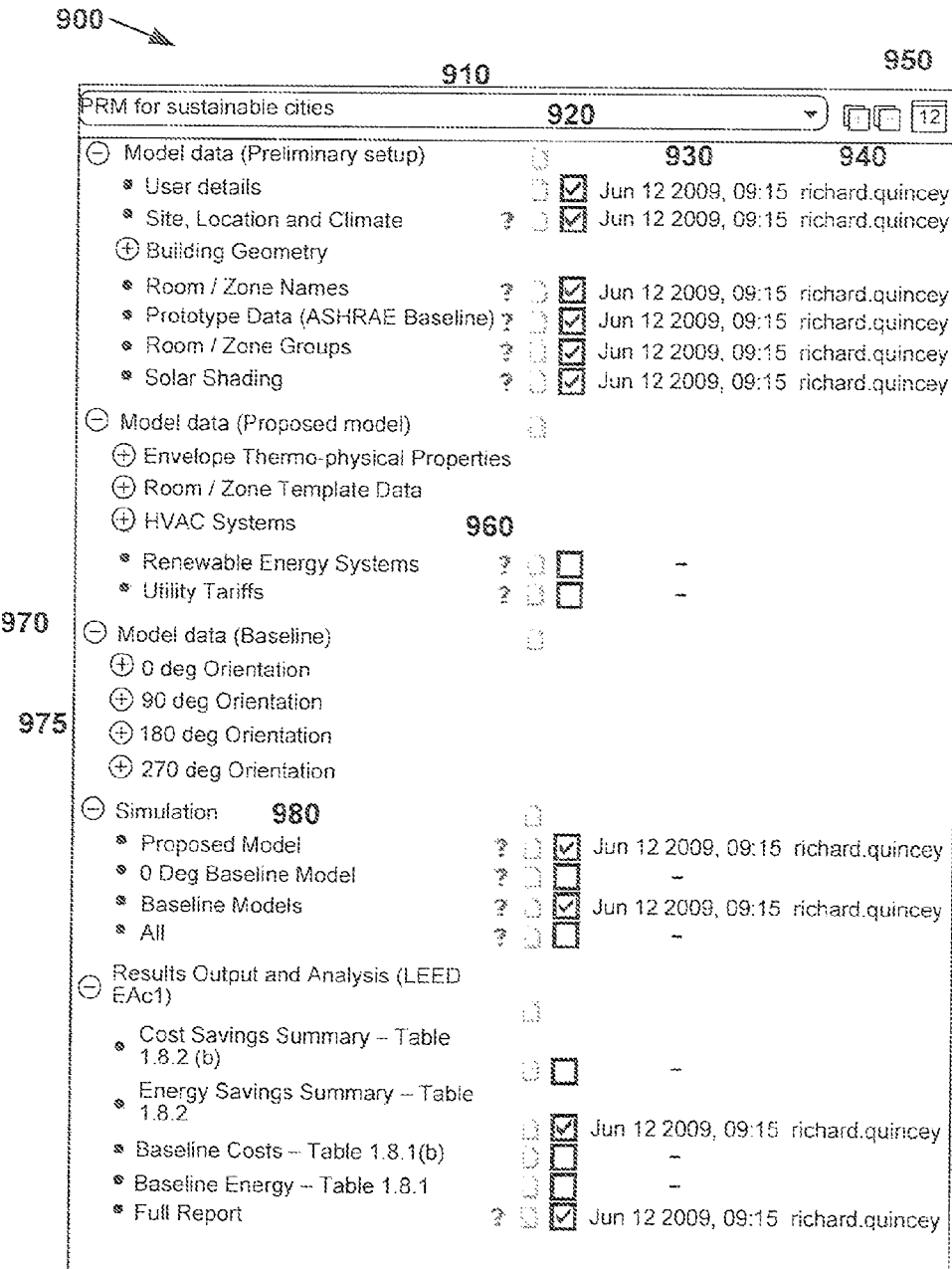

FIG. 9A is a screenshot of a working navigator operating via a graphical interface 900, according to one embodiment. 910 is a drop down list of navigators for selection. 920 is a notes icon, where a user can add a comment. 930 is a date/time stamp. 940 is a user stamp. 950 are toggle icons, which can expand and/or collapse a workflow tree and show and/or hide date/time user stamps. 960 is a help hyperlink icon. 970 is a tree first level group entry. 975 is a tree second level group entry. 980 illustrates how completed items can be coloured (e.g., green). The workflow tree in this example uses three depths, however more or less depths may be used.

Figure 9B:
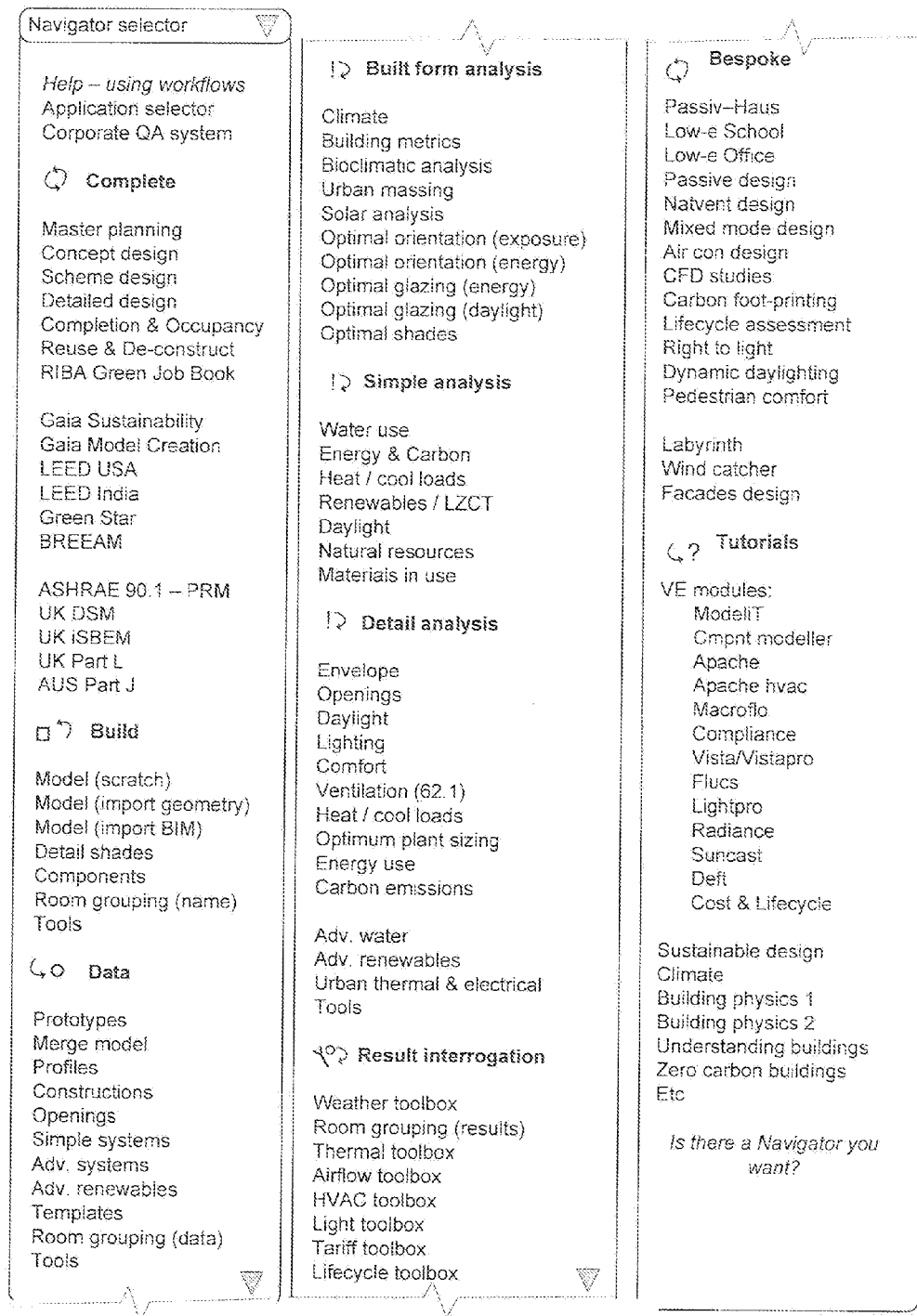
Figure 9C:
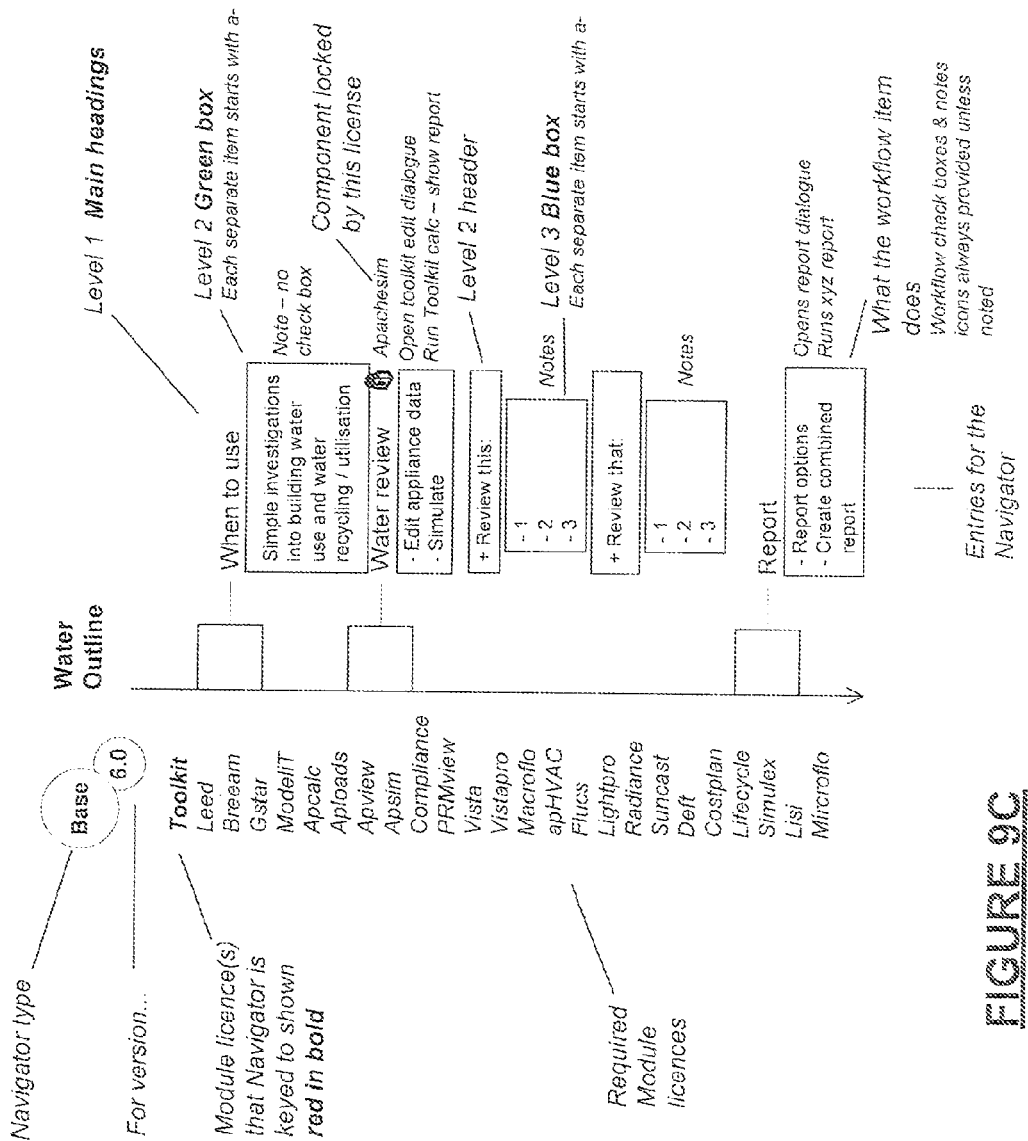
Figure 9D:
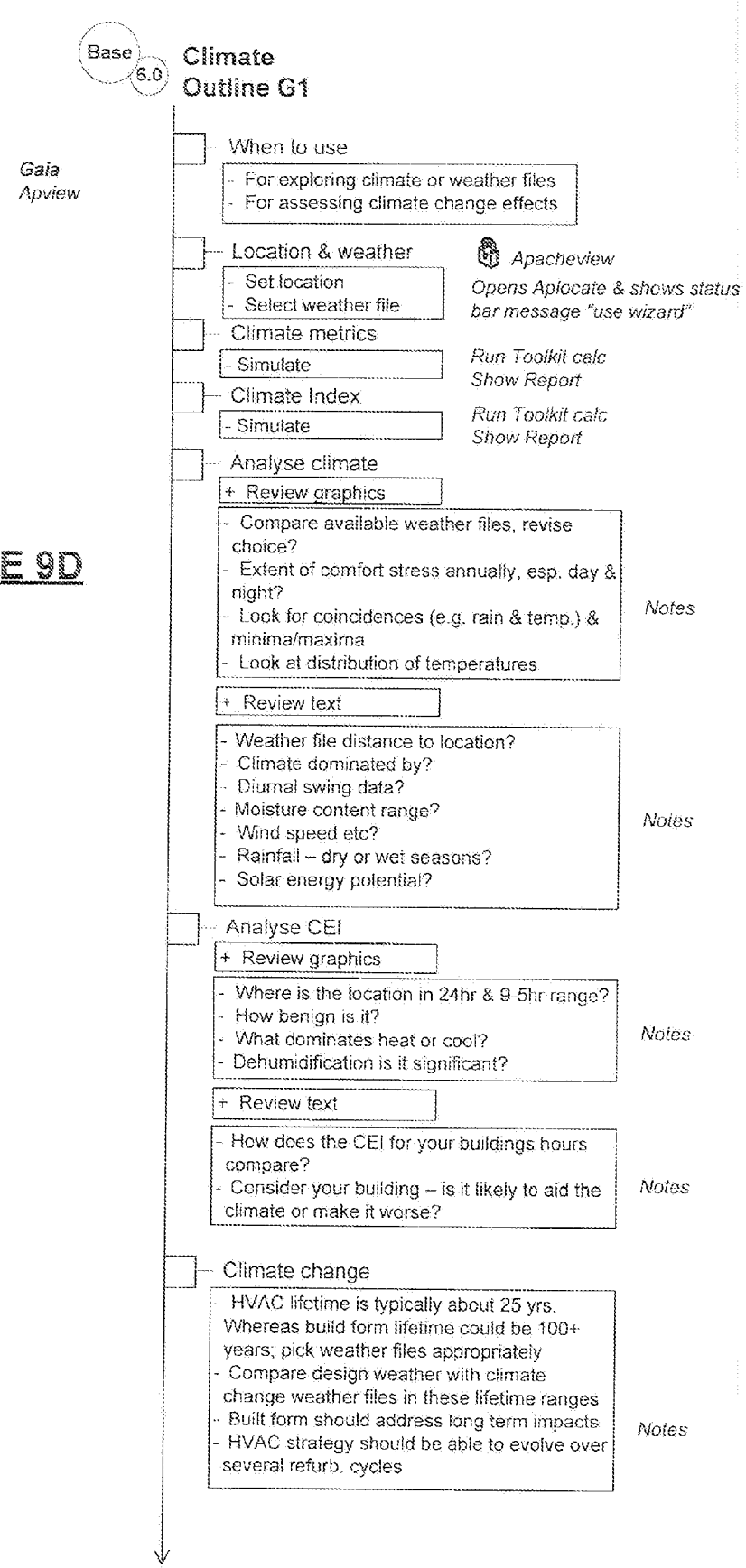
Figure 9E:
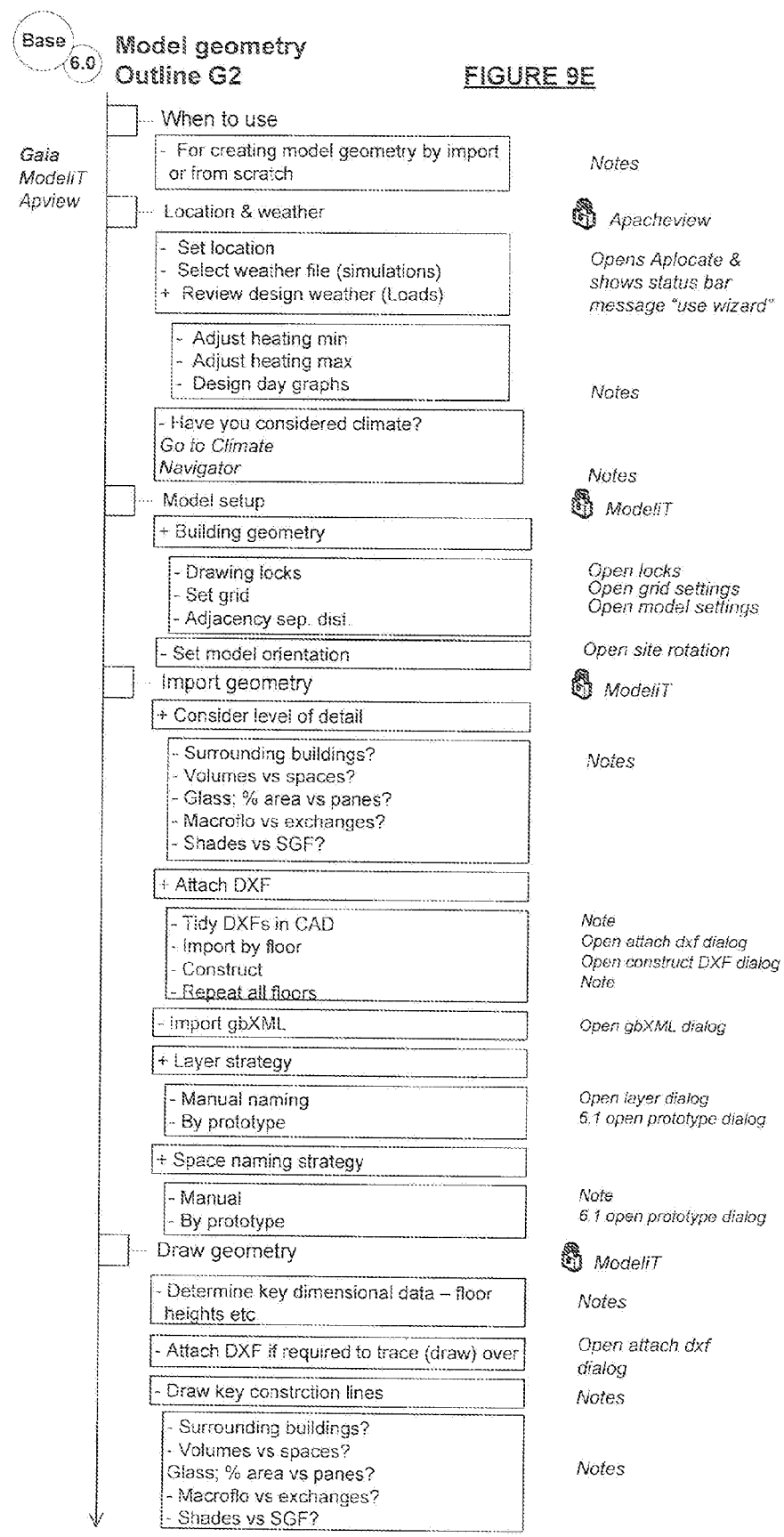
Figure 9E:
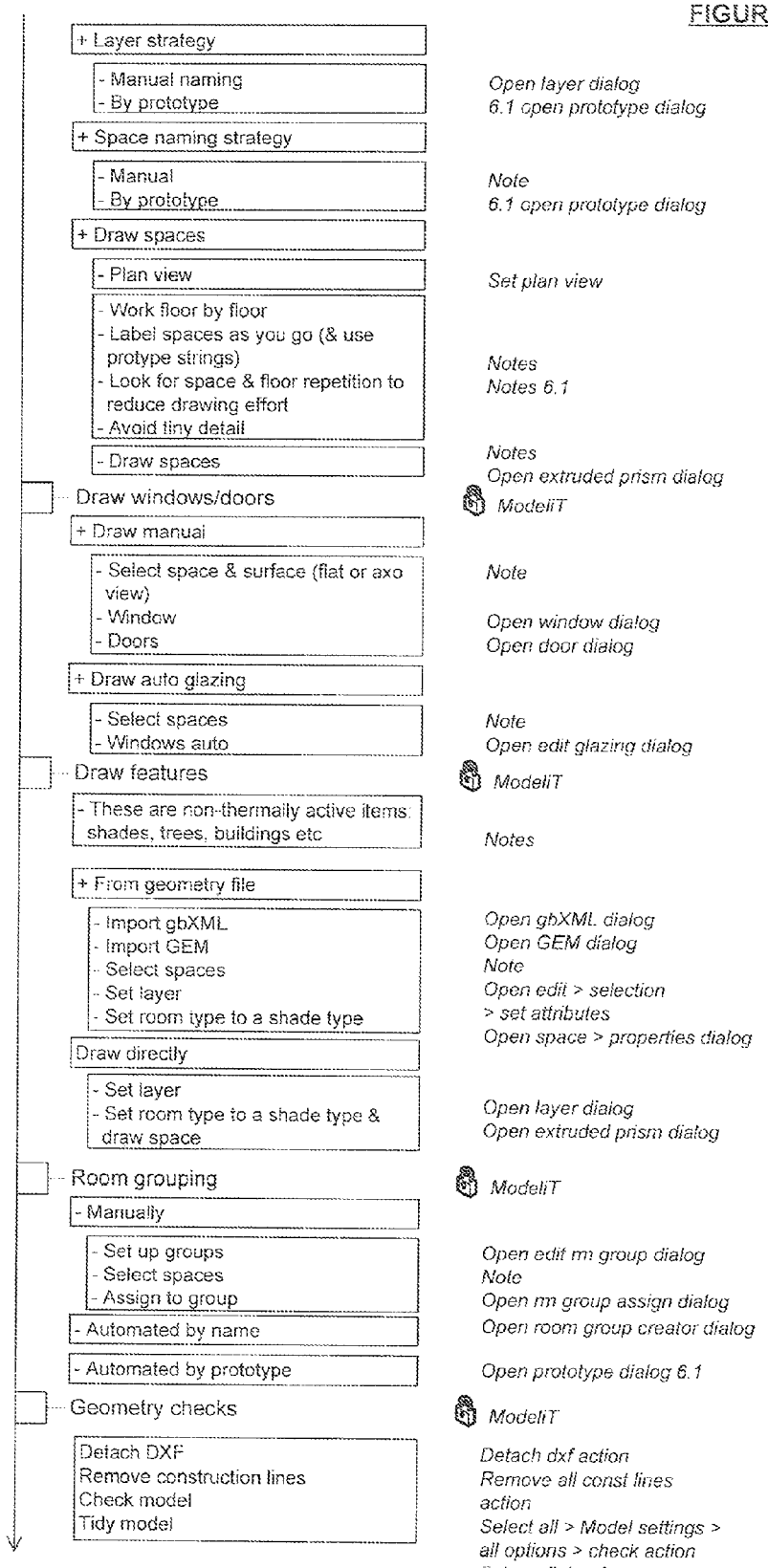
Figure 9F:
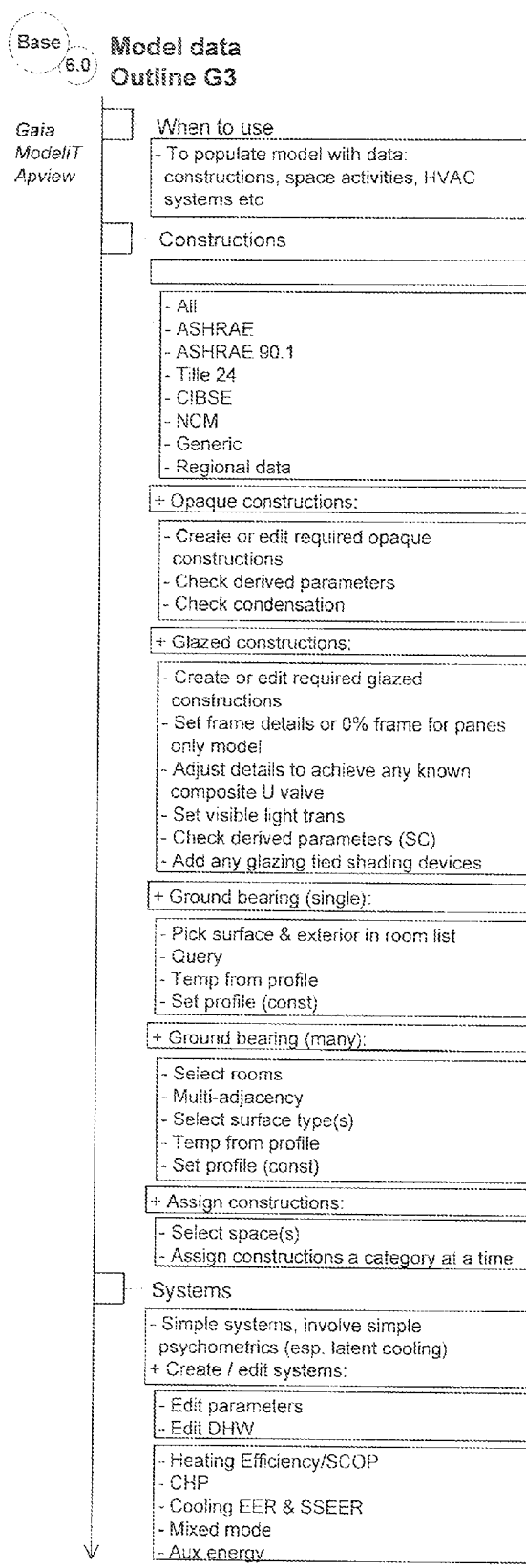
Figure 9F:
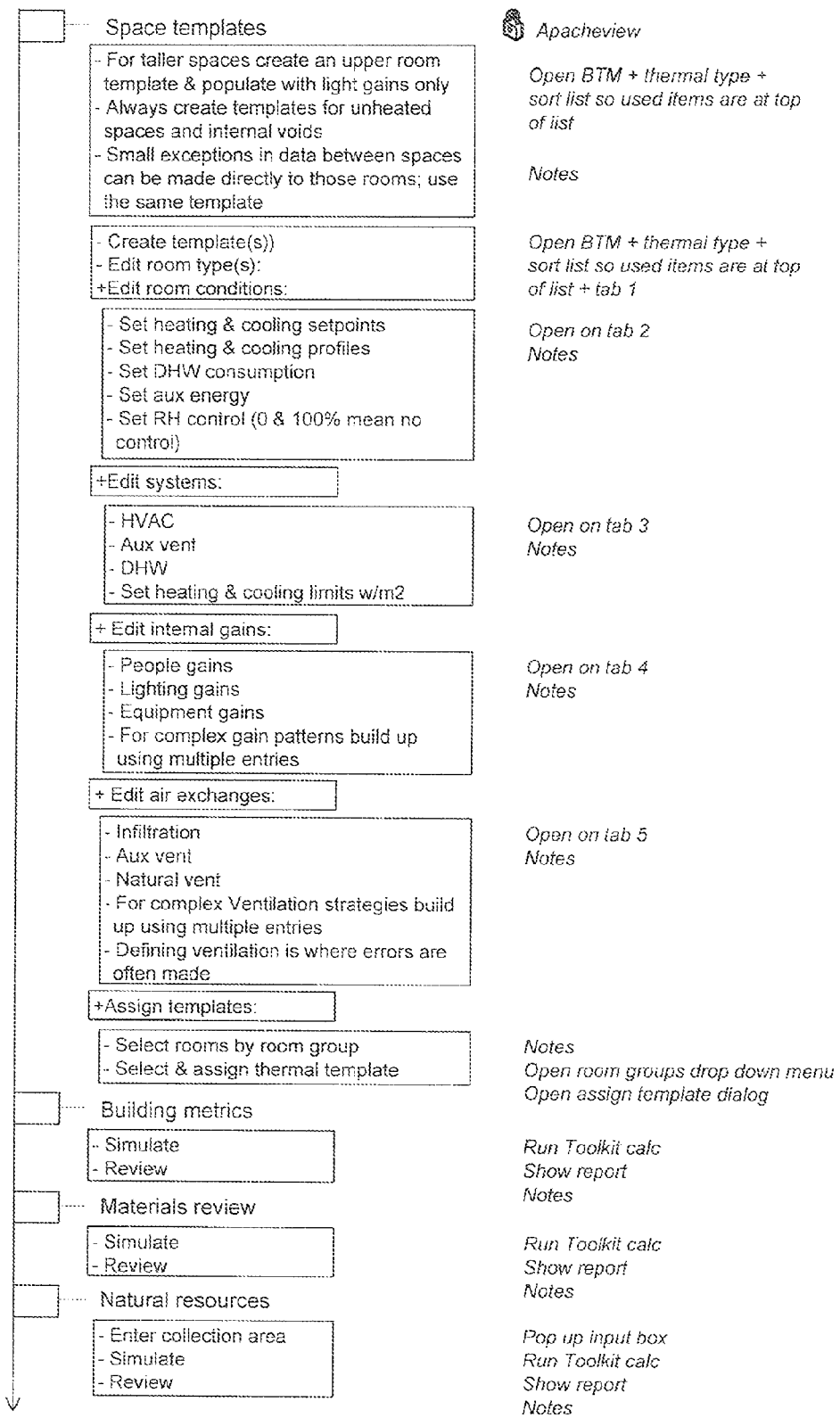
Figure 9G:
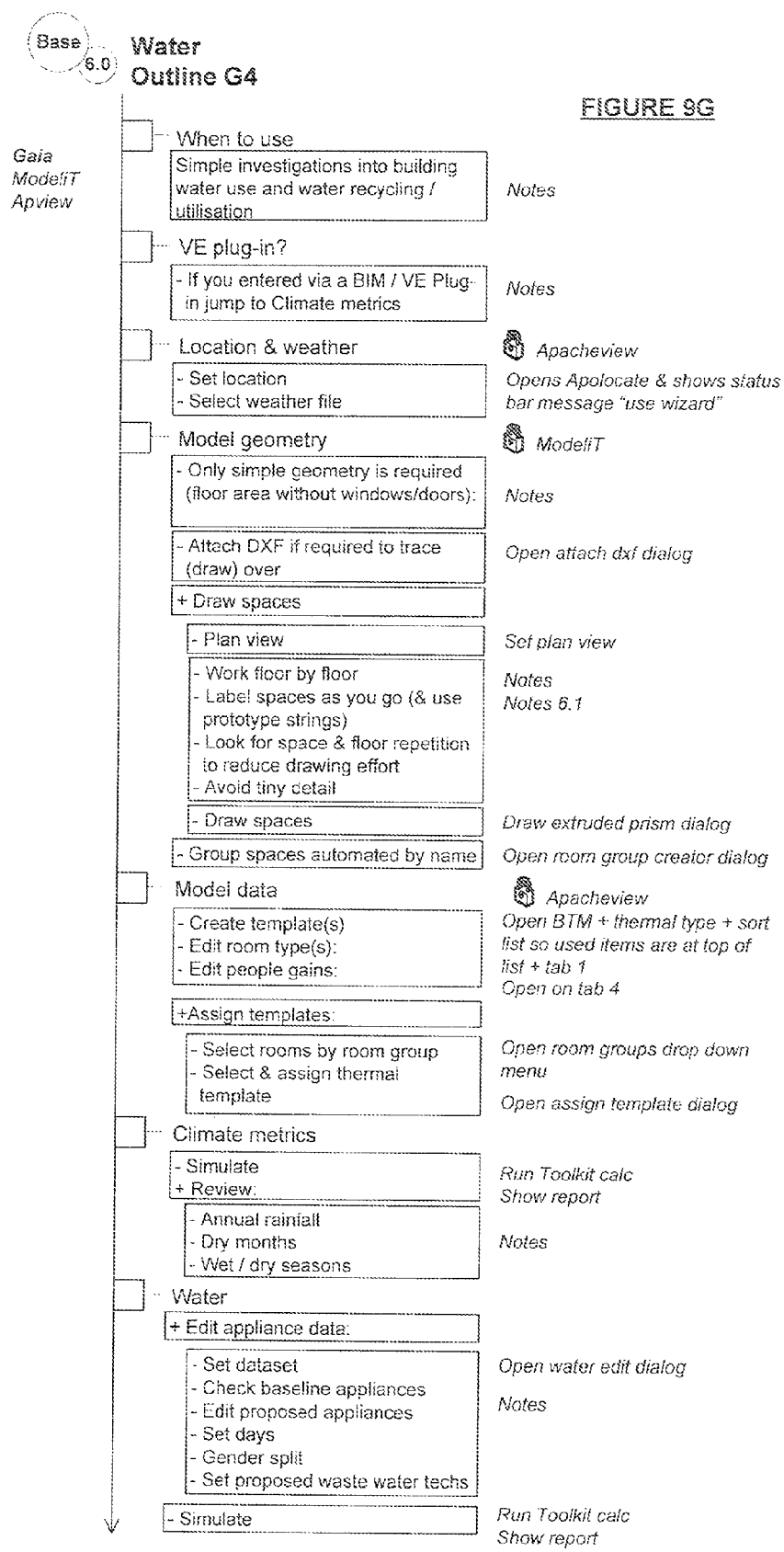
Figure 9H:
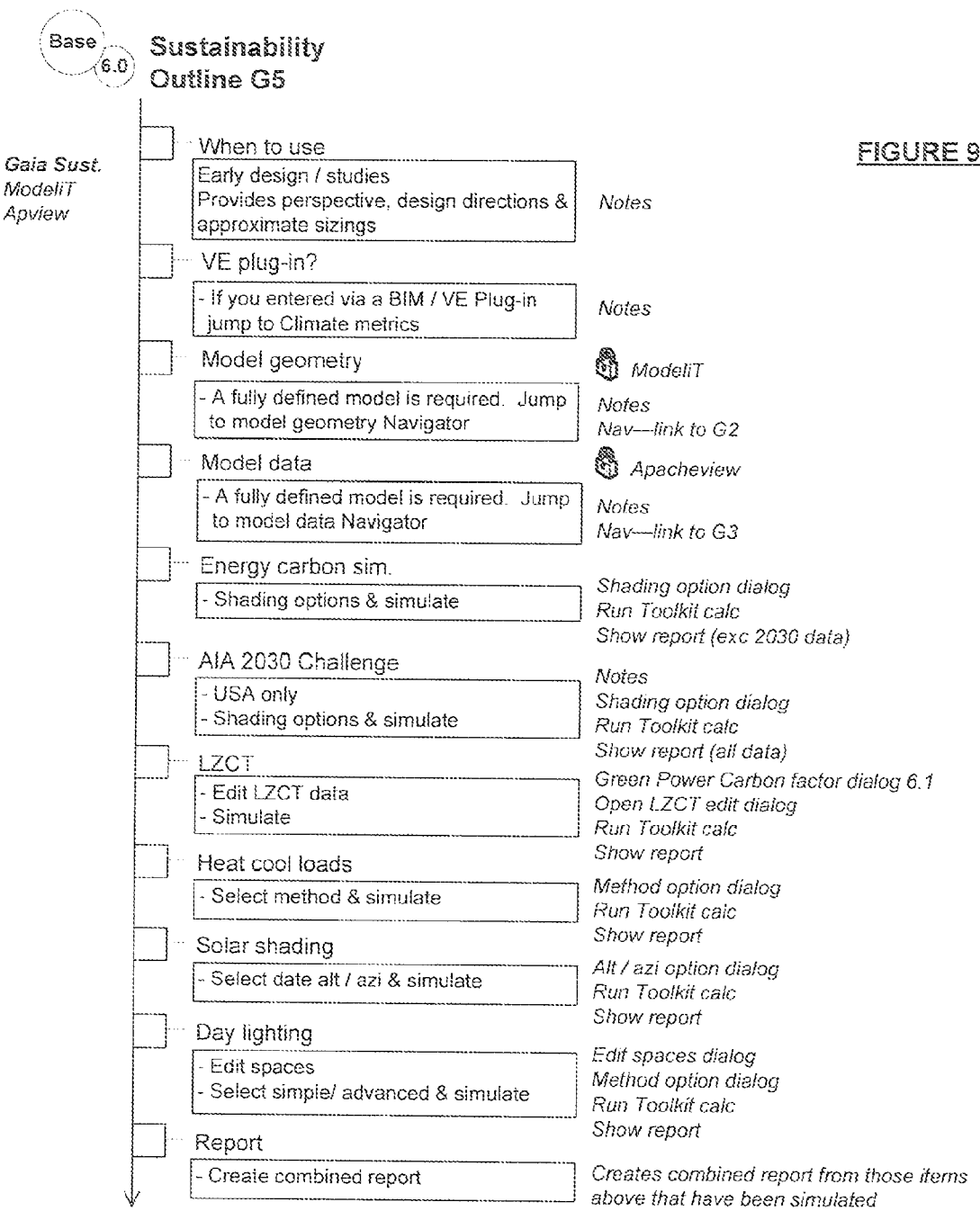
Figure 9I:
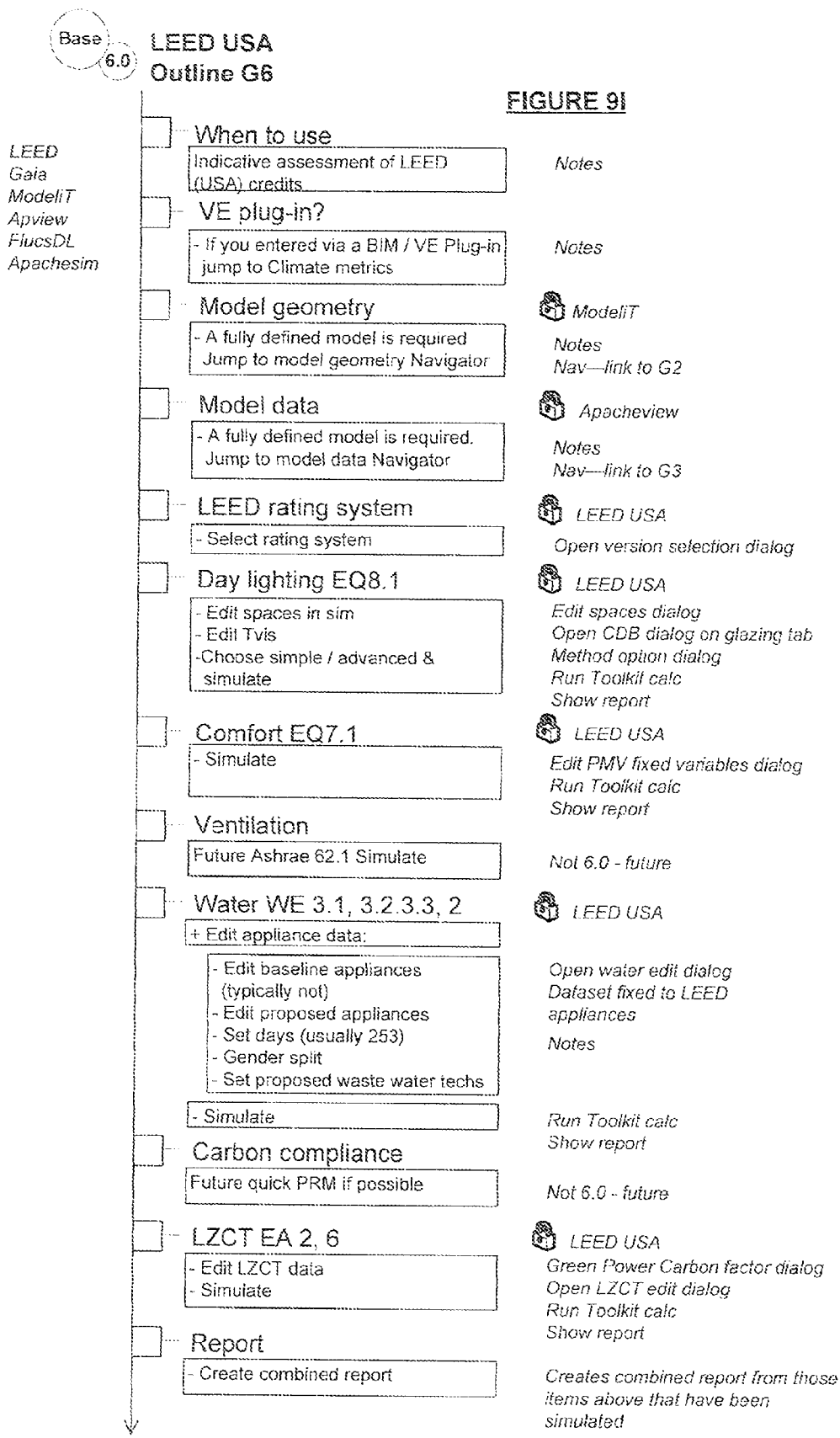
Figure 9J:
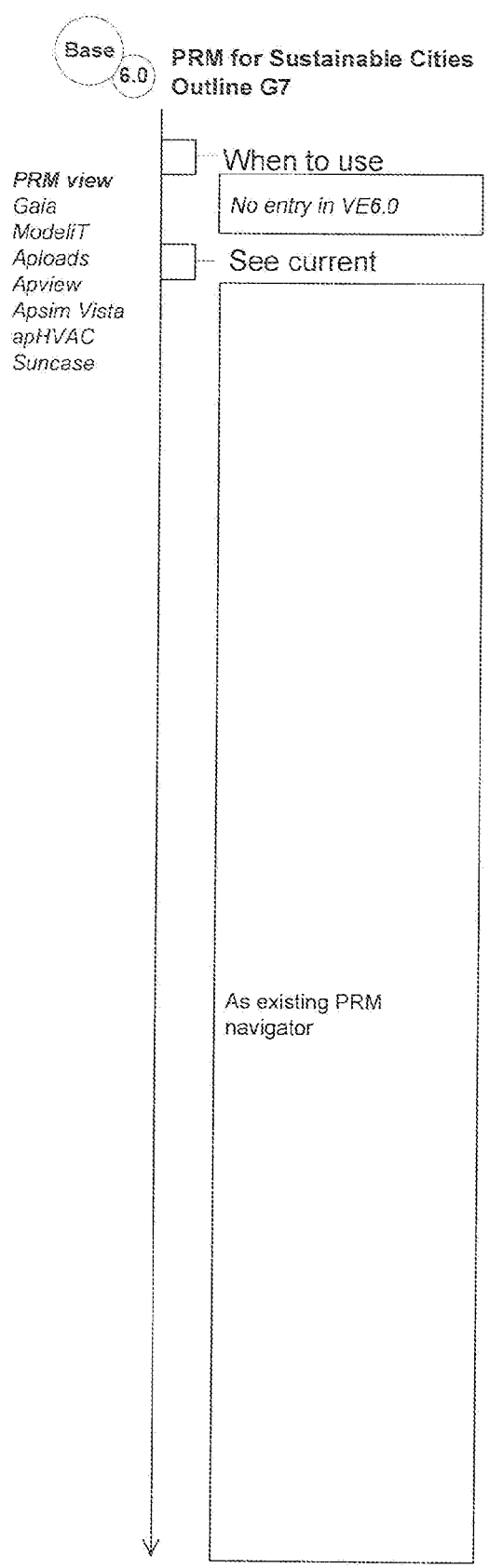

FIG. 9C illustrates an example of how to read workflow diagrams, according to one embodiment. For examples types of navigators are presented: base navigators, module specific navigators, special navigators, and customized navigators. Base navigators may be multi-purpose navigation tools for the VE which are part of the base Gaia (e.g., model creation navigator). These navigators may be provided free with the Gaia product. Module specific navigators may be module specific navigators (e.g., navigators for ApacheSim or Radiance). These navigators may be tied to a module license and may be thus paid for as part of the module cost. Special navigators may have added functionality that are purchased (e.g., PRM for Sustainable Cities). This category may include tutorials that are tied to paid for training. These navigators may have a license and an associated cost. Customized navigators or manufacturers navigators may be purchased or free. They may be distributed by IES or third parties.

FIG. 9B is a chart illustrating examples of workflow navigators (by title) grouped by type & overall logical order, according to an embodiment. Workflows can be grouped or organized according to workflow type (e.g., complete, build, data, built form analysis, simple analysis, detail analysis, result interrogation, bespoke (customized), tutorials) so that a navigator selector 950 associated with the navigator specified in FIG. 9A can offer a hierarchy (e.g., solutions) at a variety of scales that can be readily understood and easily navigated by a wide range user. The navigator selector 950 can include full navigators, part navigators, and complete navigators, build navigators, data navigators, build form navigators, simple analysis navigators, detail analysis navigators, result interrogation navigators, bespoke (customized) navigators, tutorial navigators, and additional navigators. The full navigators can include application selectors (e.g., product functional modules, product bundles), complete workflows that provide full design processes based around large scale workflow needs (e.g., concept design, detailed design). Part workflows can be specific tasks that are carried out as part of larger workflow made of sequential use of part workflows (e.g. build, data, analysis, etc.). Bespoke and tutorial tasks can be recognizable tasks. These can be workflows that are smaller than full workflows but include full design processes that are self-contained (e.g., how to model a zero carbon house, how to create a model, etc.). Corporate workflows that can be commissioned by clients are full workflows for standardised corporate quality assurance (QA) based modelling. The full navigators can include part workflows and any customized elements tied together into a whole. The number of full navigators can be controlled and/or limited.

Part workflows can include specific tasks which, when combined sequentially by the a user, provide a rich and flexible route through the majority of modelling activities to goals/outcomes (e.g., geometry creation, making and assigning constructions, simulation, making and using profiles, results analysis, etc.). For example, the manner in which the workflows are named and grouped in FIG. 9A forms a macro order. All workflows can be made of elemental components from a code library, for example. Tutorials can include partial workflows that echo, support, and/or add persistence to training courses.

FIGS. 9D-9J illustrate schemas for multiple workflow navigator examples, according to one embodiment. For example, the specifications in FIGS. 9D-9J detail to developers what a specific workflow does, how it goes together, and what actions are required.

Figure 10A:
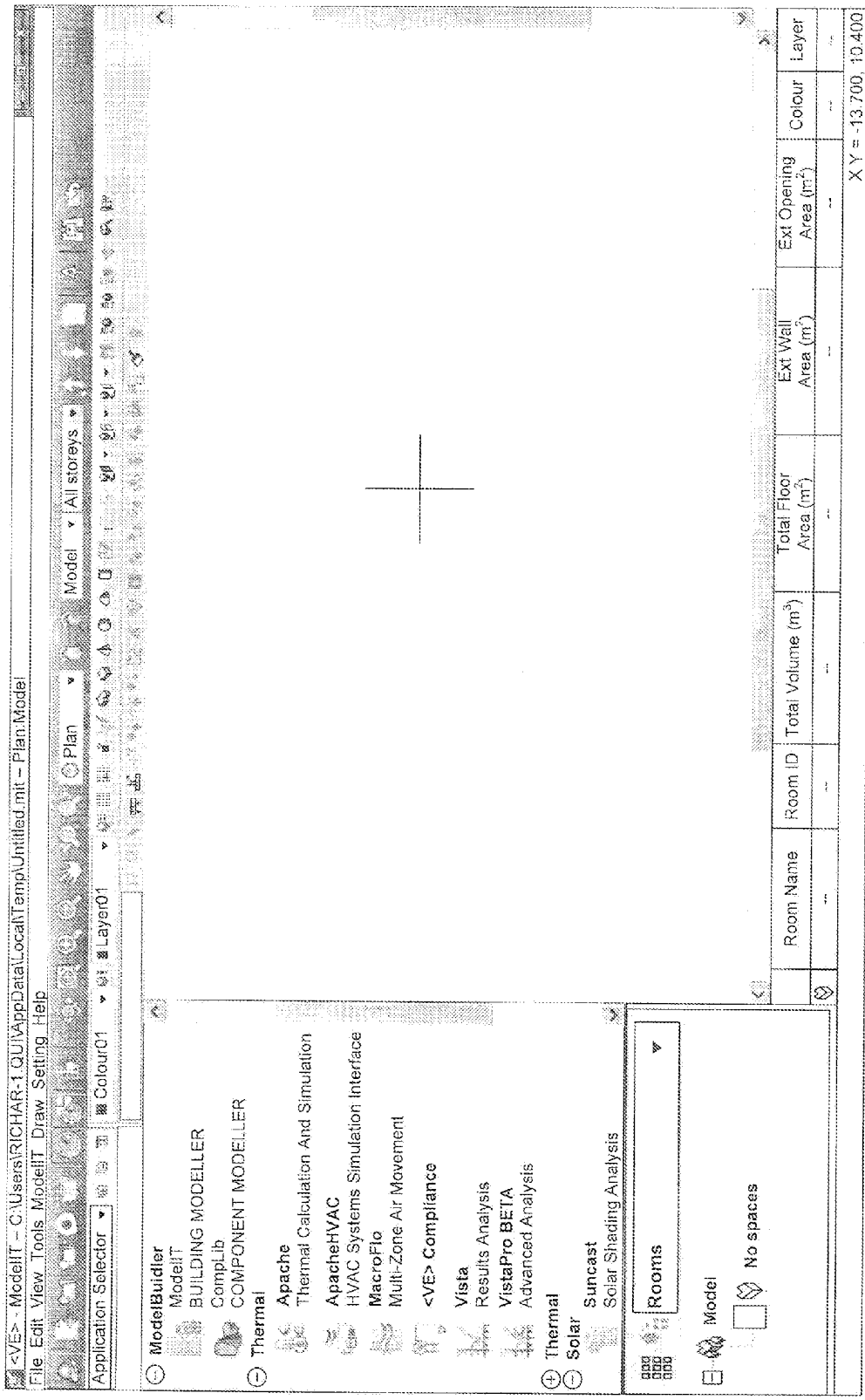
Figure 10B:
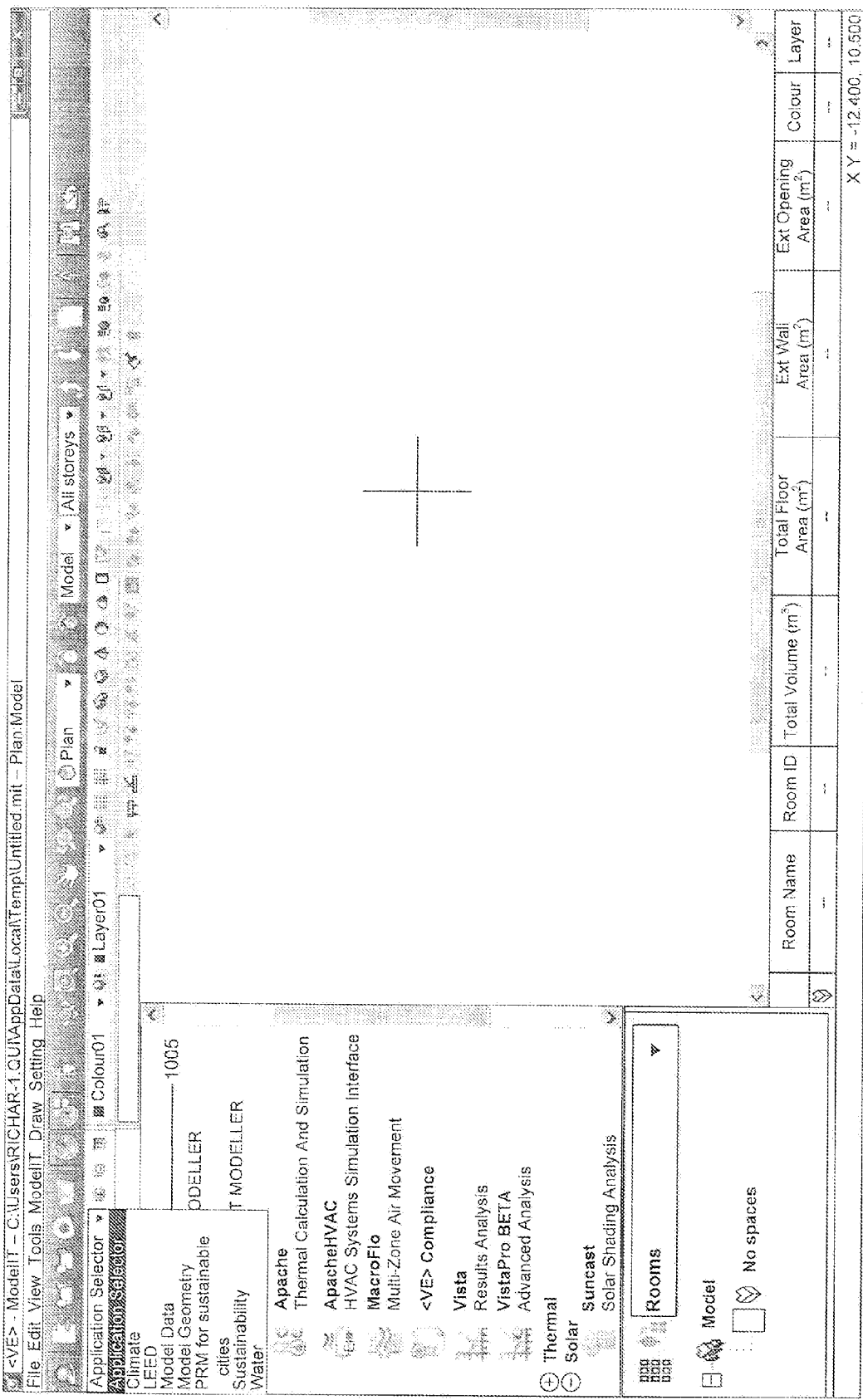
Figure 10C:
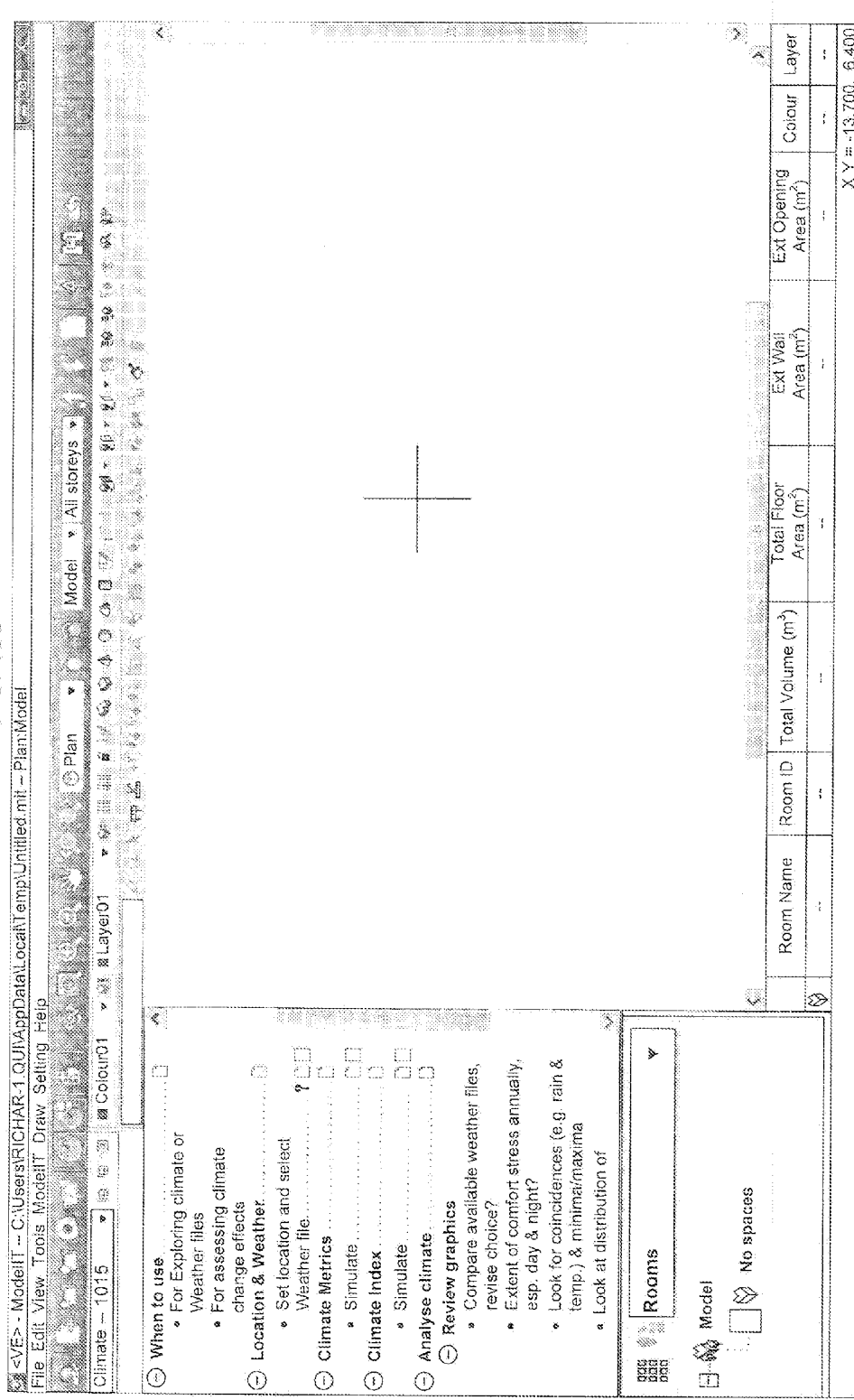
Figure 10D:
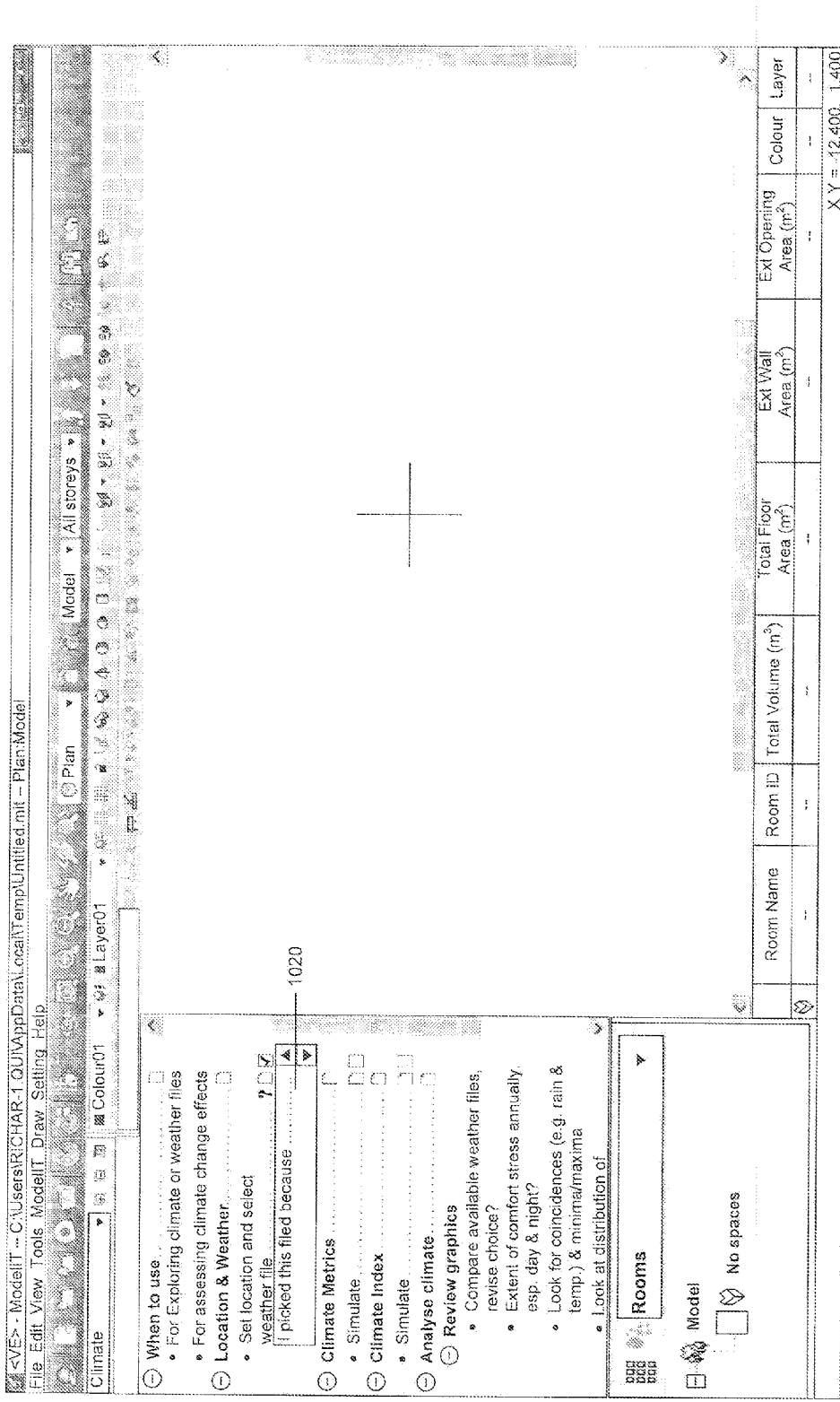
Figure 10E:
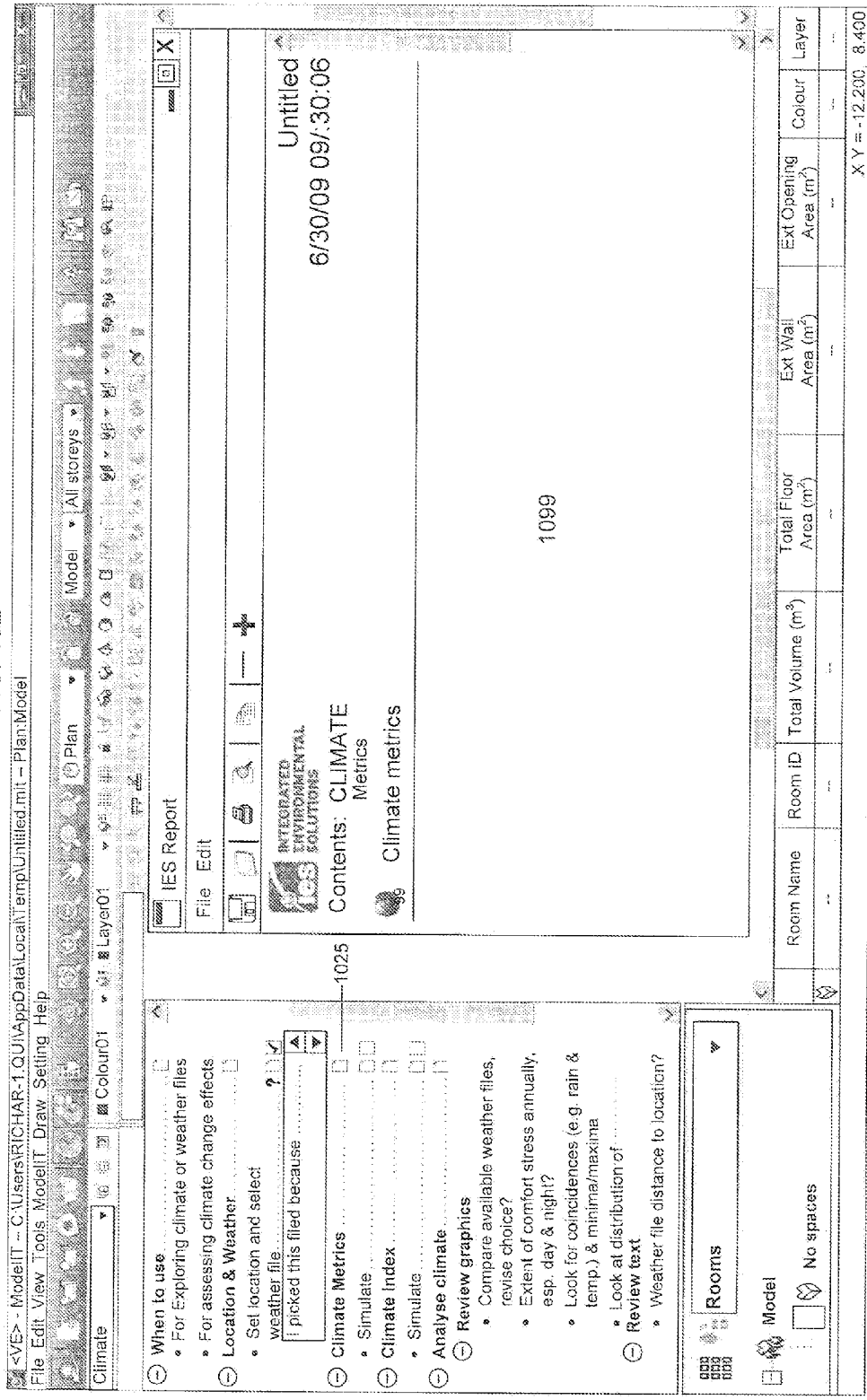
Figure 10G:
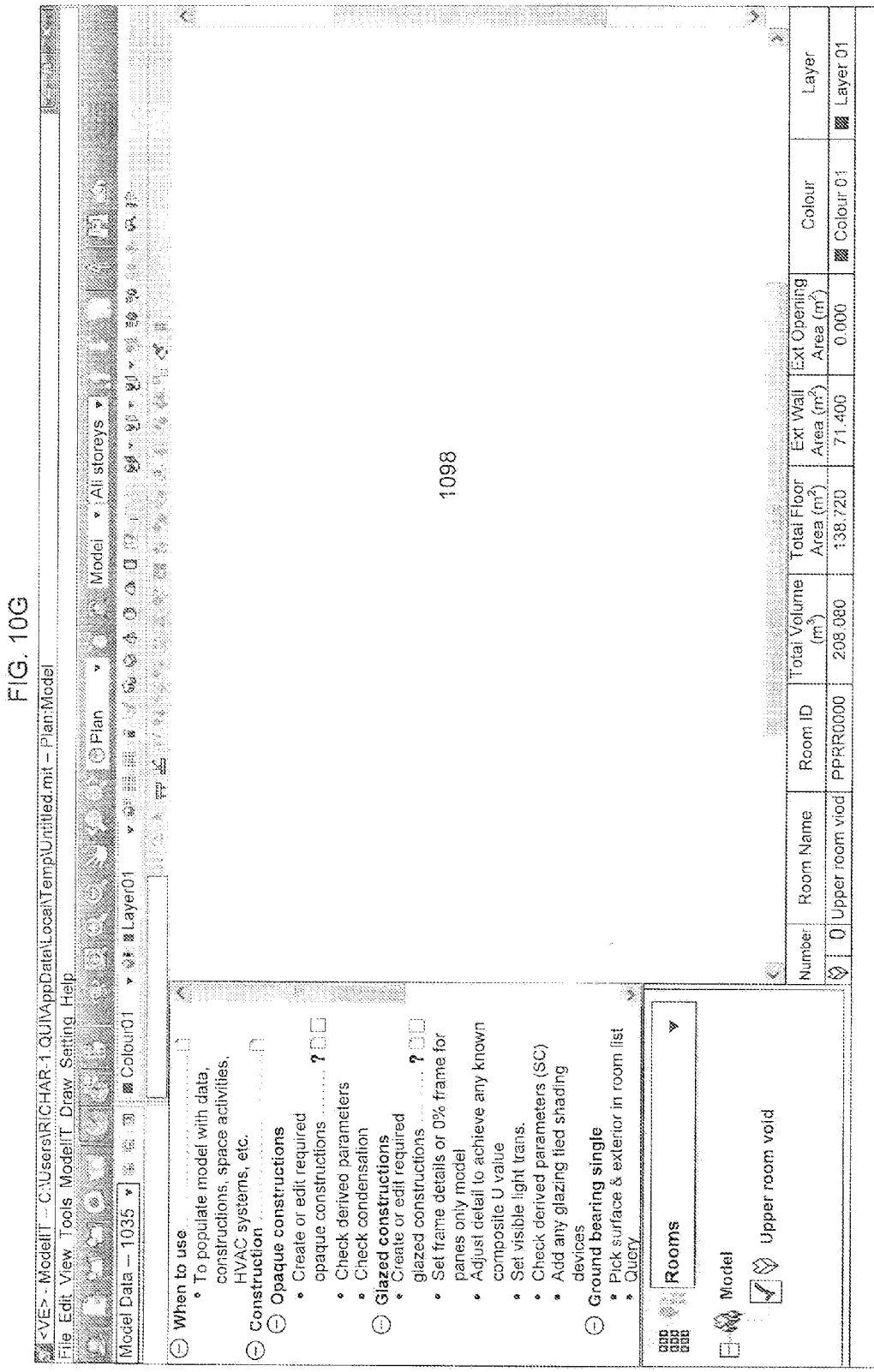
Figure 10H:
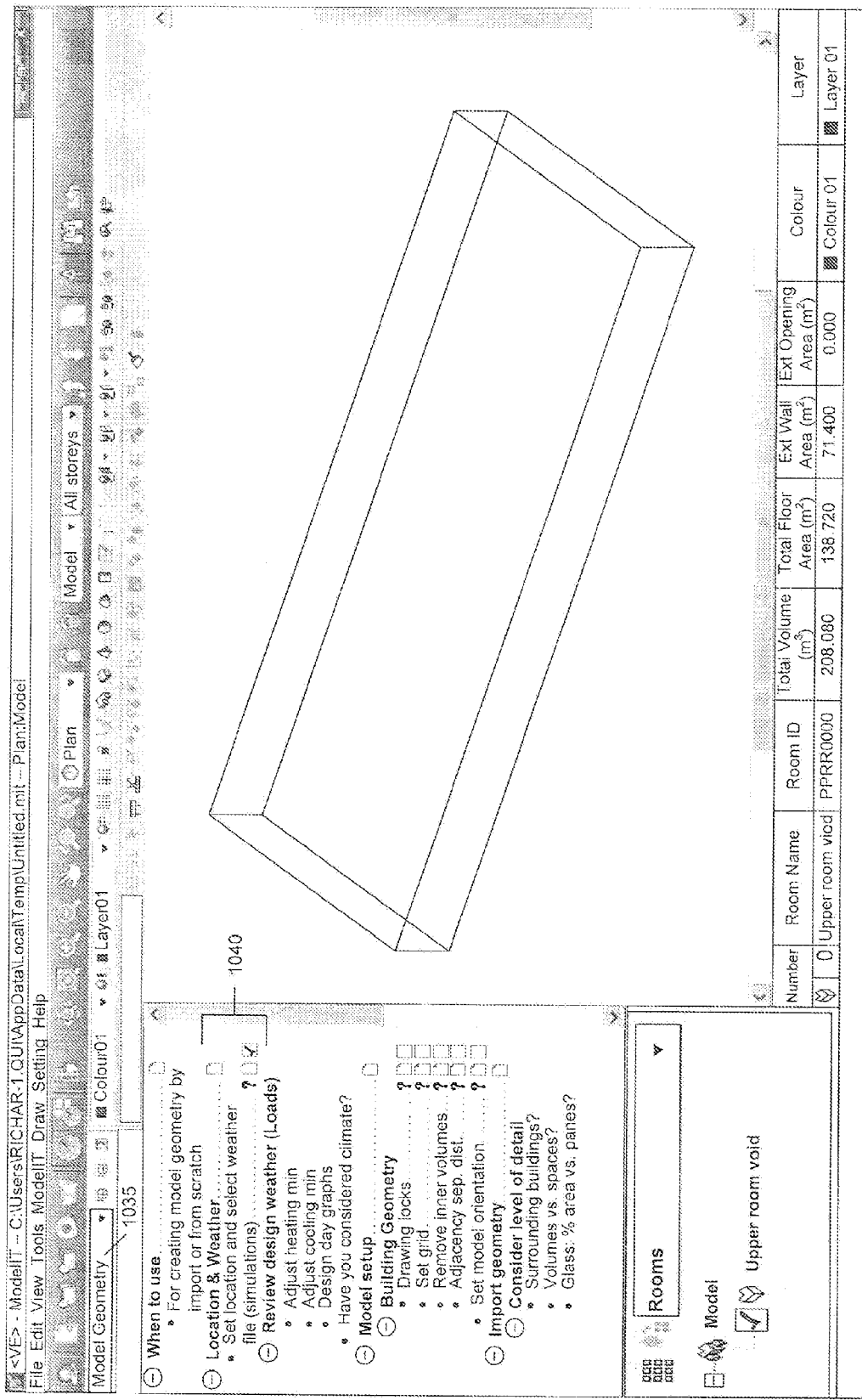
Figure 10:
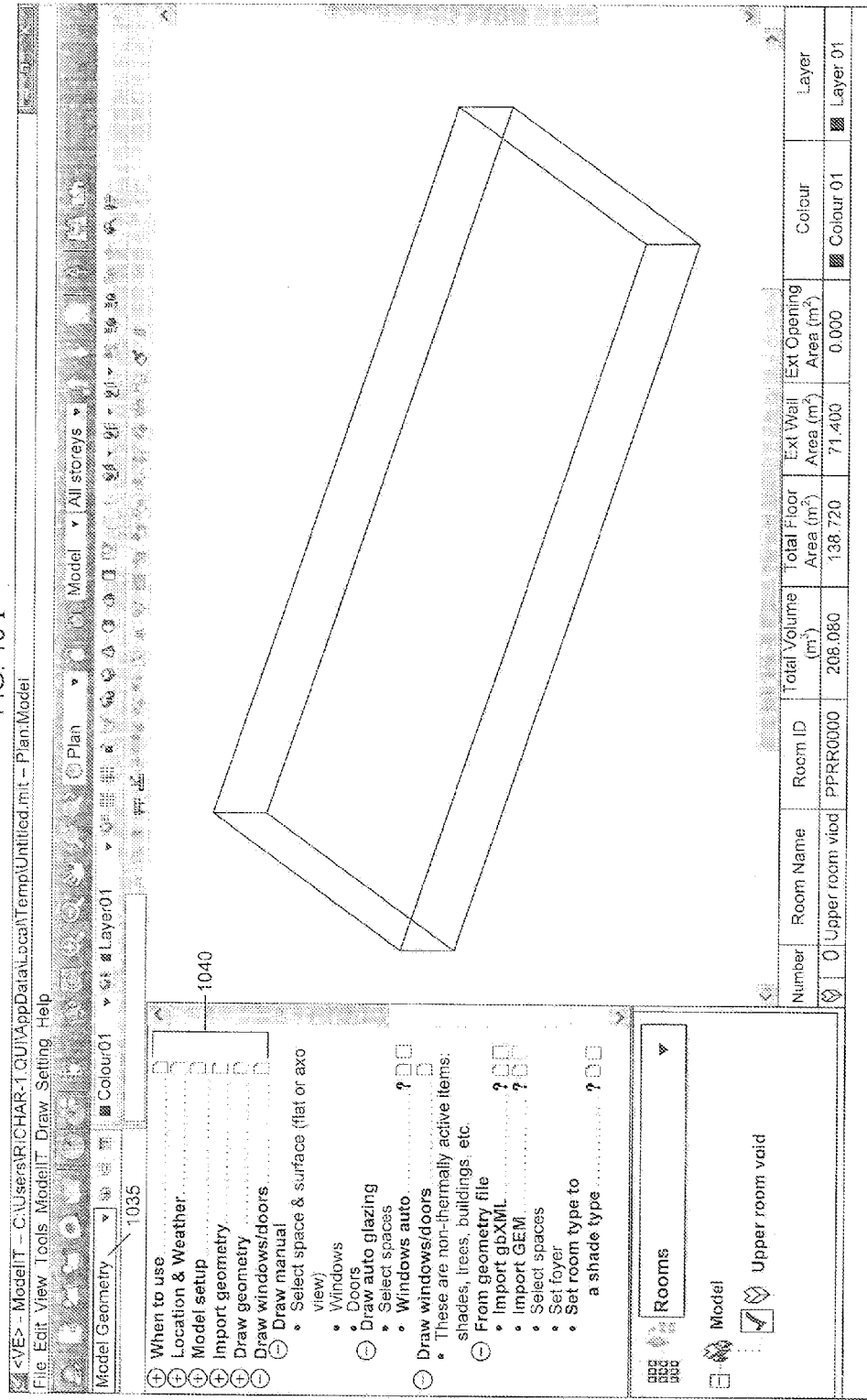
Figure 10J:
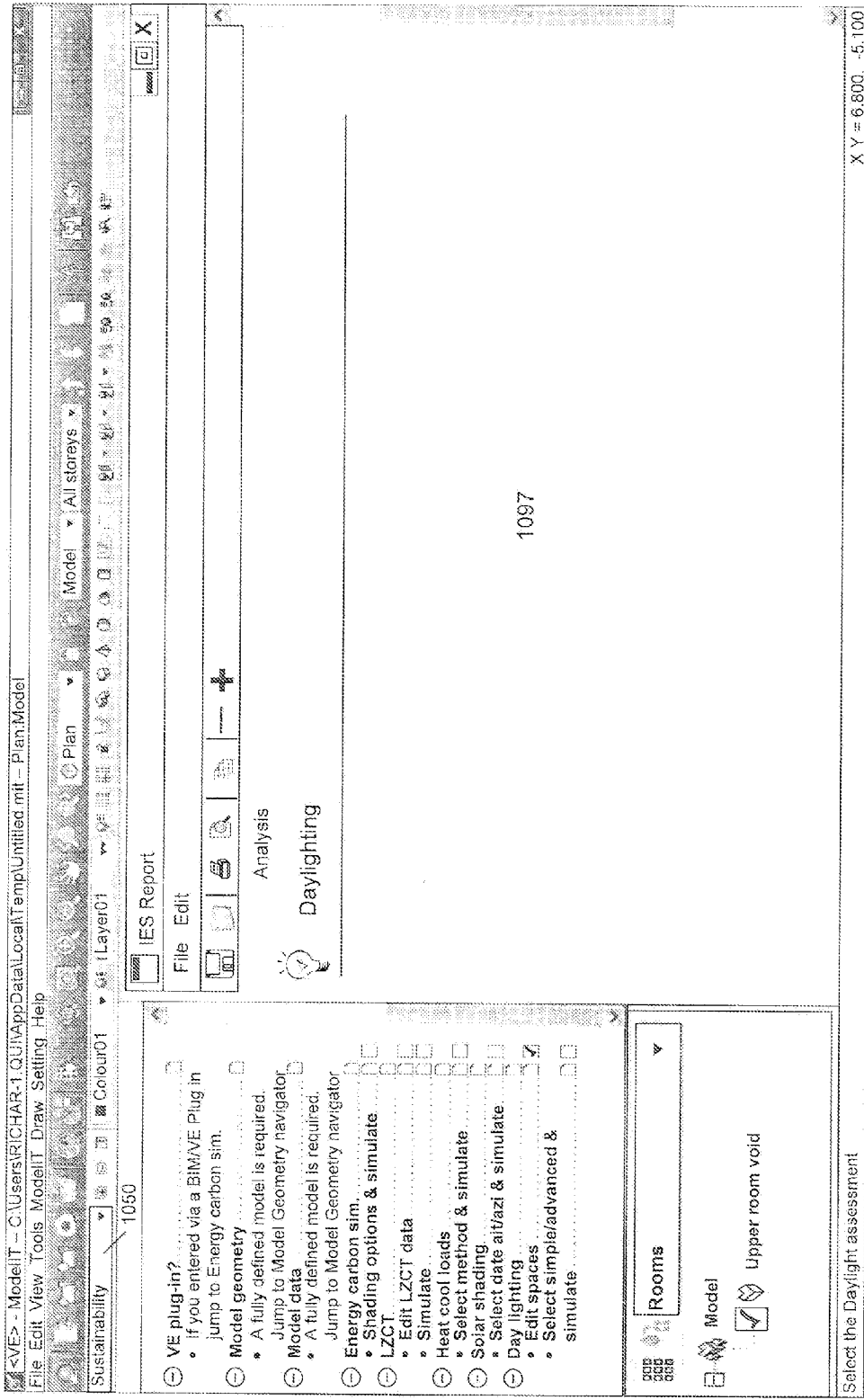
Figure 10K:
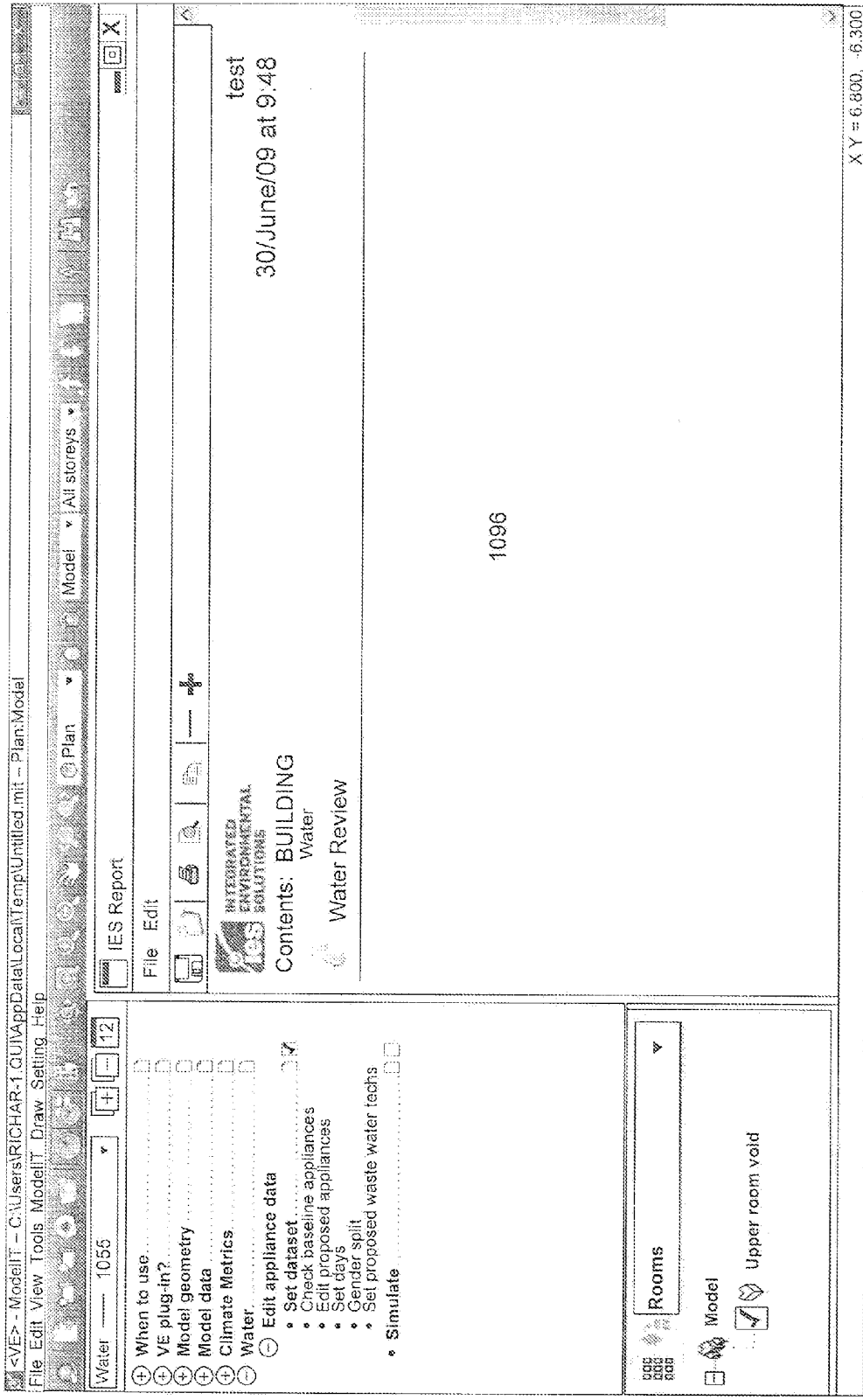
Figure 10L:
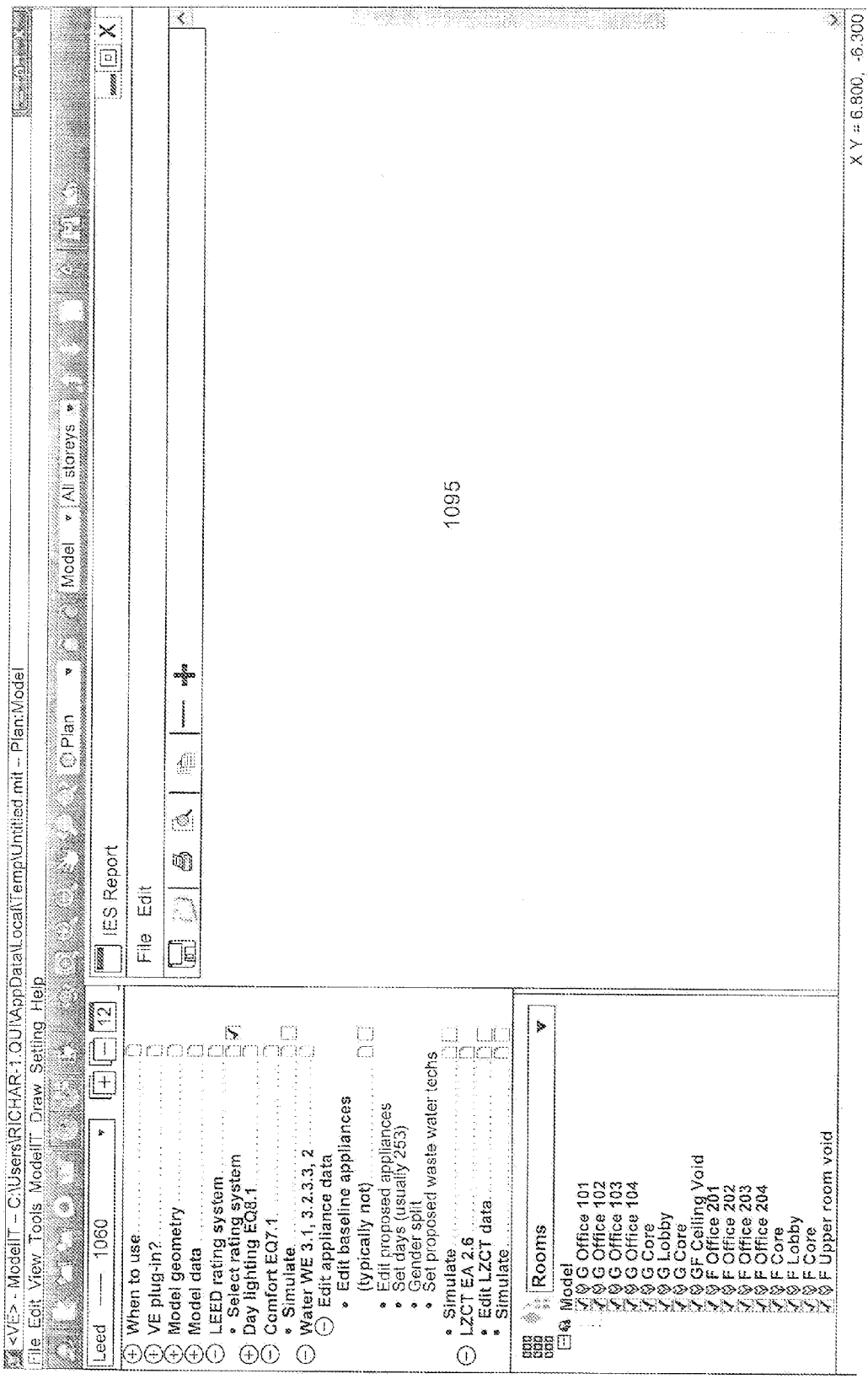

FIGS. 10A-10L illustrate another example of a working navigator, according to one embodiment. FIG. 10A illustrates a user interface, according to one embodiment. FIG. 10B illustrates the user interface with the drop down menu of navigator workflow options 1005, according to one embodiment. FIG. 10C illustrates a climate navigator 1015 that has been chosen, according to one embodiment. FIG. 10D illustrates the climate navigator 1015 with user notes 1020. FIG. 10E illustrates the climate navigator with the climate metrics 1025 chosen and a climate report 1099 generated, according to one embodiment. FIG. 10F illustrates the climate navigator with the time/date/user stamps 1030 utilized, according to one embodiment. FIG. 10G illustrates a model data navigator 1035 and model data 1098, according to one embodiment. FIG. 10H illustrates the model geometry navigator 1035 with the location and weather item 1040 (completed in the previous climate navigator 1015) already completed. This illustrates how navigator components can be kept up to date in all workflows as workflows are changed. FIG. 10I illustrates the model geometry navigator 1035 after progressing through the workflow sections checked off (1045) (e.g., can be in a color such as green) so the user can minimise the groups to see progress and required actions. FIG. 10J illustrates a sustainability navigator 1050 and sustainability report 1097, according to one embodiment, where a generated report can be produced including a dynamic "video" of the daylight results and a dynamic table of the results. FIG. 10K illustrates a water navigator 1055 and water report 1096, where a generated report of water simulation is produced including charts and result details, according to one embodiment. FIG. 10L illustrates a LEED navigator 1060 and LEED analysis report 1095, where a generated report can be produced including a dynamic "video" of the comfort results, a dynamic table of the results, and the credits likely to be achieved with the design, according to one embodiment.

INTELLIGENT ROOM GROUPS. Building analysis software can utilize a great deal of data that defines properties (e.g., thermal, light, water), the use of spaces (e.g., occupancy, activities) and how the building is actually used (e.g., occupation, openings and HVAC systems). Researching, generating, and assigning this data can constitute a very significant portion of modelling time. Intelligently grouping and/or ordering spaces in a building design, such as choosing proper spaces and making group wide data assignments, can be useful in reducing modelling time.

Similarly, viewing the results that are produced by simulations can take considerable time as interpretation requires the review of many combinations of spaces at a number of scales and against numerous output conditions and tests. By providing combinations of spaces or conditions that are dynamic and can be created quickly and accurately during model definition, during data assignment or following simulation, significant productivity gains can be achieved.

The intelligent room groups module 185 can be configured to support an intelligent room groups method in which spaces in a model can be automatically ordered and/or grouped. A user can define or pre-select a strategy to automatically process the model data and geometry and automatically place spaces in an appropriate grouping. The groups can include, for example, building floors, building departments, same space function, same properties (e.g., space size, thermal weight, glazing area, hvac system) and orientation.

There can be multiple grouped room strategies in any one model. The user defined or pre-selected strategy can be simple, such as a strategy based on space size, or can include a fairly complex pattern, such as a strategy based on space and name string combinations or on space property data, such as an hvac system.

For the analysis of the results, the intelligent room groups module 185 can use a user defined or pre-selected strategy to automatically process the model results and automatically place spaces in an appropriate room group so that they can be seen together or identified quickly in visual output. The groups can include spaces that exceed a threshold(s) (e.g., temperature, $CO_2$, comfort), or that meet a certain requirement (e.g., energy compliance), or that have a complex combination of several conditional tests (e.g., room temperature exceeds 25 degrees Celsius for more than 5% occupied hours and exceeds 28 degrees Celsius for more than 1% occupied hours), or that involve results of post processing (e.g., pattern analysis—diurnal temperature swing trend, comfort analysis).

The defined or pre-selected strategy can also be applied specifically to existing groups to provide compound outcomes.

Figure 11:
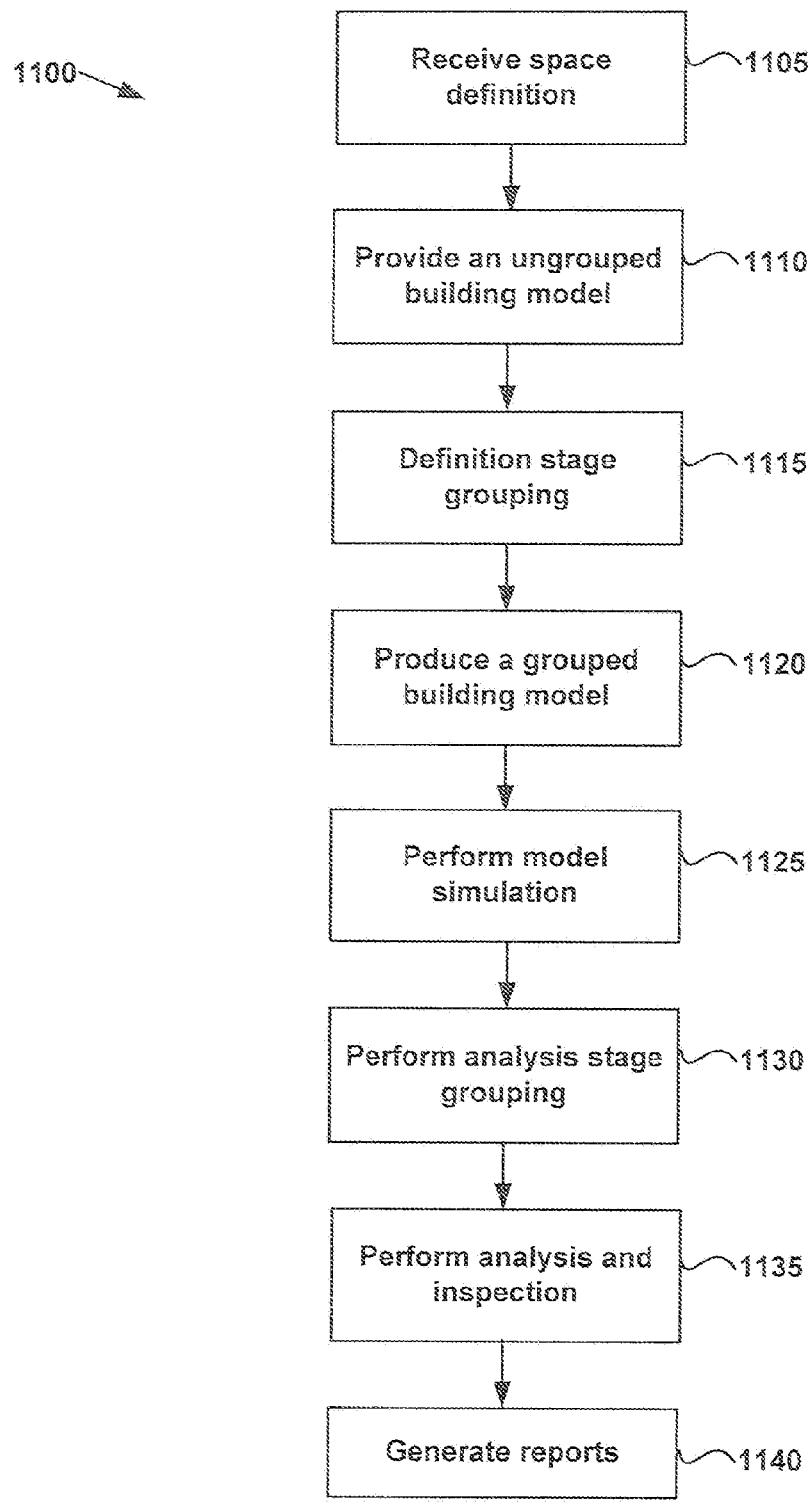
FIG. 11 is a flow diagram illustrating an intelligent room groups method, according to an embodiment.

FIG. 11 is a flow diagram illustrating an intelligent room groups method, according to an embodiment. At 1105 of flow chart 1100, a space is defined based on, for example, occupancy, constructions, activity, HVAC systems, space geometry, materials usage, and/or water usage, for example. At

1110, an ungrouped building model can be provided based on the information from 1105. The ungrouped building model is such that there is no hierarchy as to the rooms or buildings (at a large scale). In urban models (multiple buildings) or large buildings, with many different types and configurations of rooms, a lack of room hierarchy in the analysis can be an serious issue. At 1115, one or more groupings are defined for the model. Either a manual or an automated grouping process can typically group rooms into a number of basic and concurrent groupings such as floor, room type, size, and HVAC system, for example.

At 1120, a group model is produced in which one or more hierarchies are defined with respect to the buildings and rooms. Establishing a room hierarchy allows users to quickly identify physical patterns or make selections by groups for various purposes, including data assignment, for example. At 1125, a simulation of the model can be performed. The simulation can produce unsorted data that can be analyzed in various ways.

At 1130, an analysis stage grouping can be performed. The manual and/or automated grouping process can be used to group rooms after the simulation into one or more advanced concurrent groupings based on, for example, overheating, comfort, compliance, hours unmet, daylight level, and/or checks. At 1135, an analysis and inspection can be performed. By having the rooms grouped, a user can perform assessments, spot trends, and draw conclusions effectively and accurately. The design advisor (see above) can also utilize room grouping to produce metrics. The user can also perform further groupings to refine the analysis. At 1140, a report generator can be used to produce automated reports based on results from the analysis and inspection at 1135.

Figure 12A:
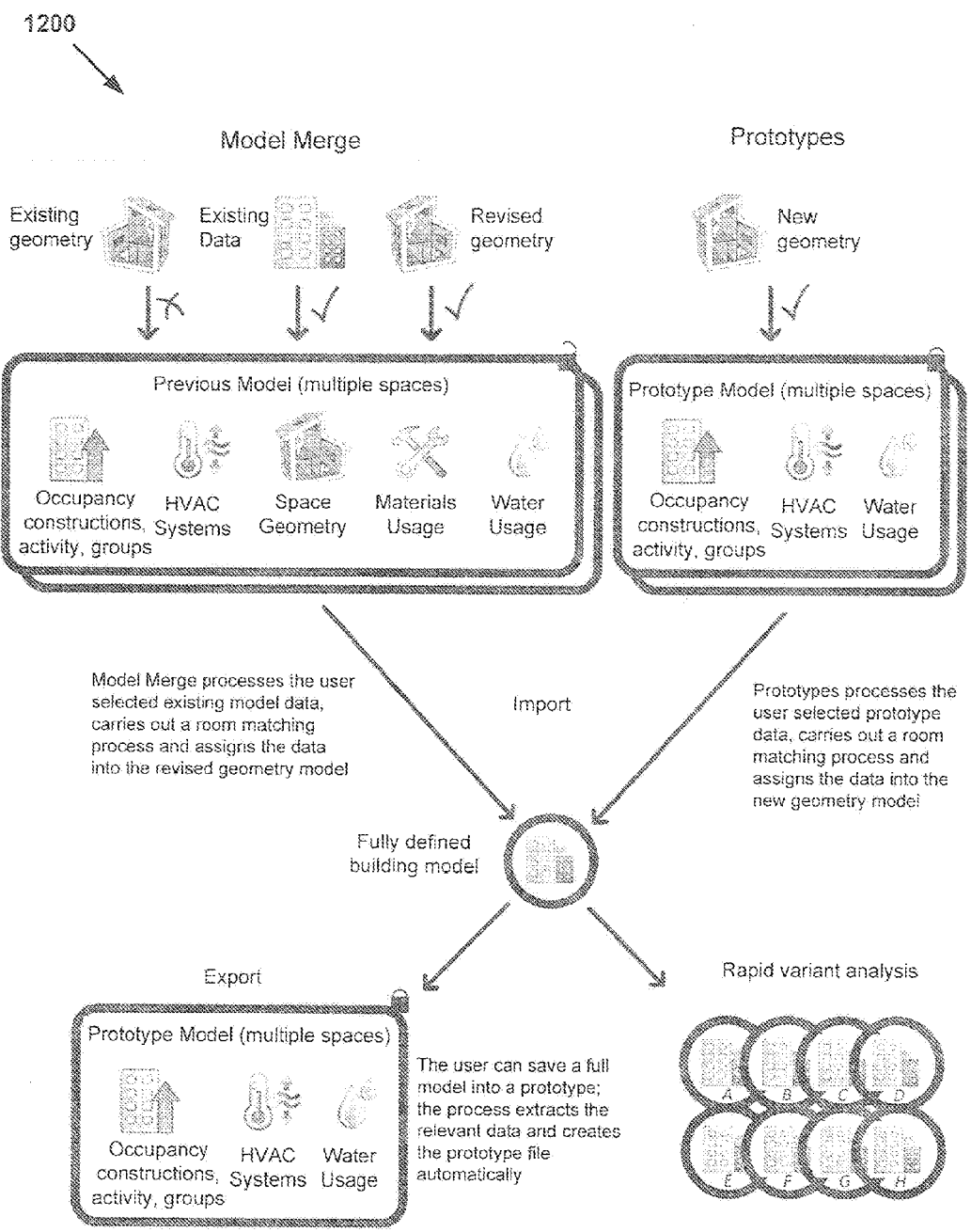
FIGS. 12A-12E illustrate a model merge method, according to an embodiment.

MODEL MERGE. FIG. 12A is a flow diagram illustrating a model merge method, according to an embodiment. Model merge can be used when a previous model can be used (with some tweaks if necessary) and merged it into current design so important data from a working model can be merge into a new design (e.g., for an architect). Prototypes can be templates (not requiring any geometry or building data) about certain characteristics (e.g., what a classroom is and how it is used). A user can use prototypes to save many kinds of data and bring it into a new model (e.g., for a school). To start a project, a user could choose between a model merge or a prototype so that previous data can be utilized to streamline the project. A user could also use a prototype in part to save favorite constructions. So if a particular room or window design is helpful, a user can pull it in.

Figure 12B:
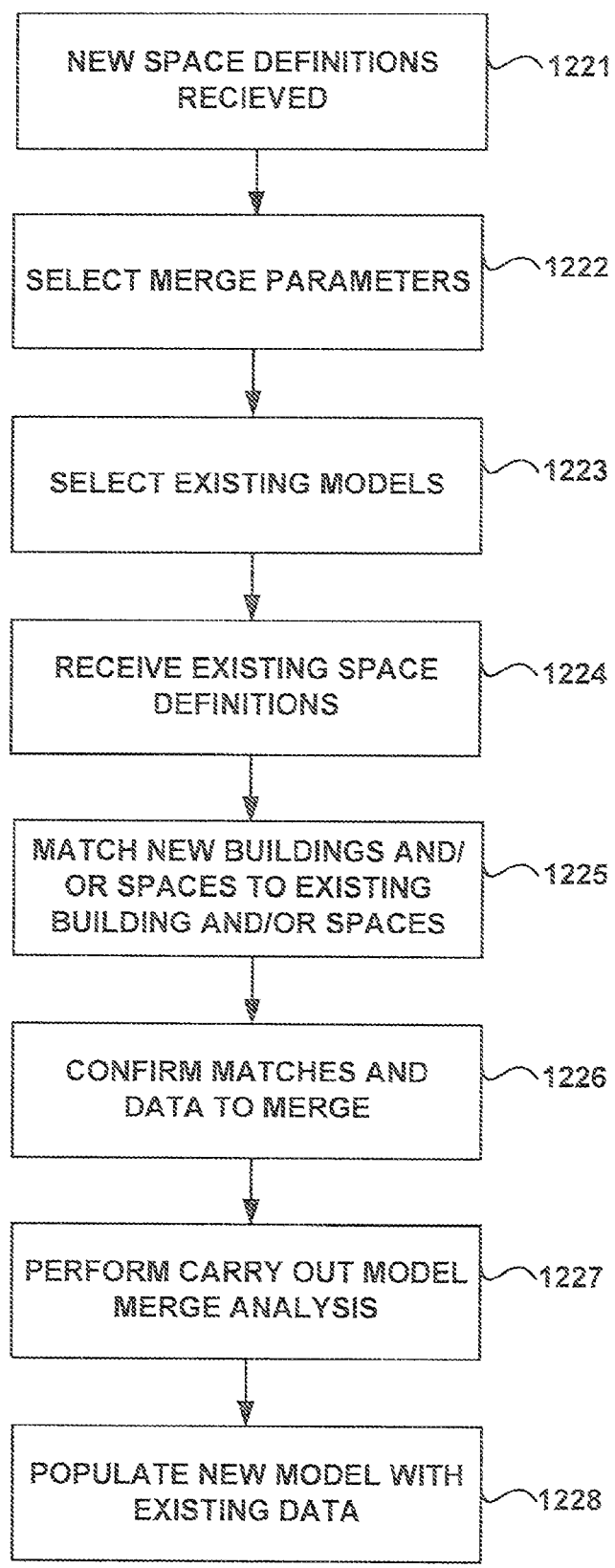

FIG. 12B illustrates a process of model merge flow, according to one embodiment. In 1221, new space definitions (e.g., new model geometry) can be received. In 1222, a user can select merge parameters (e.g., how to match buildings, rooms using name, size, etc). In 1223, a user can select existing models. In 1224, existing space definitions (e.g., templates, systems, constructions, profiles, materials, water, grouping, etc.) can be received. In 1225, analysis can match new buildings and/or spaces to existing buildings and/or spaces. In 1226, a user can confirm matches and data to merge. In 1227, a carry out model merge analysis can be done to apply existing data to a new model on a room by room basis. In 1228, the new model is now populated with existing data.

Figure 12C:
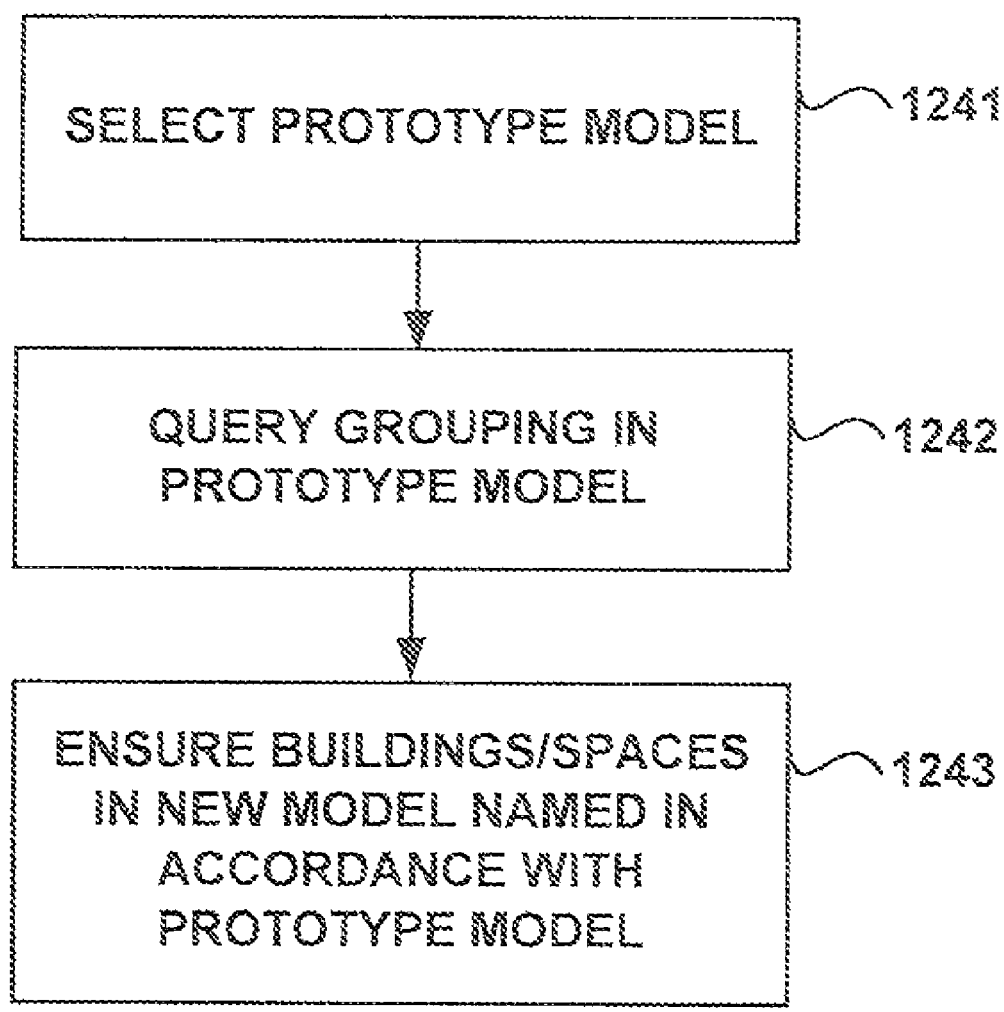

FIG. 12C illustrates a process of prototype (query) flow, according to one embodiment. In 1241, a user can selects a prototype model. In 1242, the user can query grouping in the prototype model (e.g., what groups/names used). In 1243, the user can ensure buildings and/or spaces in the new model are named in accordance with the prototype model.

Figure 12D:
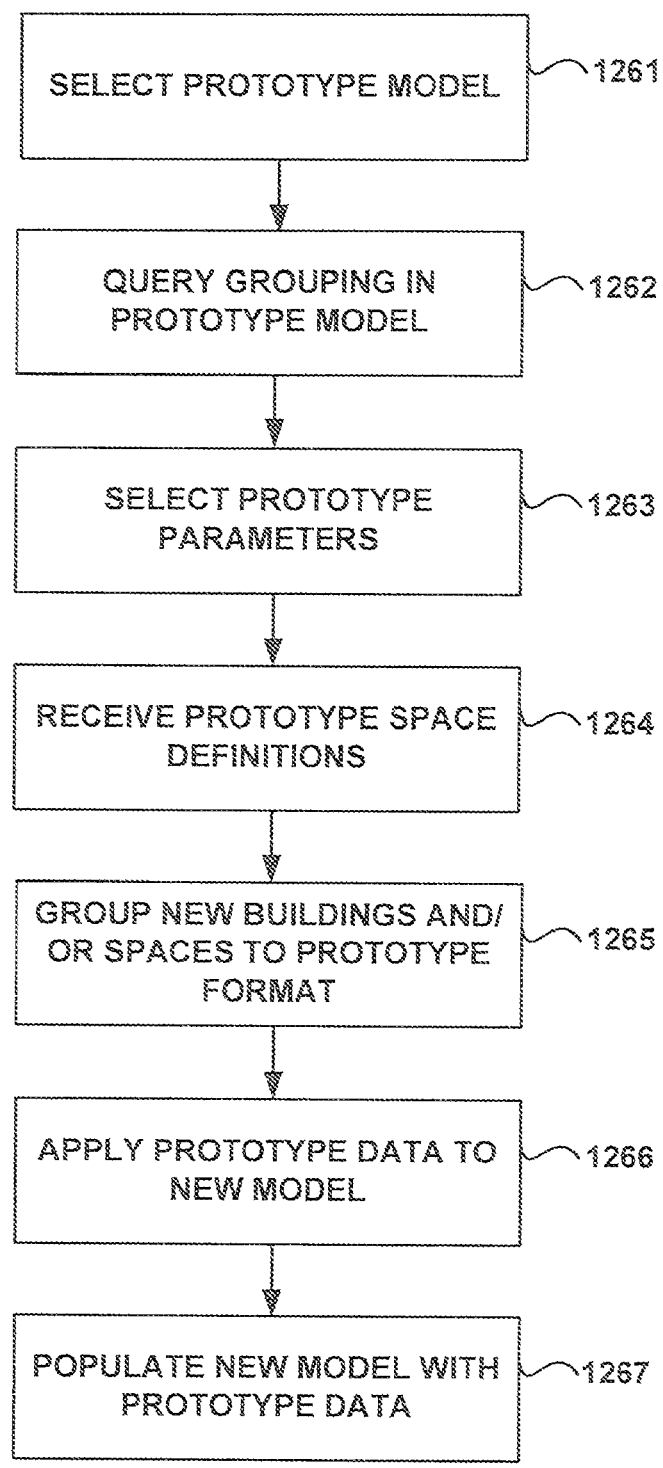

FIG. 12D illustrates a process of prototypes (load) flow, according to one embodiment. In 1261, the user can receive new space definitions (e.g., new model geometry or part of). In 1262, the user can select a prototype model. In 1263, the user can select prototype parameters (e.g., what data to load, whether to just load or load and apply). In 1264, the user can receive prototype space definitions (e.g., templates, systems, constructions, profiles, materials, water, grouping, etc.). In 1265, analysis can group new buildings and/or spaces to prototype format. In 1266, the model prototype analysis can be carried out to apply prototype data to the new model on a room grouping basis. In 1267, the new model is now populated with prototype data.

Figure 12E:
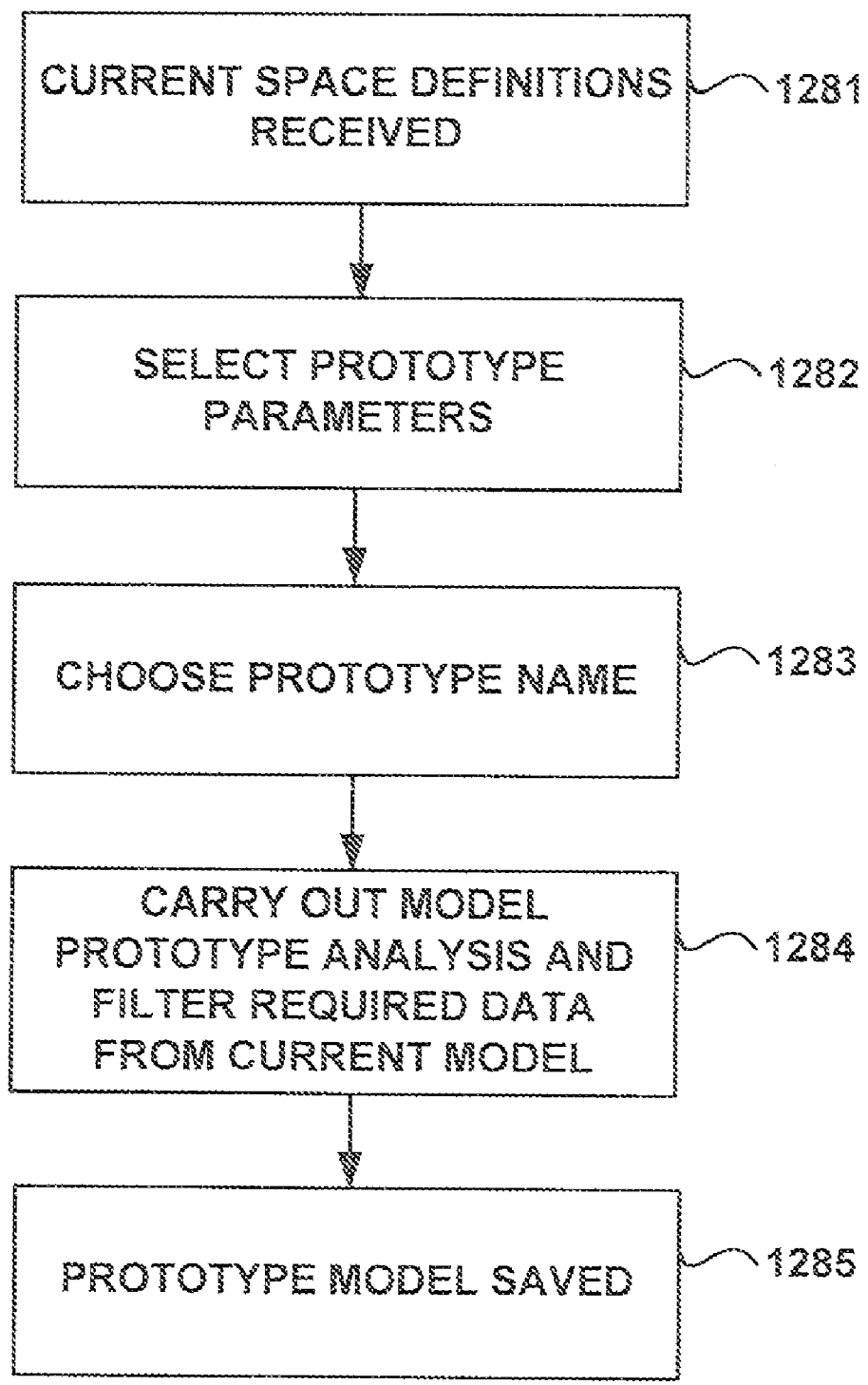

FIG. 12E illustrates a process of prototype (export) flow. In 1281, current space definitions (e.g., geometry and space definition data or part of) can be received. In 1282, the user can select prototype parameters (e.g., what data to save such as full prototype—templates, systems, constructions, profiles, materials, water, grouping etc or just constructions). In 1283, the user chooses a prototype name. In 1284, the model prototype analysis is carried out and required data is filtered from current model (e.g., as selected above but excluding geometry). In 1285, the prototype model can be saved.

In one embodiment, model data can be organized into an object-based hierarchy based on multiple levels. For example, a building level can be used in which users can apply a smart template to a whole building model or to many buildings in an urban model. For each building type (e.g., office, school, house, etc.), the smart template can define the typical space types involved. Smart templates can be grouped and stored in prototype files. Prototype files can save all or part of the definition data in a model (e.g., templates, systems, constructions, profiles, materials, water, grouping, etc.).

In another example, a space level can be used in which users can also apply a smart template to a space or spaces within a model. Each space type can define properties of that space type, such as occupancy profiles, lighting profiles, and heating and cooling set points, for example. This information can be referenced from elemental databases.

The assignment of data can be automated such that in an urban model a relevant building template can be assigned to a building. Within each building type, an appropriate space template (e.g., office, corridor, we, etc.) can be assigned to each space.

Assignments and revisions that occur during the model's lifecycle can be cascaded through the hierarchy and can be automated using the functions supported by the model merge module 190 (e.g., a new model geometry is supplied and the user wishes to transfer the data from a previous model to the new geometry). Moreover, model data assignment automation can be based on simple sensible geometry naming or space parameters such as area or volume. Such an approach can allow the use of software from a very wide range of users and the process can be carried out by less costly staff. The use of smart templates can prove particularly valuable at early stages when is important to produce variation analysis and fundamental decision making both quickly and accurately. The smart templates module 195 can be configured to support the use of smart templates.

Figure 13:
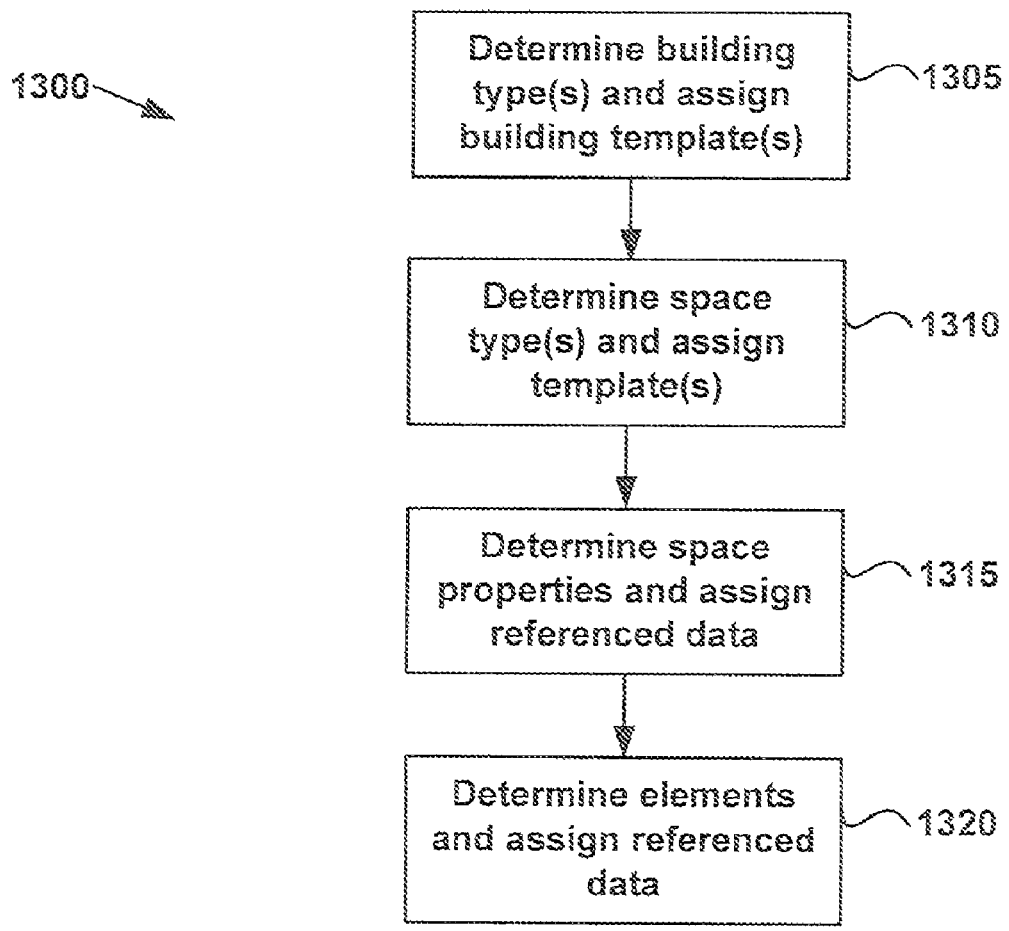
FIG. 13 is a flow diagram illustrating a smart templates method, according to an embodiment.
Figure 14C:
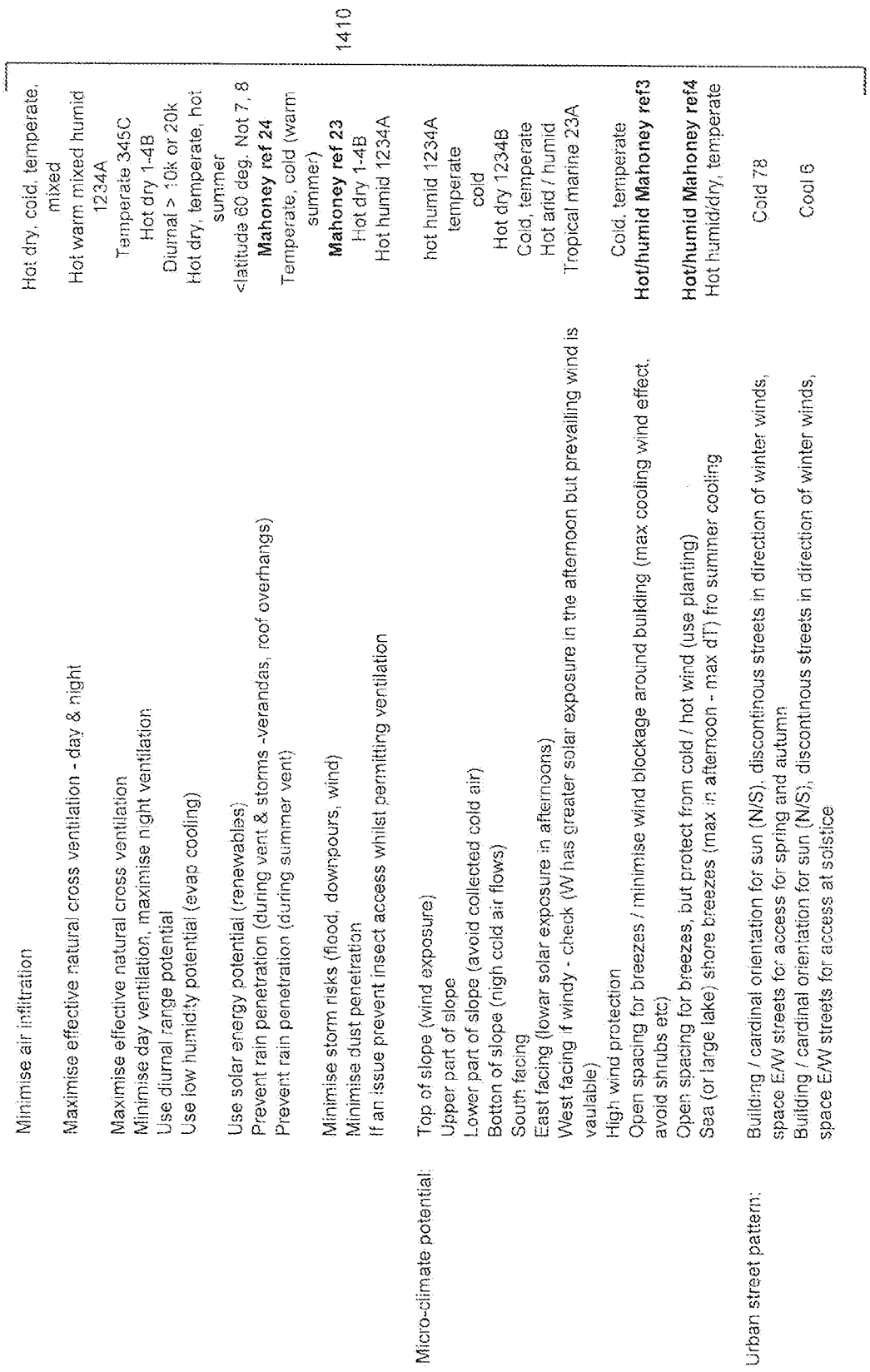

SMART TEMPLATES. FIG. 13 is a flow diagram illustrating a smart templates method, according to an embodiment. Smart templates can be a data hierarchy that permits application at many scales and facilitates automation.

In one embodiment, multiplexing can be applied in order to view and edit the smart template data (or any other hierarchical data). Thus, for example, if there is an urban model with many buildings (e.g., 10 offices, 300 houses), the user can apply template data (e.g., temperature, occupancy) using smart templates at the macro level using identifiers such as house and office to apply a specific dataset to each building type. In addition, each of the offices or houses can be represented by a stack of cards, and each card can contain a copy of the applied template data for each house. Multiplexing allows the user to globally edit any single data element en mass through the stack of cards (e.g., changing the temperature globally for all houses and/or for all offices). This multiplexing can be applied to buildings or any other repetitive data hierarchy (e.g., office, school buildings).

Referring to FIG. 13, at 1305 of flow chart 1300, a building type (e.g., house, school, office) can be determined for a building design and an associated building template comprising of a set of space templates can be assigned to the building based on the building type. At 1310, a space type (e.g., office, corridor, wc, etc.) can be determined in the building design and an associated space template (from the set of templates within the building template) can be assigned based on the space type. At 1315, space properties (e.g., occupancy and activity, HVAC systems, lighting, constructions, water usage, and opening) referenced in the space template can be assigned for each space template. At 1320, elemental components (e.g., constructions, profiles, activities, gains, LZCT (low or zero carbon technologies), profile set points, reflectances, materials, appliances, opening definitions) can be referenced from the space properties and an associated space template can be populated from such elemental components.

For example, a user may create an activity, such as PC equipment heat gain 10 w/m$^2$ that is referenced from a smart template called Main office, which in turn is part of a group of smart templates that make up a building template called Office 2006 standards, climate group 3. The activity may reference an elemental component, such as a profile that sets out at what times the activity occurs (e.g., when it is ON, hourly, daily, weekly, etc., throughout a year)

The workflow navigator, intelligent room groups, model merge, smart templates and design advisor technologies can work together providing automation, typically driven by the workflow navigator to deliver the stated goals (guidance, productivity. QA etc), example:

Commencing with new model geometry, the user may use a workflow navigator to guide and automate the process of populating a model with data. This can involve applying a prototype to the geometry. The prototype can utilize intelligent room groups to group spaces and assign data using smart templates. The workflow navigator can then guide and automate the process of simulation, analysis and reporting using the design advisor. The user may choose to utilize a full navigator (i.e., start to goal, concept design) or many part navigators (e.g., chosen sequentially from build, data, analysis, and interrogation categories) to meet the user's specific needs and goals. At all stages the design advisor can be called to automate the filtering, summarizing and reporting of information and results.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments In addition, it should be understood that any figures which highlight the functionality and advantages, are presented for example purposes only. The disclosed methodology and system are each sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method of navigating modeling of at least one building, including, but not limited to:
   performing processing associated with receiving, by at least one integrated analysis and design system utilizing at least one electronic database of information of at least one computer, nonparametric user input building design data;
   performing processing associated with organizing, by the at least one integrated analysis and design system, the nonparametric user input building design data; and
   performing processing associated with globally editing at least one non-parametric data element in multiple objects within at least one building design, wherein the global editing facilitates editing of all similar data elements through the at least one building design.

2. The method of claim 1, further including, but not limited to: performing processing associated with utilizing, by the at least one integrated analysis and design system, identifiers to apply the global editing to the non-parametric user input building design data, wherein the identifiers include, but are not limited to: identifiers for each building type and/or metrics.

3. The method of claim 2, wherein the identifiers are utilized to filter the data.

4. The method of claim 1, further including, but not limited to: performing processing associated with determining and organizing by the at least one integrated analysis and design system, internally calculated metrics related to the user input building design data, wherein the metrics include, but are not limited to: climate metrics, urban metrics, building form metrics; thermal metrics, day light metrics, light metrics, water metrics, or sustainability metrics, or any combination thereof.

5. A system of navigating modeling of at least one building, including, but not limited to:
   at least one processor configured for:
   performing processing associated with receiving, by at lest one integrated analysis and design system utilizing at least one electronic database of information of at least one computer, nonparametric user input building design data;
   performing processing associated with organizing, by the at lest one integrated analysis and design system, the nonparametric user input building design data; and
   performing processing associated with globally editing at least one non-parametric data element in multiple objects within at least one building design, wherein the global editing facilitates editing of all similar data elements through the at least one building design.

6. The system of claim 5, further including, but not limited to: performing processing associated with utilizing, by the at least one integrated analysis and design system, identifiers to apply the global editing to the non-parametric user input building design data, wherein the identifiers include, but are not limited to: identifiers for each building type and/or metrics.

7. The system of claim 6, wherein the identifiers are utilized to filter the data.

8. The system of claim 5, further including, but not limited to: performing processing associated with determining and organizing, by the at least one integrated analysis and design system, internally calculated metrics related to the user input building design data, wherein the metrics include, but are not limited to: climate metrics, urban metrics, building form metrics, thermal metrics, day light metrics, light metrics, water metrics, or sustainability metrics, or any combination thereof.

* * * * *